US010542505B2

(12) United States Patent
Si et al.

(10) Patent No.: US 10,542,505 B2
(45) Date of Patent: Jan. 21, 2020

(54) ENHANCED SYNCHRONIZATION SIGNALS FOR COVERAGE ENHANCEMENTS OF LOW COST USER EQUIPMENT

(71) Applicant: Samsung Electronics Co., Ltd., Suwon-si (KR)

(72) Inventors: Hongbo Si, Plano, TX (US); Qiongjie Lin, Atlanta, GA (US); Le Liu, Fremont, CA (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/927,800

(22) Filed: Mar. 21, 2018

(65) Prior Publication Data
US 2018/0279239 A1 Sep. 27, 2018

Related U.S. Application Data

(60) Provisional application No. 62/476,299, filed on Mar. 24, 2017, provisional application No. 62/479,859, filed on Mar. 31, 2017, provisional application No. 62/532,908, filed on Jul. 14, 2017, provisional application No. 62/588,006, filed on Nov. 17, 2017, (Continued)

(51) Int. Cl.
| *H04W 56/00* | (2009.01) |
| *H04W 68/02* | (2009.01) |
| *H04W 72/04* | (2009.01) |
| *H04W 76/28* | (2018.01) |
| *H04W 88/08* | (2009.01) |
| *H04W 88/02* | (2009.01) |

(52) U.S. Cl.
CPC ........ *H04W 56/001* (2013.01); *H04W 68/02* (2013.01); *H04W 72/042* (2013.01); *H04W 76/28* (2018.02); *H04W 88/02* (2013.01); *H04W 88/08* (2013.01)

(58) Field of Classification Search
CPC ... H04W 56/001; H04W 68/02; H04W 76/28; H04W 72/042; H04W 88/02; H04W 88/08; H04W 56/00; H04W 72/04
USPC ........................................................ 370/350
See application file for complete search history.

(56) References Cited

U.S. PATENT DOCUMENTS 6,967,936 B1 * 11/2005 Laroia .................. H04J 3/0682
370/208
9,350,502 B2 * 5/2016 Chun ................ H04W 56/0015
(Continued)

FOREIGN PATENT DOCUMENTS

KR  10-2016-0130429 A  11/2016
WO      2016/032776 A1   3/2016

OTHER PUBLICATIONS

International Search Report dated Jul. 10, 2018 in connection with International Patent Application No. PCT/KR2018/003555.
(Continued)

*Primary Examiner* — Man U Phan

(57) ABSTRACT

A method for a user equipment (UE) in a wireless communication system is provided. The method comprises receiving, from a base station (BS), re-synchronization signals (RSSs) over a downlink channel; identifying time-domain and frequency-domain resources used for the RSSs; and identifying a set of sequences used for constructing the RSSs from the time-domain and frequency-domain resources used for the RSSs.

20 Claims, 27 Drawing Sheets

Related U.S. Application Data provisional application No. 62/640,360, filed on Mar. 8, 2018.

(56) References Cited

U.S. PATENT DOCUMENTS

| | | | | |
|---|---|---|---|---|
| 9,781,692 | B2* | 10/2017 | Gou | H04W 56/0015 |
| 10,014,970 | B2* | 7/2018 | Zhang | H04B 7/2662 |
| 10,080,218 | B2* | 9/2018 | Yi | H04J 11/0069 |
| 2010/0316043 | A1* | 12/2010 | Doi | H04L 27/0006 370/350 |
| 2014/0177588 | A1 | 6/2014 | Chun et al. | |
| 2015/0055632 | A1 | 2/2015 | Gou et al. | |
| 2016/0373265 | A1* | 12/2016 | Shah | G06F 21/725 |
| 2017/0223667 | A1 | 8/2017 | Yi et al. | |
| 2018/0234920 | A1* | 8/2018 | Bae | H04W 76/28 |
| 2018/0352416 | A1* | 12/2018 | Ryu | H04W 4/70 |

OTHER PUBLICATIONS

Written Opinion dated Jul. 10, 2018 in connection with International Patent Application No. PCT/KR2018/003555.
CATT, "Numerology agnostic NR PSS Design", 3GPP TSG RAN WG1 Meeting #88, Feb. 13-17, 2017, 9 pages, R1-1702061.
"3rd Generation Partnership Project; Technical Specification Group Radio Access Network; Evolved Universal Terrestrial Radio Access (E-UTRA); Physical channels and modulation (Release 13)", Technical Specification 3GPP TS 36.211 V13.2.0, Jun. 2016, 168 pages.
"3rd Generation Partnership Project; Technical Specification Group Radio Access Network; Evolved Universal Terrestrial Radio Access (E-UTRA); Multiplexing and channel coding (Release 13)", Technical Specification 3GPP TS 36.212 V13.2.0, Jun. 2016, 140 pages.
"3rd Generation Partnership Project; Technical Specification Group Radio Access Network; Evolved Universal Terrestrial Radio Access (E-UTRA); Physical layer procedures (Release 13)", Technical Specification 3GPP TS 36.213 V13.2.0, Jun. 2016, 381 pages.
"3rd Generation Partnership Project; Technical Specification Group Radio Access Network; Evolved Universal Terrestrial Radio Access (E-UTRA); Medium Access Control (MAC) protocol specification (Release 13)", Technical Specification 3GPP TS 36.321 V13.2.0, Jun. 2016, 91 pages.
"3rd Generation Partnership Project; Technical Specification Group Radio Access Network; Evolved Universal Terrestrial Radio Access (E-UTRA); Radio Resource Control (RRC); Protocol specification (Release 13)", Technical Specification 3GPP TS 36.331 V13.2.0, Jun. 2016, 623 pages.

* cited by examiner

ENHANCED SYNCHRONIZATION SIGNALS FOR COVERAGE ENHANCEMENTS OF LOW COST USER EQUIPMENT

CROSS-REFERENCE TO RELATED APPLICATIONS AND CLAIM OF PRIORITY

The present application claims priority to: U.S. Provisional Patent Application Ser. No. 62/476,299, filed on Mar. 24, 2017; U.S. Provisional Patent Application Ser. No. 62/479,859, filed on Mar. 31, 2017; U.S. Provisional Patent Application Ser. No. 62/532,908, filed on Jul. 14, 2017; U.S. Provisional Patent Application Ser. No. 62/588,006, filed on Nov. 17, 2017; and U.S. Provisional Patent Application Ser. No. 62/640,360, filed on Mar. 8, 2018. The content of the above-identified patent documents is incorporated herein by reference.

TECHNICAL FIELD

The present disclosure relates generally to synchronization signals in wireless communication systems and, more specifically, to the synchronization signals for coverage enhancements of low cost UEs in an advanced wireless communication system.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide an NR-SS burst set design in an advanced wireless communication system.

In one embodiment, a user equipment (UE) in a wireless communication system is provided. The UE includes a transceiver configured to receive, from a base station (BS), re-synchronization signals (RSSs) over a downlink channel. The UE further includes a processor operably connected to the transceiver, the processor configured to identify time-domain and frequency-domain resources used for the RSSs and identify a set of sequences used for constructing the RSSs from the time-domain and frequency-domain resources used for the RSSs.

In another embodiment, a base station (BS) in a wireless communication system is provided. The BS comprises a processor configured to configure time-domain and frequency-domain resources used for re-synchronization signals (RSSs), generate a set of sequences to construct the RSSs, and map the generated set of sequences to the time-domain and frequency-domain resources to be used for the RSSs. The BS further includes a transceiver operably connected to the processor, the transceiver configured to transmit, to a user equipment (UE), the RSSs over a downlink channel.

In yet another embodiment, a method for a user equipment (UE) in a wireless communication system is provided. The method comprises receiving, from a base station (BS), re-synchronization signals (RSSs) over a downlink channel, identifying time-domain and frequency-domain resources to be used for the RSSs, and identifying a set of sequences used for constructing the RSSs from the time-domain and frequency-domain resources used for the RSSs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 20D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0 "E-UTRA, Physical Layer Procedures;" 3GPP TS 36.321 v13.2.0, "E-UTRA, Medium Access Control (MAC) protocol specification;" and 3GPP TS 36.331 v13.2.0, "E-UTRA, Radio Resource Control (RRC) protocol specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
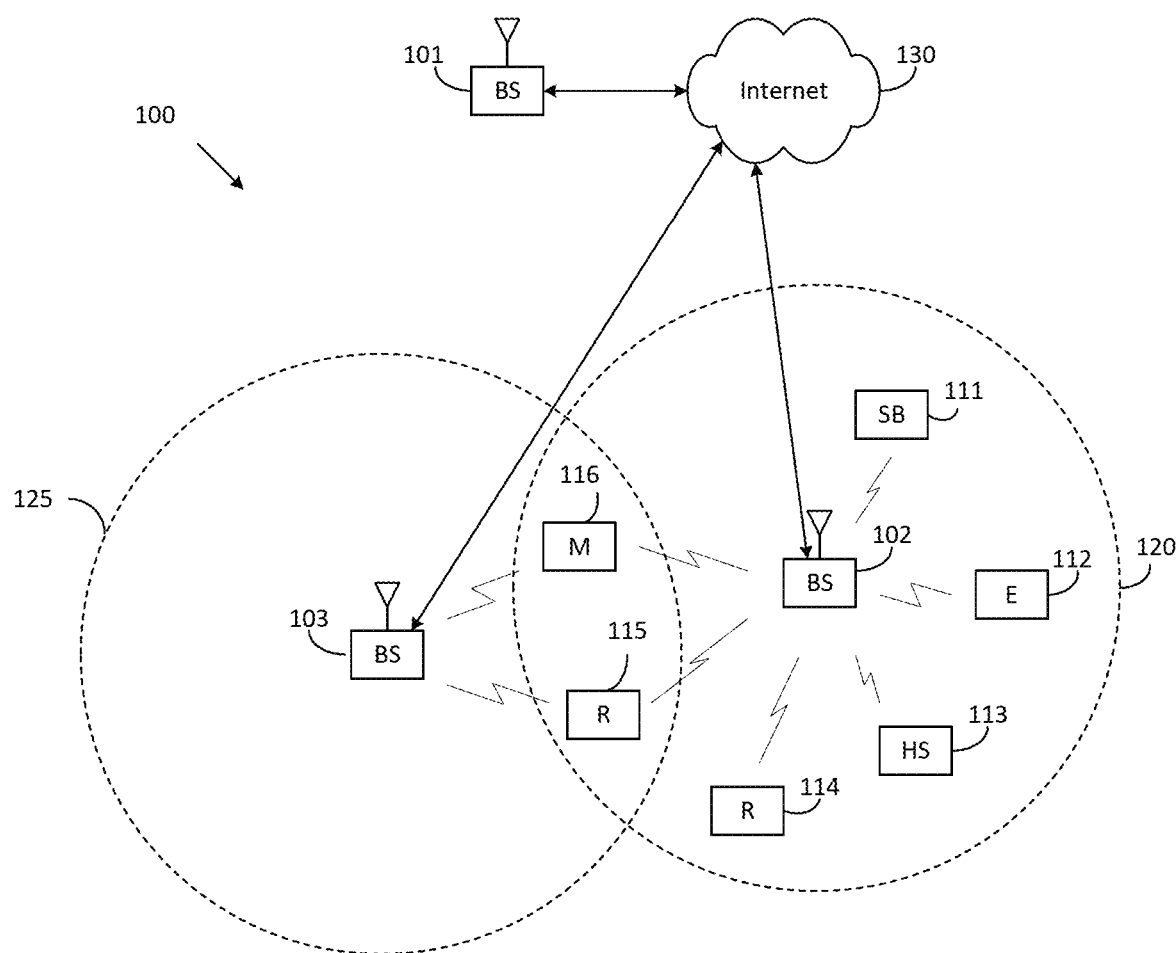
FIG. 1 illustrates an example wireless network according to embodiments of the present disclosure.
Figure 2:
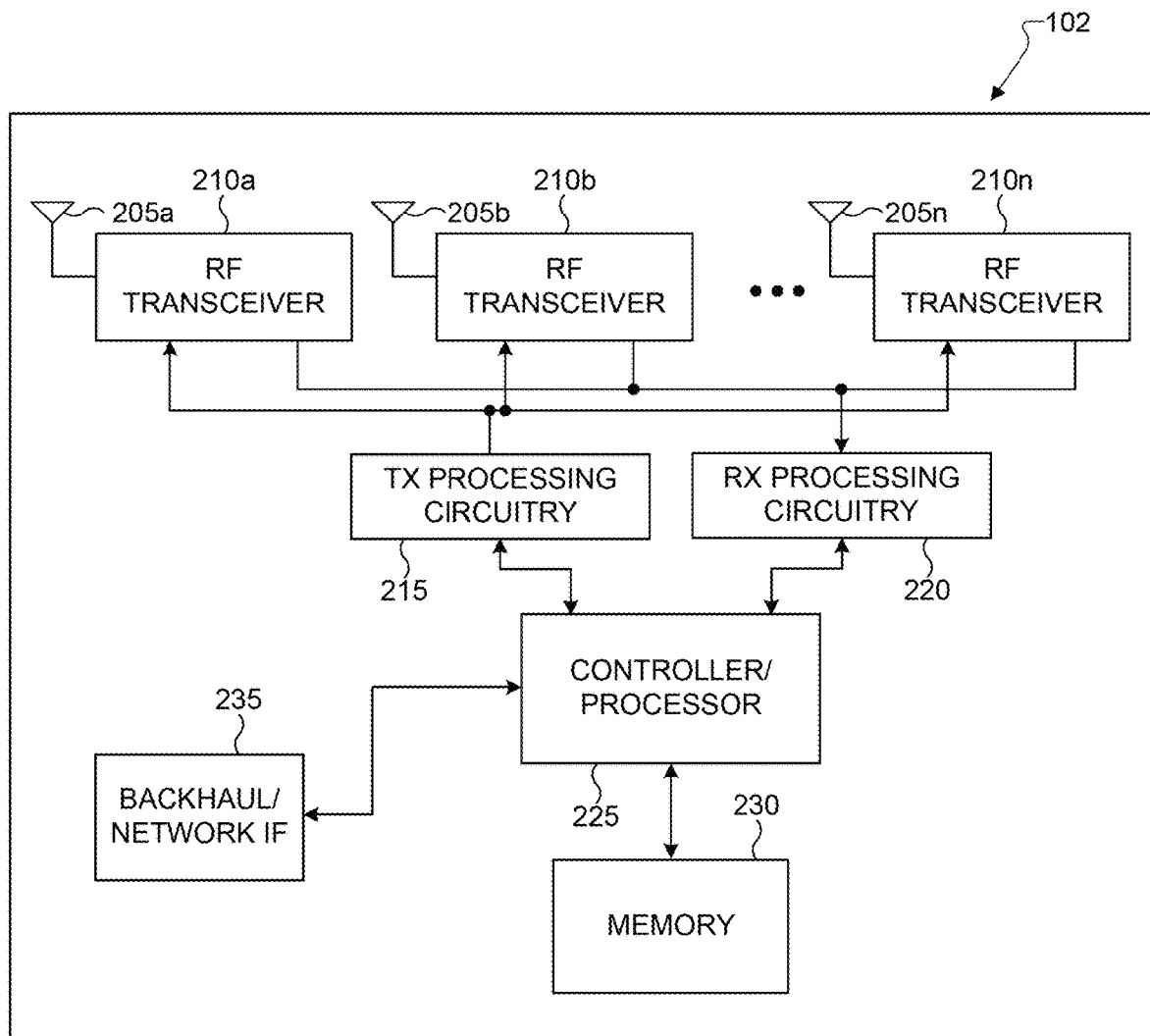
FIG. 2 illustrates an example eNB according to embodiments of the present disclosure.
Figure 3:
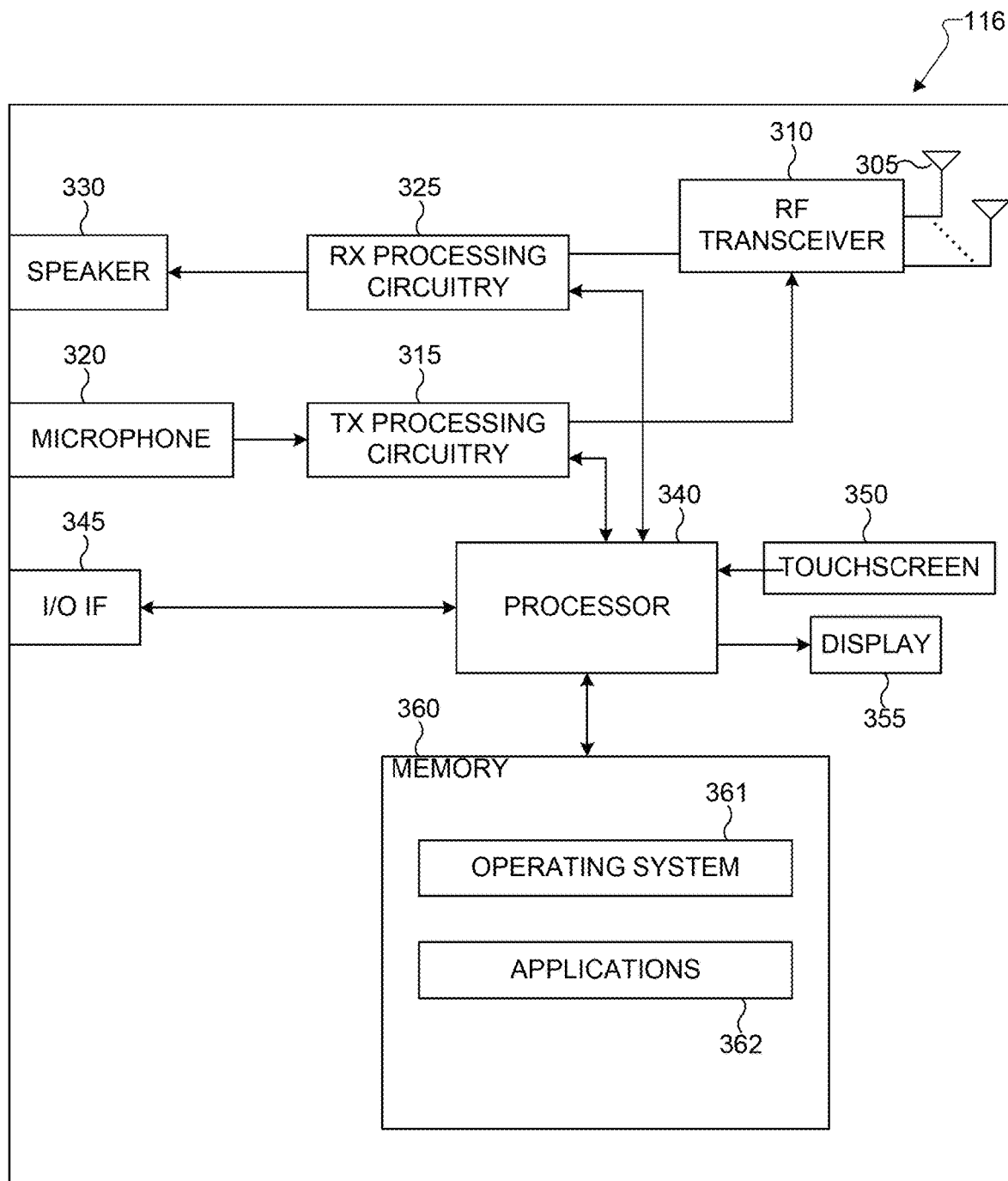
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient controlling enhanced synchronization signals (RSSs) in an advanced wireless communication system. In certain embodiments, and one or more of the eNBs 101-103 includes circuitry, programing, or a combination thereof, for receiving efficient controlling enhanced synchronization signals (RSSs) in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
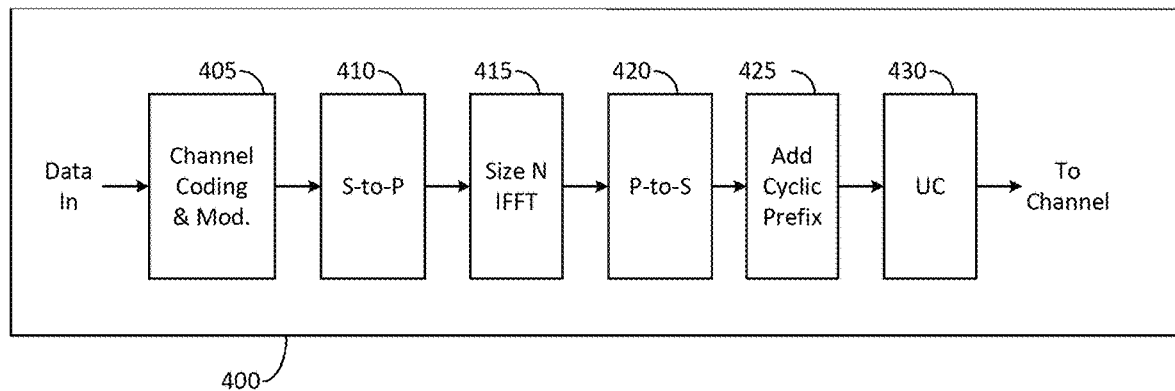
FIG. 4A illustrates a high-level diagram of an orthogonal frequency division multiple access transmit path according to embodiments of the present disclosure.
Figure 4B:
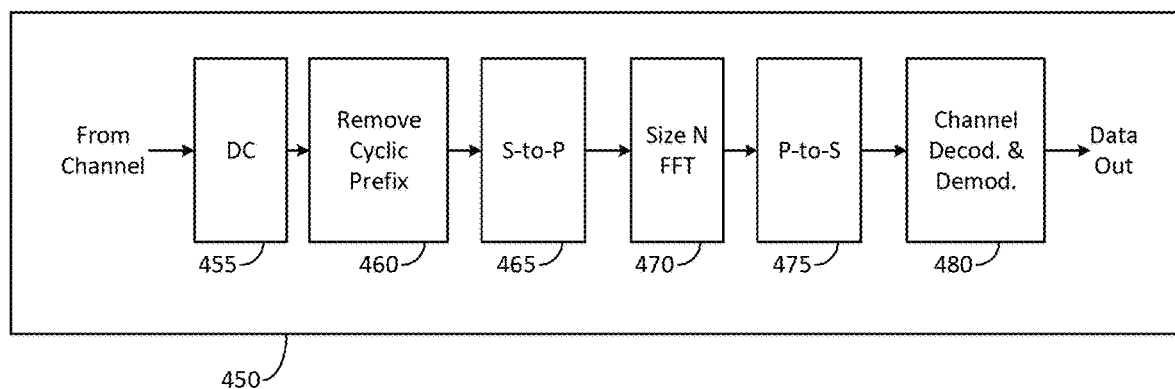
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNB s 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $NR_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, it may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{syml}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
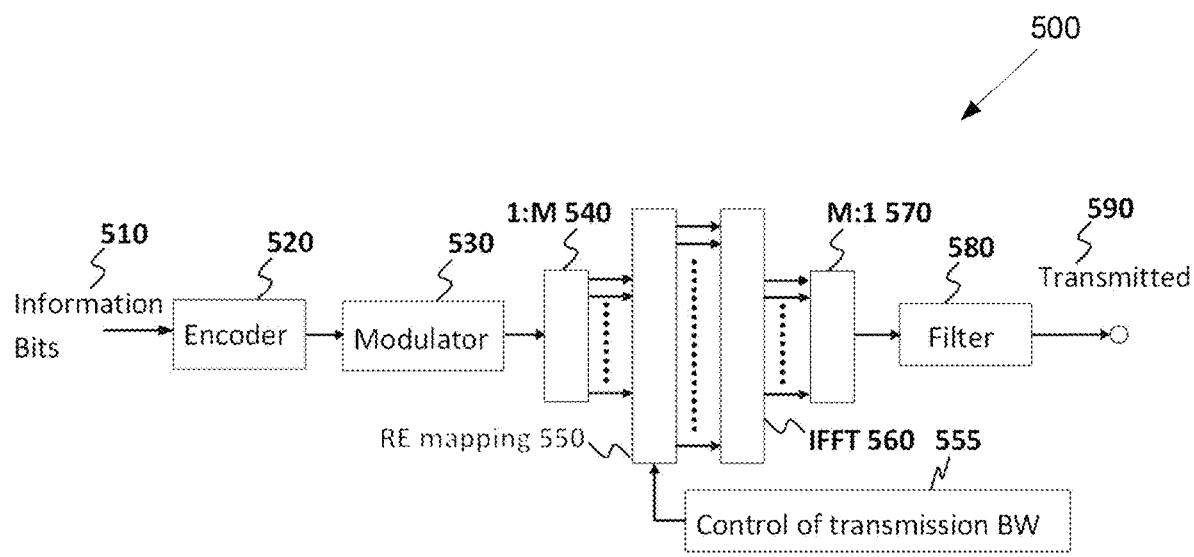
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
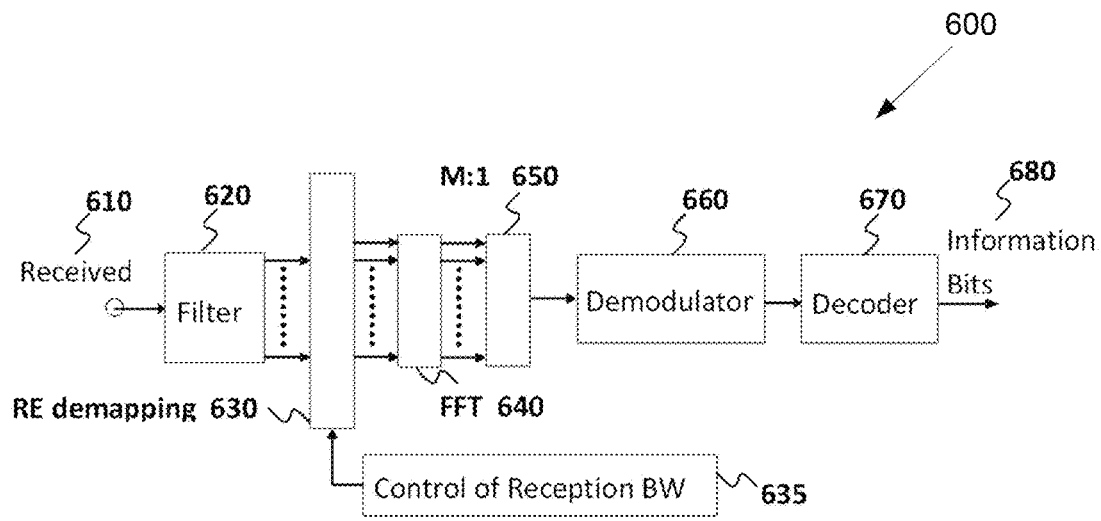
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
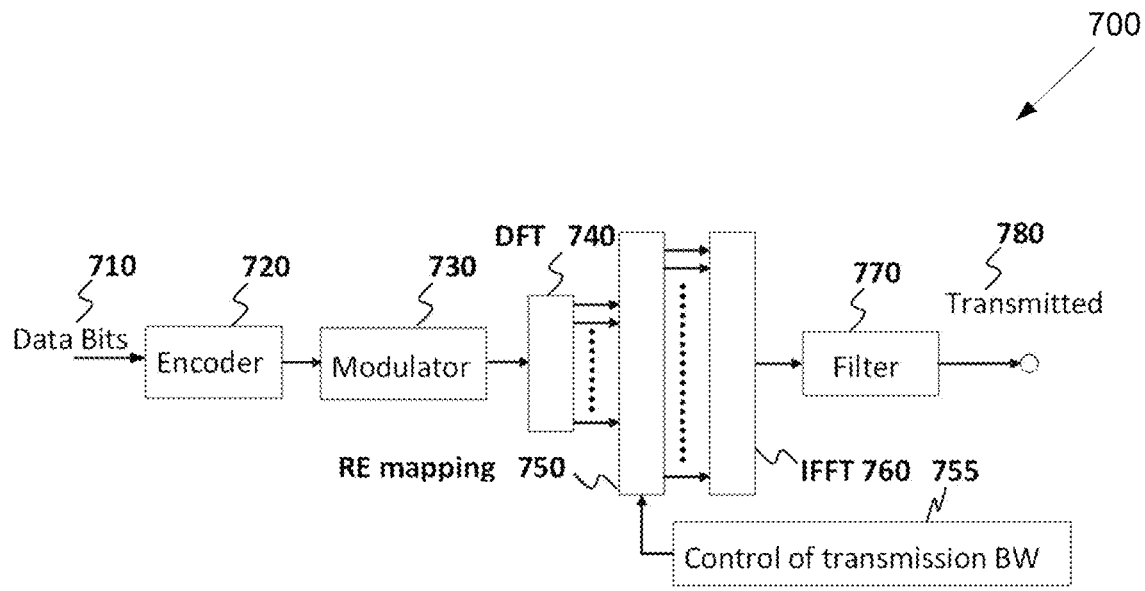
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
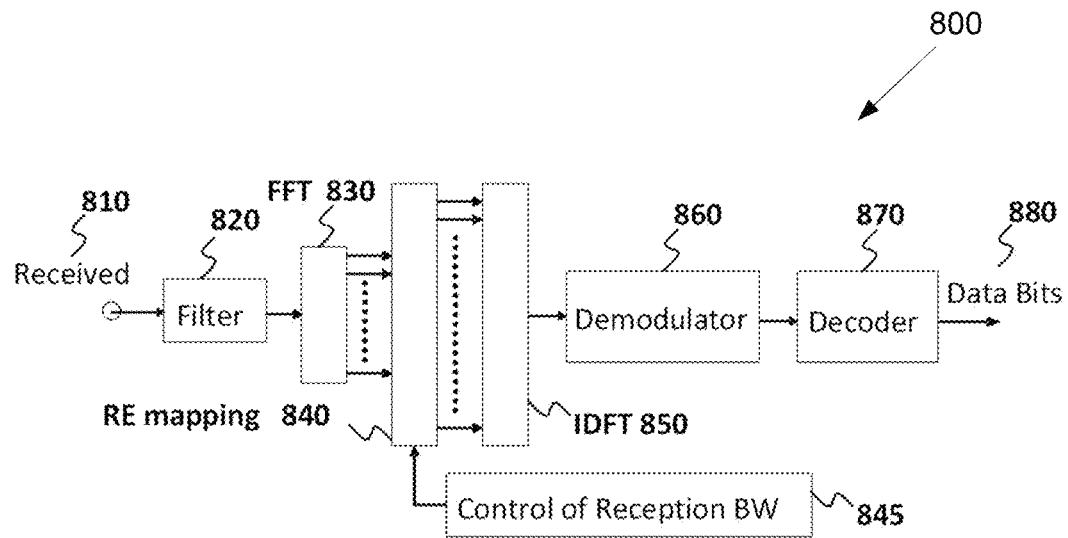
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
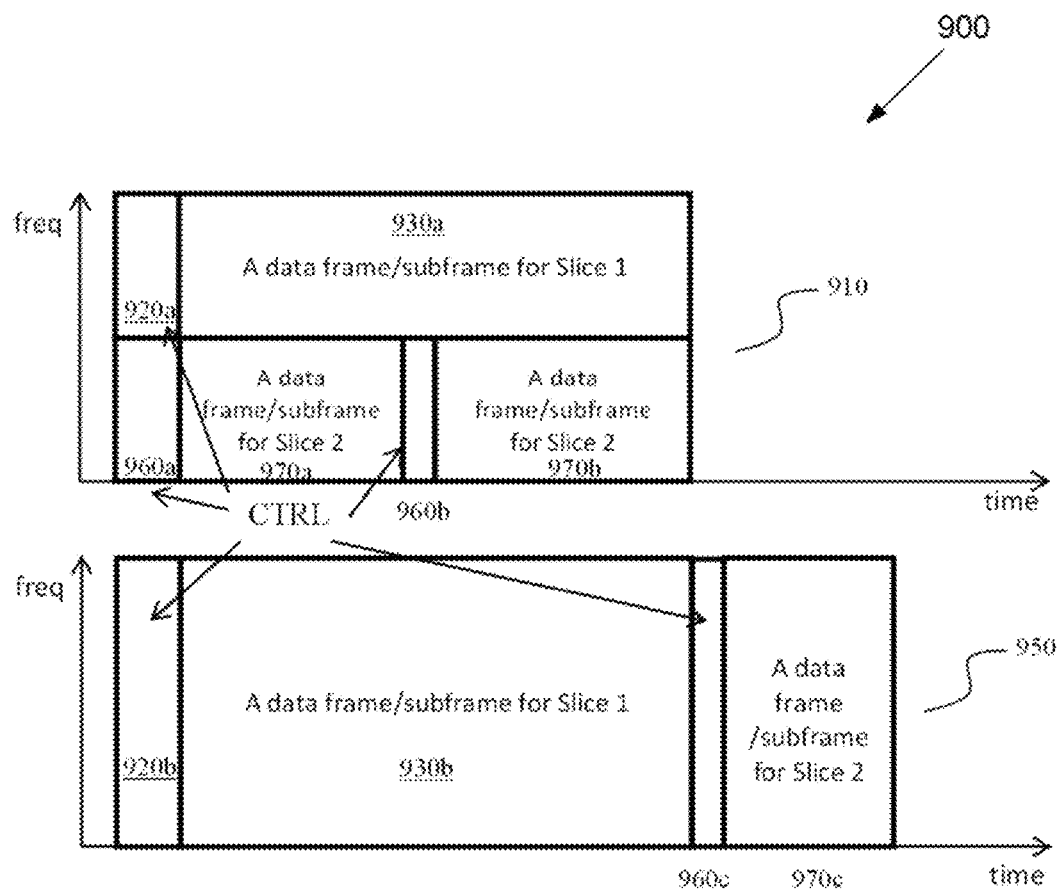
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
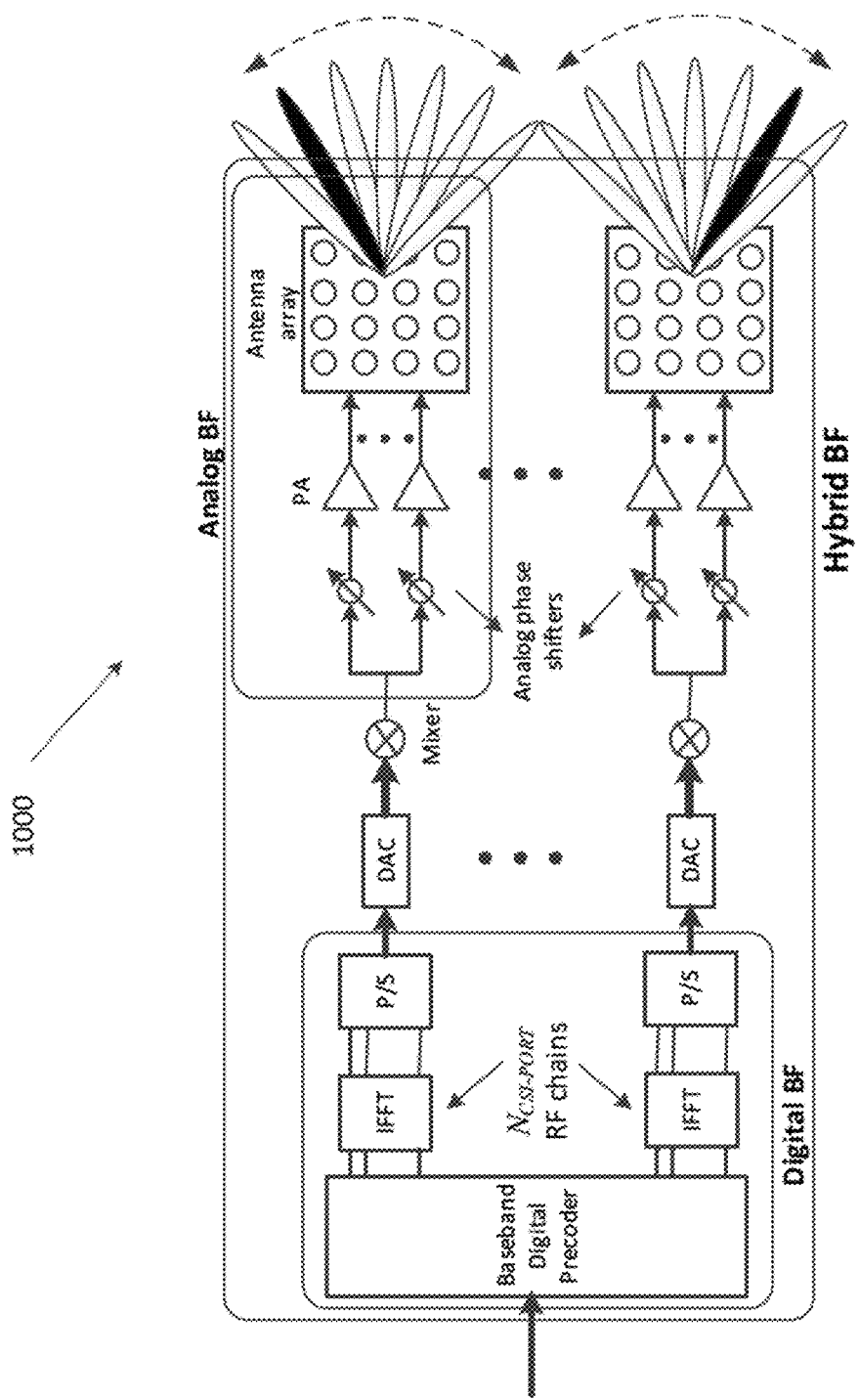
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
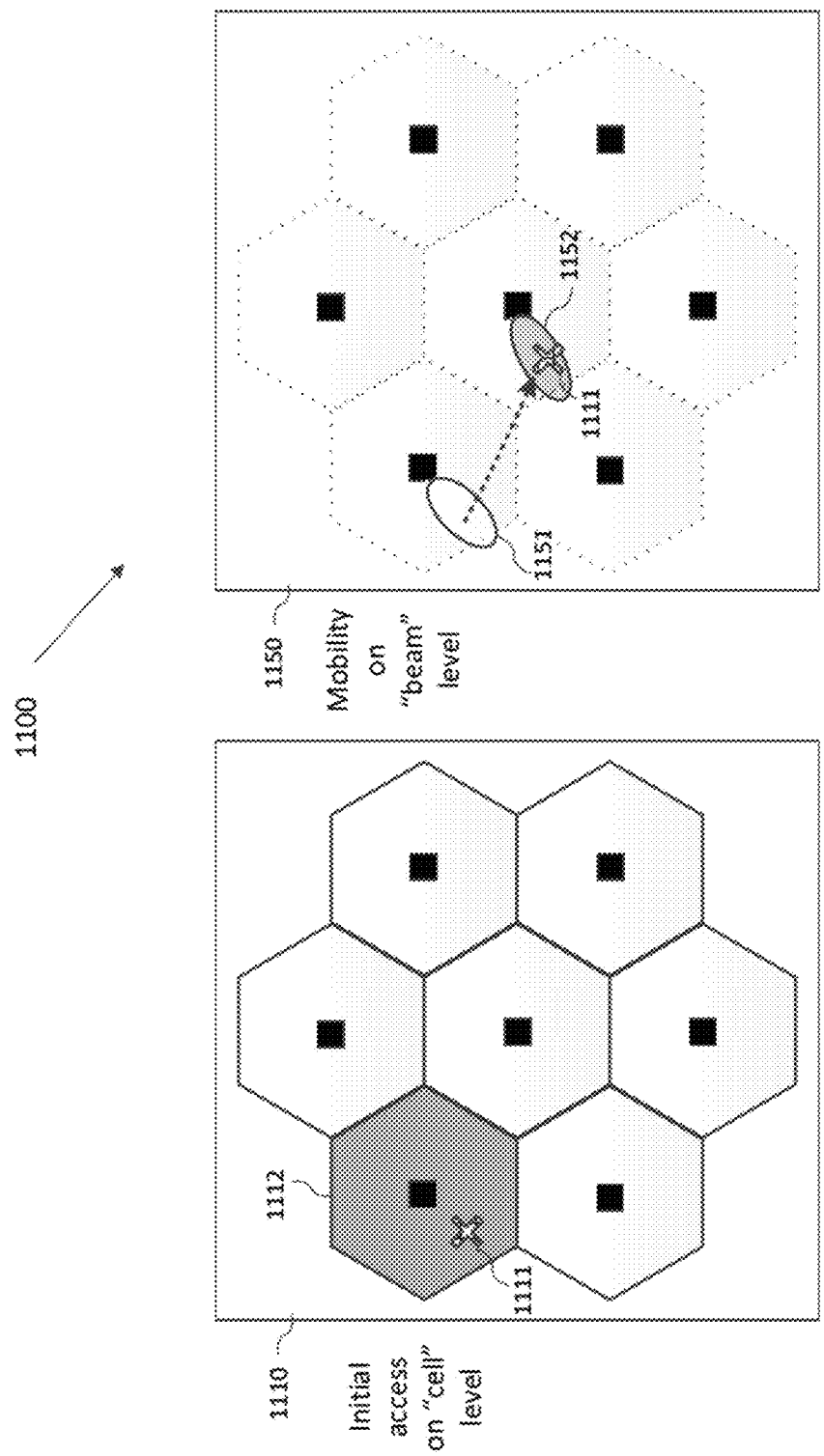
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

Figure 12:
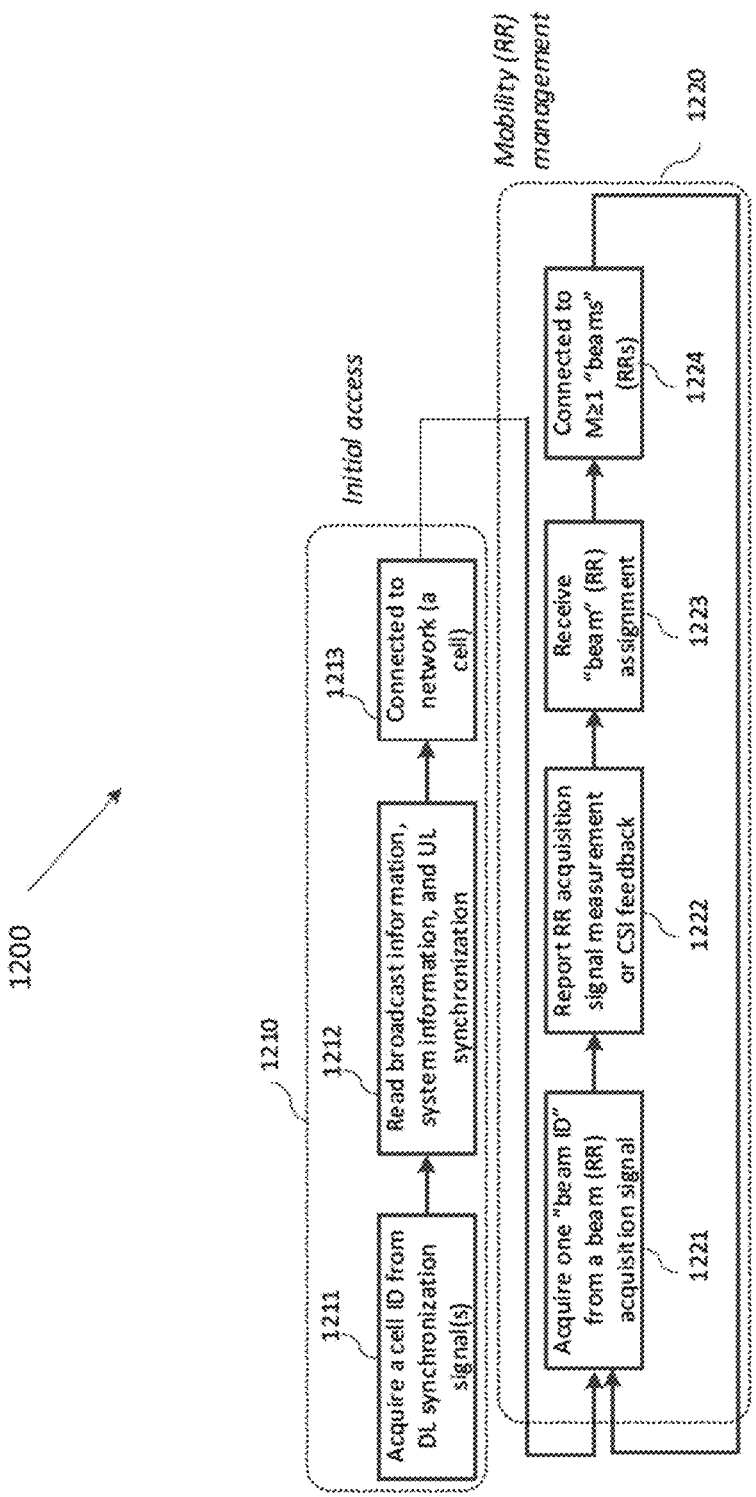
FIG. 12 illustrates an example beam sweeping operation according to embodiments of the present disclosure.

FIG. 12 illustrates an example beam sweeping operation 1200 according to embodiments of the present disclosure. The embodiment of the beam sweeping operation 1200 illustrated in FIG. 12 is for illustration only. FIG. 12 does not limit the scope of this disclosure to any particular implementation of the beam sweeping operation 1200.

As shown in FIG. 12, the aforementioned initial access procedure 1210 and the aforementioned mobility or radio resource management 1220 from the perspective of a UE are described. The initial access procedure 1210 includes cell ID acquisition from DL synchronization signal(s) 1211 as well as retrieval of broadcast information (along with system information required by the UE to establish DL and UL connections) followed by UL synchronization (which can include random access procedure). Once the UE completes 1211 and 1212, the UE is connected to the network and associated with a cell. Following the completion of initial access procedure, the UE, possibly mobile, is in an RRM state described in 1220. This state includes, first, an acquisition stage 1221 where the UE can periodically (repeatedly) attempt to acquire a "beam" or RR ID from a "beam" or RR acquisition signal (such as a measurement RS).

The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE system. In this case, the UE can be configured with a set of K>1 CSI-RS resources to monitor. Several options are possible for measurement report 1222. First, the UE can measure each of the K CSI-RS resources, calculate a corresponding RS power (similar to RSRP or RSRQ in LTE system), and report the RS power to the TRP (or network). Second, the UE can measure each of the K CSI-RS resources, calculate an associated CSI (which can include CQI and potentially other CSI parameters such as RI and PMI), and report the CSI to the TRP (or network). Based on the report from the UE, the UE is assigned M≥1 "beams" or RRs either via a higher-layer (RRC) signaling or an L1/L2 control signaling 1223. Therefore the UE is connected to these M "beams"/RRs.

For certain scenarios such as asynchronous networks, the UE can fall back to cell ID based or cell-level mobility management similar to 3GPP LTE system. Therefore, only one of the two levels of radio resource entity (cell) is applicable. When a two-level ("cell" and "beam") radio resource entity or management is utilized, synchronization signal(s) can be designed primarily for initial access into the network. For mmWave systems where analog beam sweeping (as shown in FIG. 12) or repetition may be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR)

acquisition signal does not carry cell ID (hence, cell ID is not detected from beam or RR acquisition signal).

Downlink (DL) signals include data signals conveying information content, control signals conveying DL control information (DCI), and reference signals (RS), which are also known as pilot signals. A NodeB transmits data information or DCI through respective physical DL shared channels (PDSCHs) or physical DL control channels (PDCCHs). A NodeB transmits one or more of multiple types of RS including a UE-common RS (CRS), a channel state information RS (CSI-RS), and a demodulation RS (DMRS). A CRS is transmitted over a DL system bandwidth (BW) and can be used by UEs to demodulate data or control signals or to perform measurements. To reduce CRS overhead, a NodeB may transmit a CSI-RS with a smaller density in the time and/or frequency domain than a CRS.

For interference measurement reports (IMRs), a zero power CSI-RS (ZP CSI-RS) can be used. A UE can determine CSI-RS transmission parameters through higher layer signaling from a NodeB. DMRS is transmitted only in the BW of a respective PDSCH or PDCCH and a UE can use the DMRS to demodulate information in a PDSCH or PDCCH.

To assist cell search and synchronization, a cell transmits synchronization signals such as a Primary Synchronization Signal (PSS) and a secondary synchronization Signal (SSS). Although having a same structure, the time-domain positions of synchronization signals within a frame that includes ten subframes can differ depending on whether a cell is operating in frequency division duplex (FDD) or time division duplex (TDD). Therefore, after acquiring the synchronization signals, a UE can determine whether a cell operates in FDD or in TDD and a subframe index within a frame. The PSS and SSS occupy the central 72 sub-carriers, also referred to as resource elements (REs), of an operating bandwidth. Additionally, the PSS and SSS can inform of a physical cell identifier (PCID) for a cell and therefore, after acquiring the PSS and SSS, a UE can know the PCID of the transmitting cell.

Figure 13:
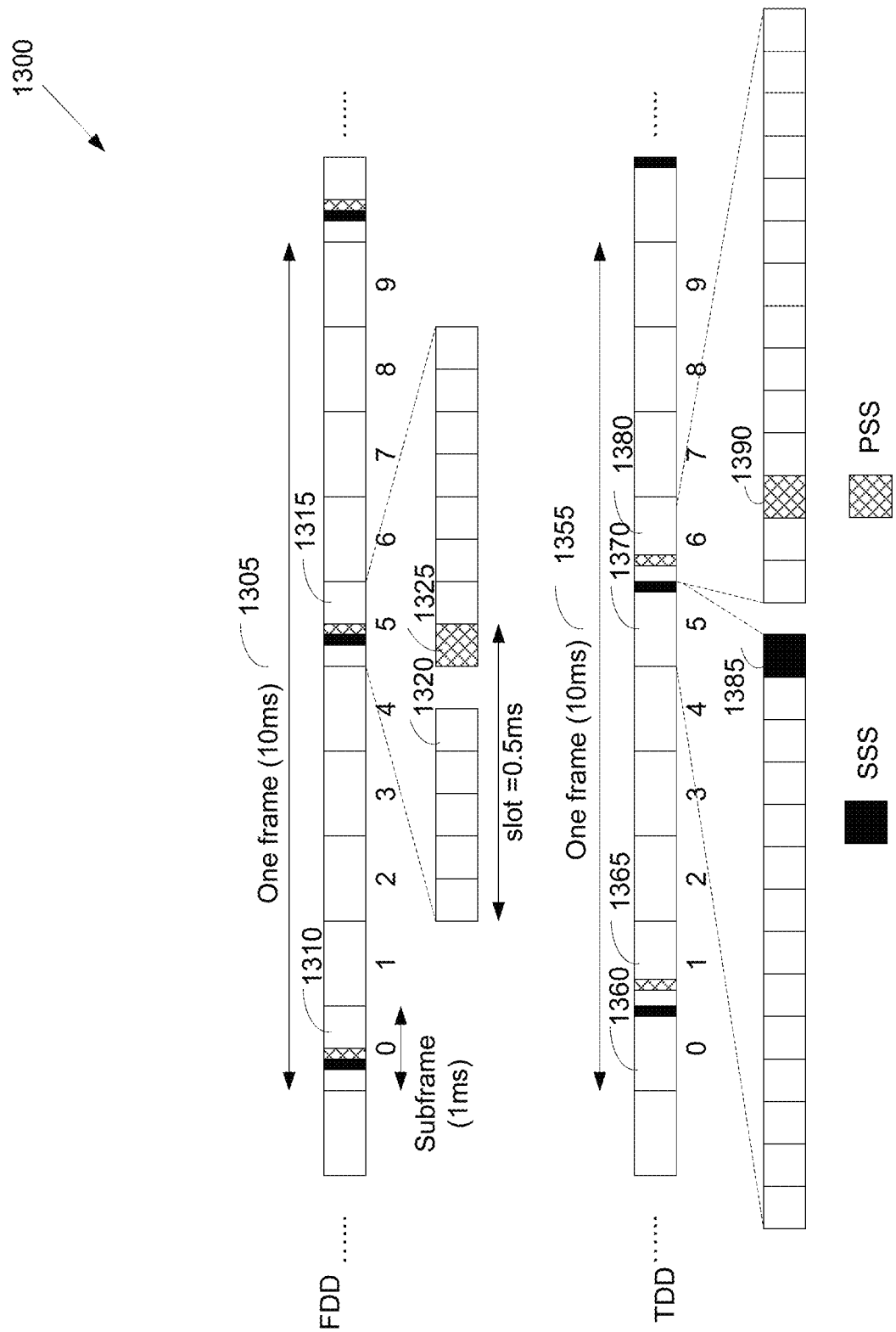
FIG. 13 illustrates an example time domain positions for PSS/SSS for FDD and TDD according to embodiments of the present disclosure.

FIG. 13 illustrates an example time domain positions 1300 for PSS/SSS for FDD and TDD according to embodiments of the present disclosure. The embodiment of the time domain positions 1300 illustrated in FIG. 13 is for illustration only. FIG. 13 does not limit the scope of this disclosure.

Referring to FIG. 13, in case of FDD, in every frame 1305, a PSS 1325 is transmitted within a last symbol of a first slot of subframes 0 and 5 (1310 and 1315), wherein a subframe includes two slots. A SSS 1320 is transmitted within a second last symbol of a same slot. In case of TDD, in every frame 1355, a PSS 1390 is transmitted within a third symbol of subframes 1 and 6 (1365 and 1380), while a SSS 1385 is transmitted in a last symbol of subframes 0 and 5 (1360 and 1370). The difference allows for the detection of the duplex scheme on a cell. The resource elements for PSS and SSS are not available for transmission of any other type of DL signals.

A logical channel that carries system control information is referred to as broadcast control channel (BCCH). A BCCH is mapped to either a transport channel referred to as a broadcast channel (BCH) or to a DL shared channel (DLSCH). A BCH is mapped to a physical channel referred to as physical BCH (PBCH). A DL-SCH is mapped to PDSCH. A master information block (MIB) is transmitted using BCH while other system information blocks (SIBs) are provided using DL-SCH. After a UE acquires a PCID for a cell, the UE proceeds to detect the MIB.

An MIB includes a minimal amount of system information that is needed for a UE to receive remaining system information provided by DL-SCH. More specifically, an MIB has predefined format and includes information of DL BW, physical hybrid-ARQ indicator channel (PHICH, 3-bit), SFN (most significant bits (MSBs) 8-bit) and 10 spare bits. A UE can indirectly acquire the two least significant bits (LSBs) of a SFN after BCH decoding. A PBCH is transmitted using a minimum BW of 1.08 MHz in the central part of a DL operating BW of the cell and over four SFs in successive frames where each SF is a first SF of a frame (see also REF 1). The 40 msec timing is detected blindly without requiring explicit signaling. Also, in each SF, a PBCH transmission is self-decodable and UEs with good channel conditions may detect a PBCH in less than four SFs. The UE can also combine PBCH receptions in successive frames to improve a detection probability for the MIB provided that the successive frames convey the same MIB. In practice, this means that the successive frames are in a same quadruple of frames and the MIB includes the same SFN.

Most system information is included in different SIBs. An eNB transmits SIBs using respective DL-SCHs. A presence of system information on a DL-SCH in a SF is indicated by a transmission of a corresponding PDCCH conveying a codeword with a CRC scrambled with a system information RNTI (SI-RNTI). SIB1 mainly includes information related to whether a UE is allowed to camp on a respective cell. In case of TDD, SIB 1 also includes information about an allocation of UL/DL SFs and configuration of a special SF. SIB 1 is transmitted in SF#5.

A set of resource blocks (RBs) in a DL BW over which SIB1 is transmitted, where each RB includes twelve consecutive REs, as well as other aspects of an associated transport format, can vary as signaled on an associated PDCCH. SIB 1 also includes information about a time-domain scheduling of remaining SIBs (SIB2 and beyond). SIB2 includes information that UEs need to obtain in order to be able to access a cell, including an UL cell BW, random-access parameters, and parameters related to UL power control. SIB3-SIB13 mainly includes information related to cell reselection, neighboring-cell-related information, public warning messages, and so on.

Figure 14:
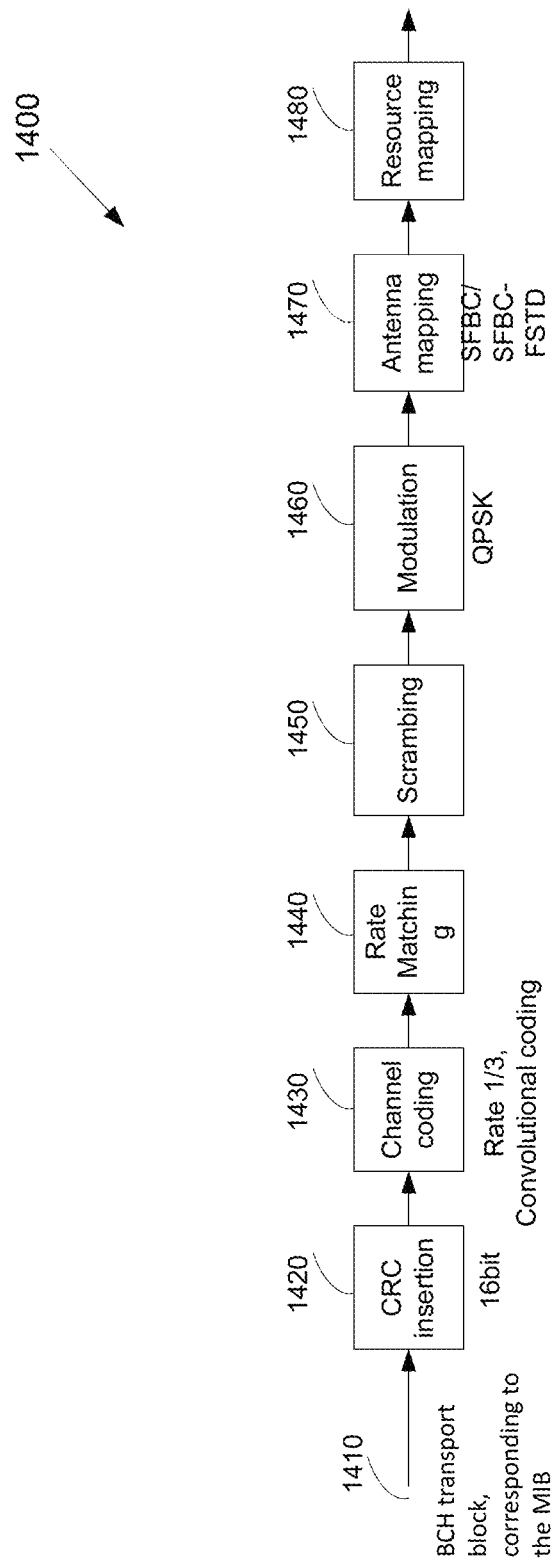
FIG. 14 illustrates an example PBCH transmitter according to embodiments of the present disclosure.

FIG. 14 illustrates an example PBCH transmitter 1400 according to embodiments of the present disclosure. The embodiment of the PBCH transmitter 1400 illustrated in FIG. 14 is for illustration only. FIG. 14 does not limit the scope of this disclosure.

Referring to FIG. 14, a BCH transport block corresponding to an MIB 1410 is first processed by including a 16-bit CRC 1420 followed by channel coding 1430 using a rate-1/3 tail-biting convolutional code. Channel coding is followed by rate matching 1440, in practice repetition of the coded bits, and bit-level scrambling 1450. QPSK modulation 1460 is then applied to a coded and scrambled BCH transport block. BCH multi-antenna transmission 1470 is limited to transmitter antenna diversity in case of more than one transmitter antenna ports. For example, space-frequency block coding (SFBC) can be used in case of two antenna ports and combined SFBC/space-frequency time diversity (FSTD) in case of four antenna ports. By blindly detecting a transmitter antenna diversity scheme used for PBCH, a UE can determine a number of cell-specific antenna ports and also a transmitter antenna diversity scheme used for control signaling. A resource mapping 1480 is finally applied and a PBCH is transmitted.

Figure 15:
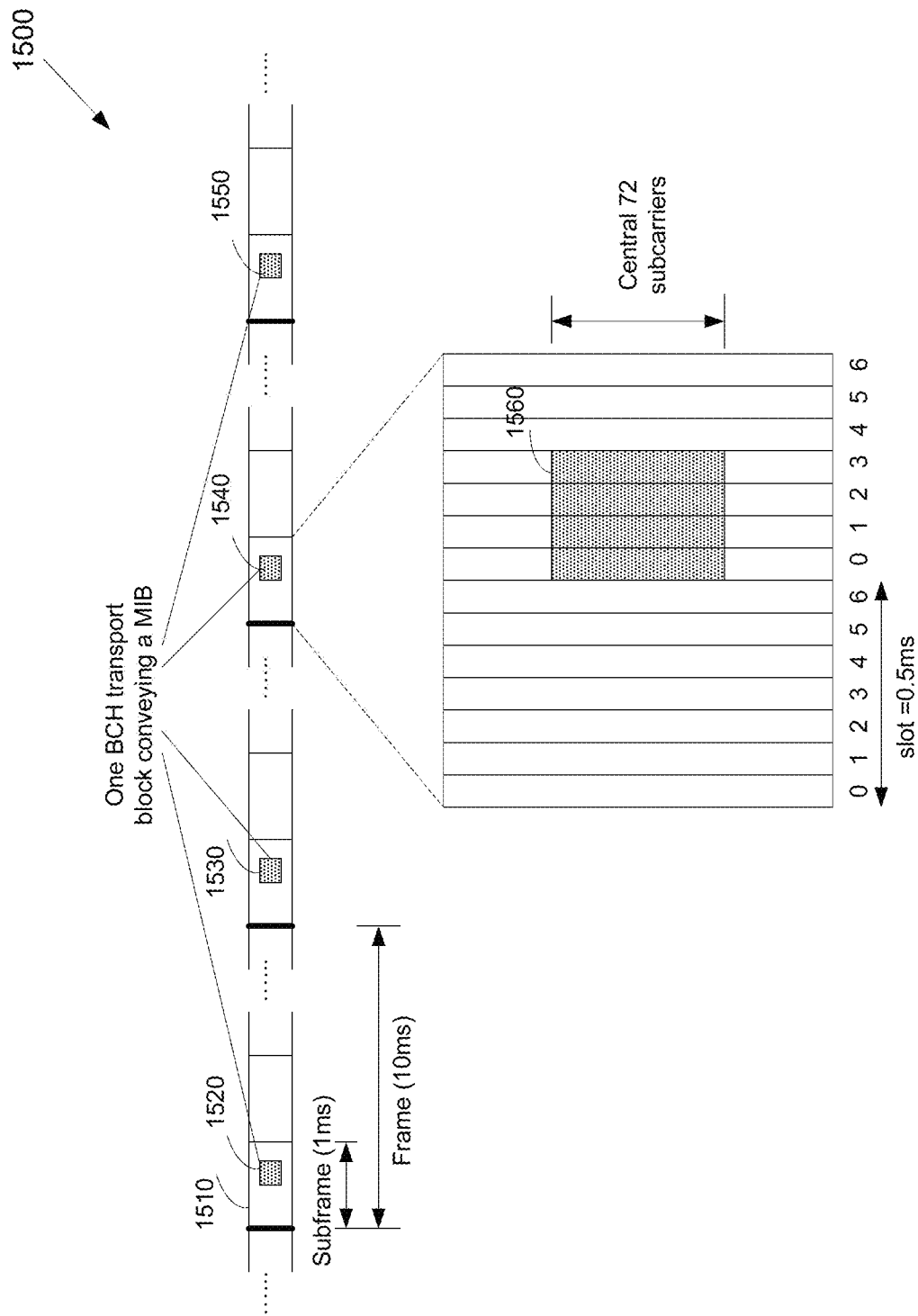
FIG. 15 illustrates an example PBCH resource mapping according to embodiments of the present disclosure.

FIG. 15 illustrates an example PBCH resource mapping 1500 according to embodiments of the present disclosure. The embodiment of the PBCH resource mapping 1500 illustrated in FIG. 15 is for illustration only. FIG. 15 does not limit the scope of this disclosure.

An eNB transmits one BCH transport block, corresponding to an MIB, every 40 msec or, equivalently, every 4 frames. Therefore, a BCH transmission time interval (TTI) is 40 msec. The eNB maps a coded BCH transport block to a first SF 1510 of each frame in four consecutive frames 1520, 1530, 1540, and 1550. A PBCH is transmitted within a first four symbols of a second slot of SF#0 and over the 72 center REs (6 RBs) 1560. In FDD, a PBCH transmission follows immediately after a PSS and SSS transmission in SF#0.

Figure 16:
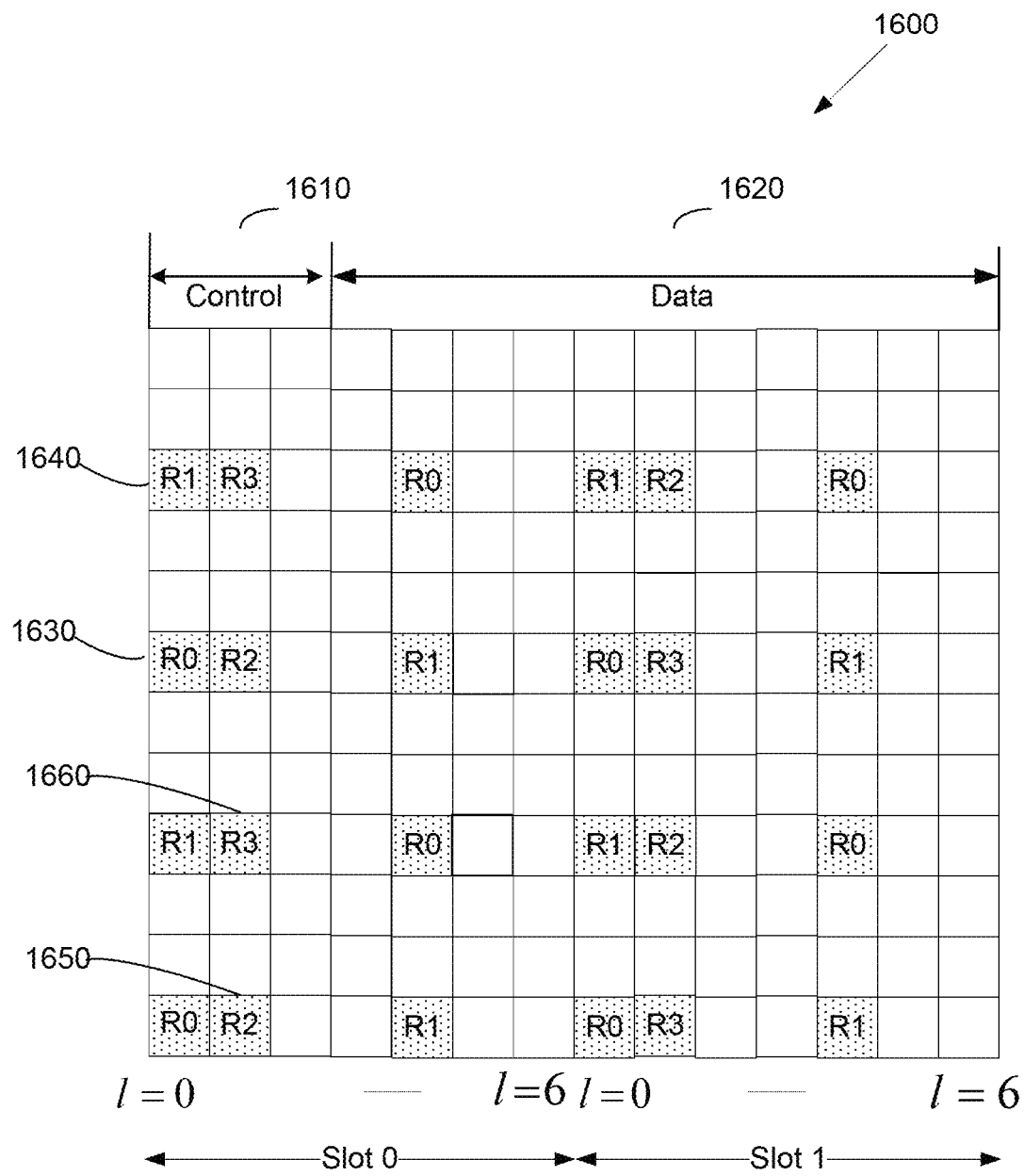
FIG. 16 illustrates an example CRS mapping in an RB according to embodiments of the present disclosure.

FIG. 16 illustrates an example CRS mapping in an RB 1600 according to embodiments of the present disclosure. The embodiment of the CRS mapping in an RB 1600 illustrated in FIG. 16 is for illustration only. FIG. 16 does not limit the scope of this disclosure.

FIG. 16 illustrates a CRS mapping in a resource block (RB) that includes 12 subcarriers for normal cyclic prefix (CP), where CRS can be used for channel estimation to coherently demodulate received PBCH modulated symbols.

Referring to FIG. 16, for a subframe with a control region of 3 symbols 1610, and a data region of 11 symbols 1620, CRS can be mapped for antenna ports 0-3, with R0-R3 (1630-1660), respectively. For the PBCH transmission symbols in FIG. 16, the first and second symbols have CRS for R0-R1 and R2-R3, respectively, regardless of an actual number of CRS antenna ports used by a NodeB transmitter that can be either 1, or 2, or 4.

In LTE specification, the PBCH repetition was supported for bandwidth-reduced low-complexity (BL) and coverage-enhanced (CE) UEs, i.e., MTC user terminals. According to LTE specification, if a cell is configured with repetition of the physical broadcast channel: symbols are mapped to core resource element (k,l) in slot 1 in subframe 0 within a radio frame $n_f$ according to the mapping operation aforementioned; cell-specific reference signals in OFDM symbols l in slot 1 in subframe 0 within a radio frame $n_f$ with l are considered according to the mapping operation aforementioned; and/or symbols are additionally mapped to resource elements (k,l') in slot number $n'_s$ within radio frame $n_f$-i unless resource element (k,l') is used by CSI reference signals.

The resource elements (k,l) constituting the core set of PBCH resource elements. The mapping to resource elements (k,l) not reserved for transmission of reference signals shall be in increasing order of first the index k, then the index l in slot 1 in subframe 0 and finally the radio $$k = \frac{N_{RB}^{DL} N_{sc}^{RB}}{2} - 36 + k', k' = 0, 1, \ldots, 71$$

frame number. The resource-element indices are given by l=0, 1, . . . , 3 where resource elements reserved for reference signals shall be excluded. The mapping operation shall assume cell-specific reference signals for antenna ports 0-3 being present irrespective of the actual configuration. The UE shall assume that the resource elements assumed to be reserved for reference signals in the mapping operation above but not used for transmission of reference signal are not available for PDSCH or MPDCCH transmission. The UE may not make any other assumptions about these resource elements.

For frame structure type 1, l', $n'_s$, and i are given by TABLE 1A. For frame structure type 2: if $N_{RB}^{DL}$>15, l' and $n'_s$ are given by Table 1B and i=0; and if $7 \leq N_{RB}^{DL} \leq 15$, l' and $n'_s$ are given by Table 1B and i=0, except that repetitions with $n'_s$=10 and $n'_s$=11 are not applied. For both frame structure type 1 and frame structure type 2, repetition of the physical broadcast channel is not applicable if $N_{RB}^{DL}$=6.

TABLE 1A

Frame offset, slot and symbol number triplets for repetition of PBCH for frame structure type 1

| | Frame offset, slot and symbol number triplets (i, n'$_s$, l') | |
|---|---|---|
| l | Normal cyclic prefix | Extended cyclic prefix |
| 0 | (1, 18, 3), (1, 19, 0), (1, 19, 4), (0, 0, 4) | (1, 18, 3), (1, 19, 0), (1, 19, 5) |
| 1 | (1, 18, 4), (1, 19, 1). (1, 19, 5), (0, 1, 4) | (1, 18, 4), (1, 19, 1). (0, 0, 3) |
| 2 | (1, 18, 5), (1, 19, 2), (1, 19, 6), (0, 1, 5) | (1, 18, 5), (1, 19, 2), (0, 1, 4) |
| 3 | (1, 18, 6), (1, 19, 3), (0, 0, 3), (0, 1, 6) | (1, 19, 3), (1, 19, 4), (0, 1, 5) |

TABLE 1B

Slot and symbol number pairs for repetition of PBCH for frame structure type 2.

| | Slot and symbol number pairs (n'$_s$, l') | |
|---|---|---|
| l | Normal cyclic prefix | Extended cyclic prefix |
| 0 | (0, 3), (1, 4), (10, 3), (11, 0), (11, 4) | (0, 3), (10, 3), (11, 0) |
| 1 | (0, 4), (1, 5), (10, 4), (11, 1), (11, 5) | (0, 4), (10, 4), (11, 1) |
| 2 | (0, 5), (10, 5), (11, 2) | (0, 5), (10, 5), (11, 2) |
| 3 | (0, 6), (10, 6), (11, 3) | (1, 4), (11, 3), (11, 4) |

One of the fundamental requirements in an operation of a communication system is a capability for a UE to request a connection setup; such request is commonly referred to as random access (RA). RA is used for several purposes including initial access when establishing a radio link, re-establishing a radio link after radio-link failure, handover when UL synchronization needs to be established to a new cell, UL synchronization, UE positioning based on UL measurements, and as an SR if no dedicated SR resources are configured to a UE. Acquisition of UL timing by a serving eNB is one main objective of random access; when establishing an initial radio link, an RA process also serves for assigning a unique identity, referred to as cell radio network temporary identifier (C-RNTI), to a UE. An RA scheme can be either contention based (multiple UEs can use same resources) or contention-free (a dedicated resource is used by a UE).

Figure 17:
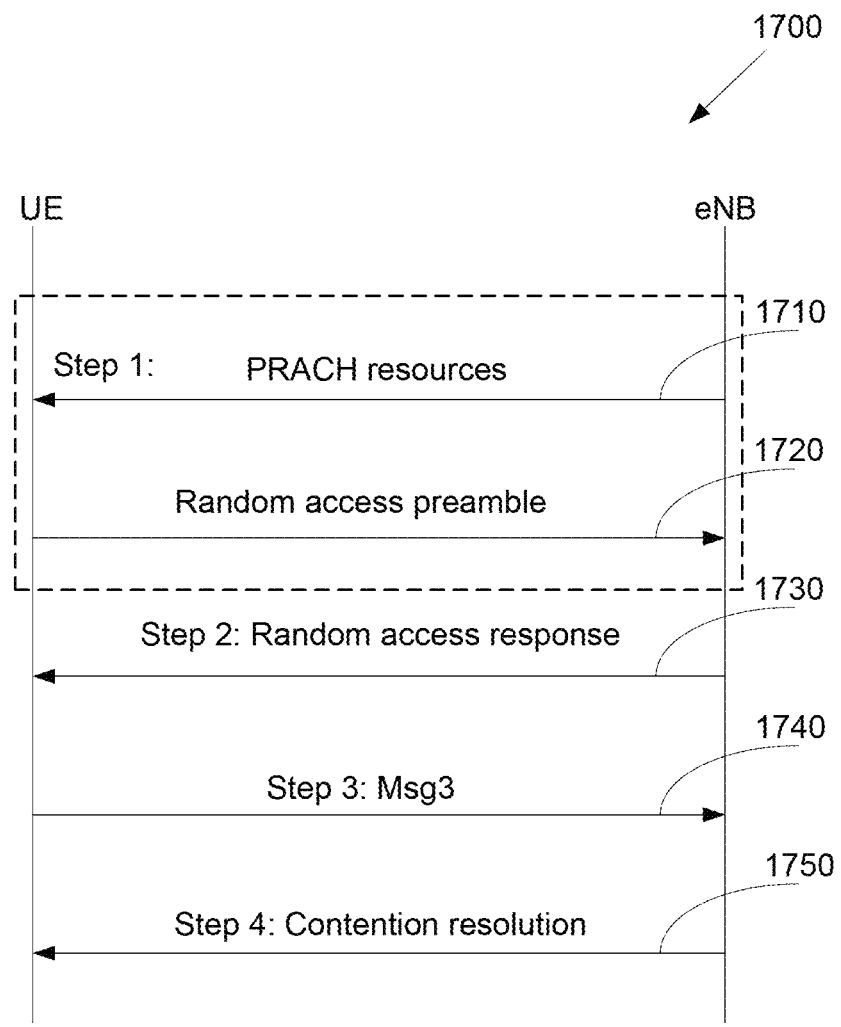
FIG. 17 illustrates an example steps for an RA process according to embodiments of the present disclosure.

FIG. 17 illustrates an example steps for an RA 1700 process according to embodiments of the present disclosure. The embodiment of the steps for an RA 1700 process illustrated in FIG. 17 is for illustration only. FIG. 17 does not limit the scope of this disclosure.

While the signaling diagram depicts a series of sequential signals, unless explicitly stated, no inference may be drawn from that sequence regarding specific order of performance, performance of signals (or steps) or portions thereof serially rather than concurrently or in an overlapping manner, or performance of the signals depicted exclusively without the occurrence of intervening or intermediate steps. The process in the example depicted is implemented by a transmitter chains and receiver chains in, for example, a UE or an eNB.

As shown in FIG. 17, in step 1, a UE acquires information of physical random access channel (PRACH) resources 1710 from an eNB and determines PRACH resources for a transmission of an RA preamble 1720 (also referred to as PRACH preamble). The RA preamble is transmitted according to an RA preamble format that the eNB indicates to the UE via SIB2. In step 2, the UE receives a random access response (RAR) 1730 from the eNB. In step 3, the UE transmits a Message 3 (Msg3) 1740 to the eNB. In step 4, the eNB and the UE perform contention resolution 1750 and a respective message is referred to as message 4 (Msg4).

Contention-free random access can only be used for reestablishing UL synchronization upon DL data arrival, handover, and positioning. Only step 1 and step 2 of the random access process in FIG. 17 are used as there is no need for contention resolution in a contention-free scheme where Step 2 can deliver C-RNTI instead of TC-RNTI In a TDD communication system, a communication direction in some SFs in a frame is in the DL and in some other SFs is in the UL. TABLE 2 provides indicative TDD UL/DL configurations over a period of a frame. In TABLE 2, "D" denotes a DL SF, "U" denotes an UL SF, and "S" denotes a special SF that includes a DL transmission field referred to as DwPTS, a guard period (GP), and an UL transmission field referred to as UpPTS. Several combinations exist for the duration of each field in a special SF subject to a condition that a total duration is one SF (1 msec).

TABLE 2

TDD UL/DL configurations

| TDD UL/DL Con-figuration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 3 provides a special SF configuration in terms of a number of symbols for DwPTS, GP, and UpPTS.

TABLE 3

TDD special SF configurations

| DwPTS | 12 | 11 | 10 | 9 | 6 | 3 |
|---|---|---|---|---|---|---|
| GP | 1 | 1 | 2 | 2 | 3 | 3 | 4 | 6 | 9 | 10 |
| UpPTS | 1 | 2 | 1 | 2 | 2 | 2 | 1 | 2 | 2 | 1 |

The TDD UL/DL configurations in TABLE 2 provide 40% and 90% of DL SFs per frame. Despite this flexibility, a semi-static TDD UL/DL configuration that can be updated every 640 msec or less frequently by system information (SI) signaling may not match well with short term data traffic conditions. For this reason, faster adaptation of a TDD UL/DL configuration is considered to improve system throughput especially for a low or moderate number of connected UEs. For example, when there is more DL traffic than UL traffic, the TDD UL/DL configuration may be adapted to include more DL SFs.

Signaling for faster adaptation of a TDD UL-DL configuration can be provided by several means including a PDCCH, medium access control (MAC) signaling, and RRC signaling. An operating constraint in an adaptation of a TDD UL/DL configuration by means other than SI signaling is an existence of UEs that cannot be aware of such adaptation. Since UEs perform measurements in DL SFs of the UL/DL configuration indicated by SI, such DL SF cannot be changed to UL SFs or to special SFs by a faster adaptation of a TDD UL/DL configuration. However, an UL SF can be changed to a DL SF as an eNB can ensure that UEs that are not aware of an adapted UL/DL configuration do not transmit any signals in such UL SFs.

A DL SF can be a unicast SF or it can be a multicast-broadcast single frequency network (MBSFN) SF. Each DL SF (including the DwPTS of a special SF in case of TDD) is typically divided into a control region, consisting of first few SF symbols, and a data region consisting of a remaining SF symbols. A unicast DL SF has a control region of 1, 2, or 3 symbols (or 2, 3, or 4 symbols for small DL operating bandwidths) while an MBSFN SF has a unicast control region of one or two SF symbols followed by an MBSFN region having contents that depend on a usage type for the MBSFN SF. Information about a set of SFs configured as MBSFN SFs in a cell is provided as part of the system information.

In principle, an arbitrary pattern of MBSFN SFs can be configured with a pattern repeating after 40 msec. However, SFs where information necessary to operate a network (specifically, synchronization signals, system information, and paging) needs to be transmitted cannot be configured as MBSFN SFs. Therefore, SF#0, SF#4, SF#5, and SF#9 for FDD and SF#0, SF#1, SF#5, and SF#6 for TDD are unicast SFs and cannot be configured as MBSFN SFs.

In time domain multiplexing (TDM) for inter-cell Interference Coordination (ICIC), other than regular SFs, another type of SF, referred to as almost blank SF (ABS), can be used in order to mitigate inter-cell interference. In ABS, a cell may assume that an interfering cell does not transmit signaling in all SF symbols other than the first symbol. Compared to a regular SF, a transmission power from an interfering cell in an ABS can be considerably reduced. In order to obtain performance benefits from TDM-ICIC, an eNB scheduler uses ABS patterns at interfering transmitting nodes in order to perform a link adaptation.

In FDD, an ABS pattern is periodic with a period that is an integer multiple of 40 SFs (4 frames). In TDD, the ABS pattern period depends on a respective TDD UL-DL configuration. ABS patterns are configured and signaled between nodes over an X2 interface or via a HeNB gateway if an X2 interface is not available. Since a period of an ABS pattern is an integer multiple of 40 msec, X2 signaling uses a bit-map of a same length as the ABS pattern.

Machine-type communications (MTC) through cellular networks is emerging as a significant opportunity for new applications in a networked world where devices communicate with humans and with each other. Compared to typical human communication, MTC typically has relaxed latency and quality of service (QoS) requirements and often does not require mobility support. MTC can be used for a wide variety of applications in different sectors including healthcare, such as monitors, industrial, such as safety and security, energy, such as meters and turbines, transport, such as fleet management and tolls, and consumer and home, such as appliances and power systems.

An important requirement for commercial success of MTC is for respective UEs to have low power consumption and a significantly lower cost than conventional UEs serving human communications. Cost reduction for low cost UEs (LC-UEs) relative to conventional UEs can be achieved, among other simplifications, by constraining a transmission BW and a reception BW to a small value, such as 6 RBs, of an UL system BW or a DL system BW, respectively, by reducing a size of a data. TB an LC-UE transmit or receive, or by implementing one receiver antenna instead of the two receiver antennas that are implemented for conventional UEs.

LC-UEs can be installed in basements of residential buildings or, generally, in locations where an LC-UE experiences a large path-loss loss and poor coverage due to a low signal to noise and interference ratio (SINR). LC-UE design selections of one receiver antenna and reduced maximum power amplifier gain can also result to coverage loss even when an LC-UE does not experience a large path-loss. Due to such reasons, an LC-UE can require operation with enhanced coverage. In extreme poor coverage scenarios, LC-UEs may have characteristics such as very low data rate, greater delay tolerance, and limited mobility, thereby potentially being capable to operate without some messages/channels. Not all LC-UEs require coverage enhancement (CE) or require a same amount of CE. In addition, in different deployment scenarios, a required CE level can be different for different eNBs, for example depending on an eNB transmission power or an associated cell size or number of receiver antennas, as well as for different LC-UEs, for example depending on a location of an LC-UE.

A conventional way to support CE is to repeat transmissions of channels either in a time domain or in a frequency domain. An LC-UE operating with CE can be configured by a serving ENB with one or more CE levels corresponding to a number of SFs for transmission or reception of a respective channel. For example, an LC-UE can be configured by an eNB a first number of SFs to receive repetitions of a PDSCH, a second number of SFs to transmit repetitions of a PUSCH, and so on. A DL control channel for an LC-UE is assumed to be based on the EPDCCH structure and may be referred to as M-PDCCH.

In order to minimize a number of SFs that an LC-UE needs to receive a PDSCH or an M-PDCCH, respective transmissions can be over all RBs the LC-UE can receive in a SF, such as in a sub-band of 6 contiguous RBs, as the eNB is assumed to not be power limited. Conversely, as an LC-UE configured to transmit an UL channel with repetitions is assumed to already transmit with a maximum power then, in order to maximize the power spectral density, the LC-UE can transmit in 1 RB in a SF.

Further, in order to improve frequency diversity for a transmission, frequency hopping can apply where, for example, a first number of repetitions for the transmission are in a first sub-band and a second number of repetitions for the transmission is in a second sub-band. As the sub-bands can correspond to different sets of 6 contiguous RBs, transmission with frequency hopping requires an LC-UE to re-tune its Radio-Frequency (RF) to each respective sub-band and this re-tuning introduces a delay that can range from a fraction of a SF symbol to one SF, depending on the implementation. During a RF re-tuning period, an LC-UE is not expected to be capable of transmitting or receiving.

Transmissions of physical channels with repetitions from an LC-UE can result to collisions with signals transmitted from conventional UEs, such as SRS, that can be configured to occur periodically and substantially span an UL system BW. Such collisions can destroy a structure of a signal transmission from an LC-UE and result to wasteful transmissions that unnecessarily consume UL BW and power.

Transmissions of physical channels with repetitions to or from LC-UEs need to also avoid SFs where they can introduce interference to other transmissions or be subject to interference from other transmissions. For example, DL transmissions to an LC-UE may be avoided in UL SFs of a TDD system or in ABS or MBSFN SFs. Therefore, there is a need to enable repetitions for an MIB transmission to LC-UEs and for LC-UEs to determine whether CE is supported by a serving eNB.

There is another need to determine SFs for a SIB transmission to LC-UEs. There is another need to support coexistence between repetitions for a channel transmission from an LC-UE and of SRS transmissions from conventional UEs. Finally, there is another need to support repetitions for a channel transmission from or to an LC-UE in a TDD system applying an adapted UL/DL configuration that is unknown to the LC-UE.

In the following, although the embodiments are described with reference to BL/CE-UEs, they can also apply for conventional UEs that require repetitions of a DL channel or an UL channel transmission for CE. Conventional UEs can receive over the whole DL system BW and do not require that repetitions of a DL channel or of an UL channel transmission in different sub-bands are in different sub-frames and do not need to have a same sub-band size as BL/CE-UEs. M-PDCCH or PDSCH transmission to a BL/CE-UE and PUCCH or PUSCH transmissions from a BL/CE-UE are assumed to be with repetitions in a number of subframes.

An MIB for an LC-UEs is referred to as LC-MIB as it can utilize spare bits of an existing MIB to provide scheduling information for an LC-SIB-1 transmission. As an LC-UE is not aware of the UL/DL configuration in case of a TDD system or, in general, of ABS or MBSFN SFs when the LC-UE needs to detect the LC-MIB, an LC-MIB transmission needs to occur only in SFs that are guaranteed to be DL SFs regardless of the UL/DL configuration or of the presence of ABS or MBSFN SFs. For LC-MIB transmission, an LC-UE can assume that a conventional DL control region spans 3 SF symbols. This represents a maximum number of SF symbols for the conventional DL control region for all DL system BWs except for small DL system BWs. However, for small DL system BWs, as only limited DL scheduling (if any) can exist in SFs with LC-MIB transmission, 3 SF symbols are adequate for the conventional DL control region without imposing adverse scheduling restrictions.

SF#0 includes the legacy PBCH (4 symbols for MIB transmission) for conventional UEs and it can also include transmission of legacy PSS and SSS for a FDD system. Then, after also excluding SF symbols for the conventional DL control region, remaining SF symbols in the middle 6 RBs are few (7 SF symbols in TDD, 5 SF symbols in FDD), and the middle 6 RBs cannot be efficiently used for PDSCH or PDCCH or M-PDCCH transmissions.

Figure 18A:
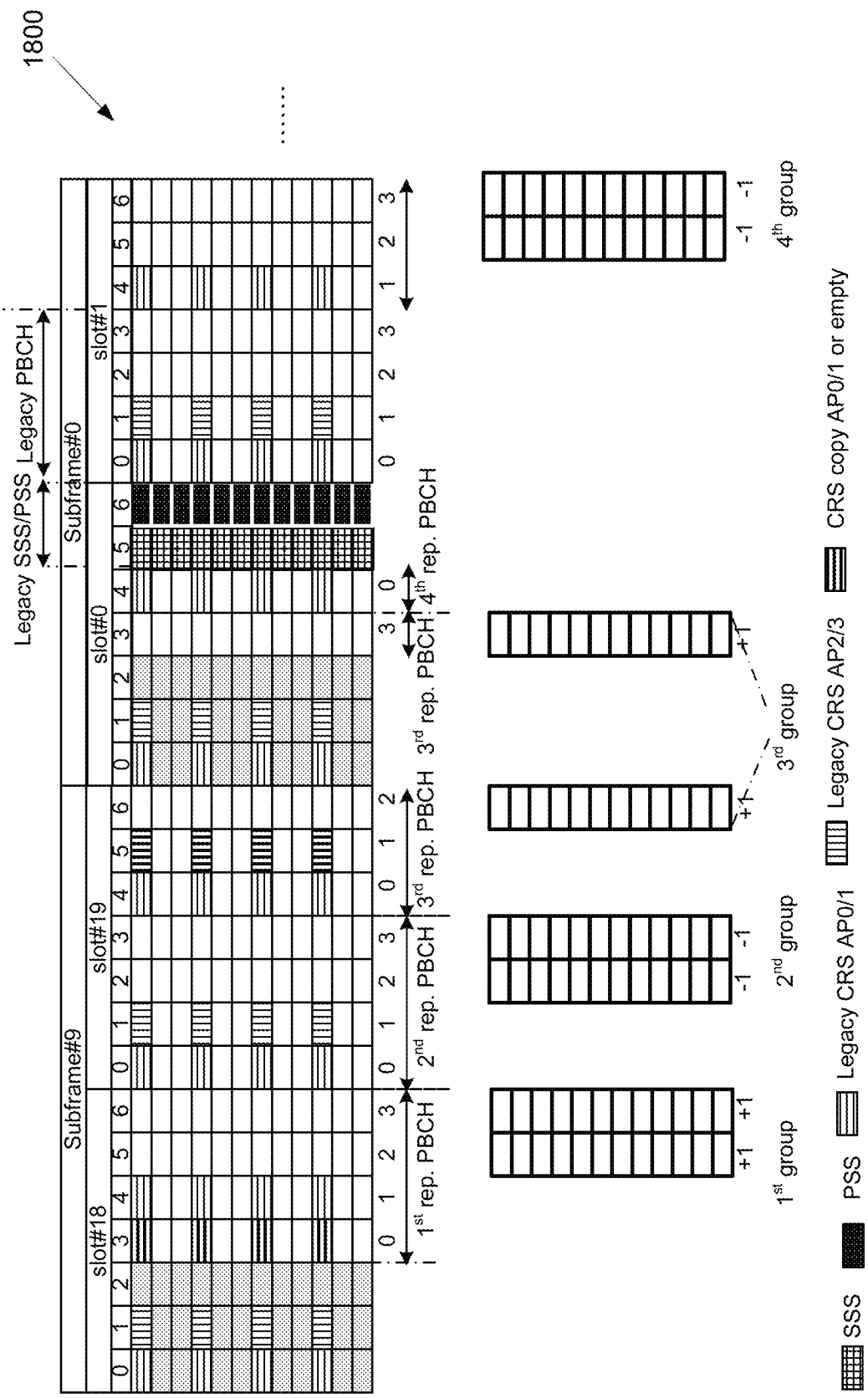
FIG. 18A illustrates an example transmission of an LC-MIB according to embodiments of the present disclosure.

In some embodiments of component V for a transmission and reception of synchronization signals for FDD FIG. 18A illustrates an example transmission of an LC-MIB 1800 according to embodiments of the present disclosure. The embodiment of the transmission of an LC-MIB 1800 illustrated in FIG. 18A is for illustration only. FIG. 18A does not limit the scope of this disclosure.

Figure 18B:
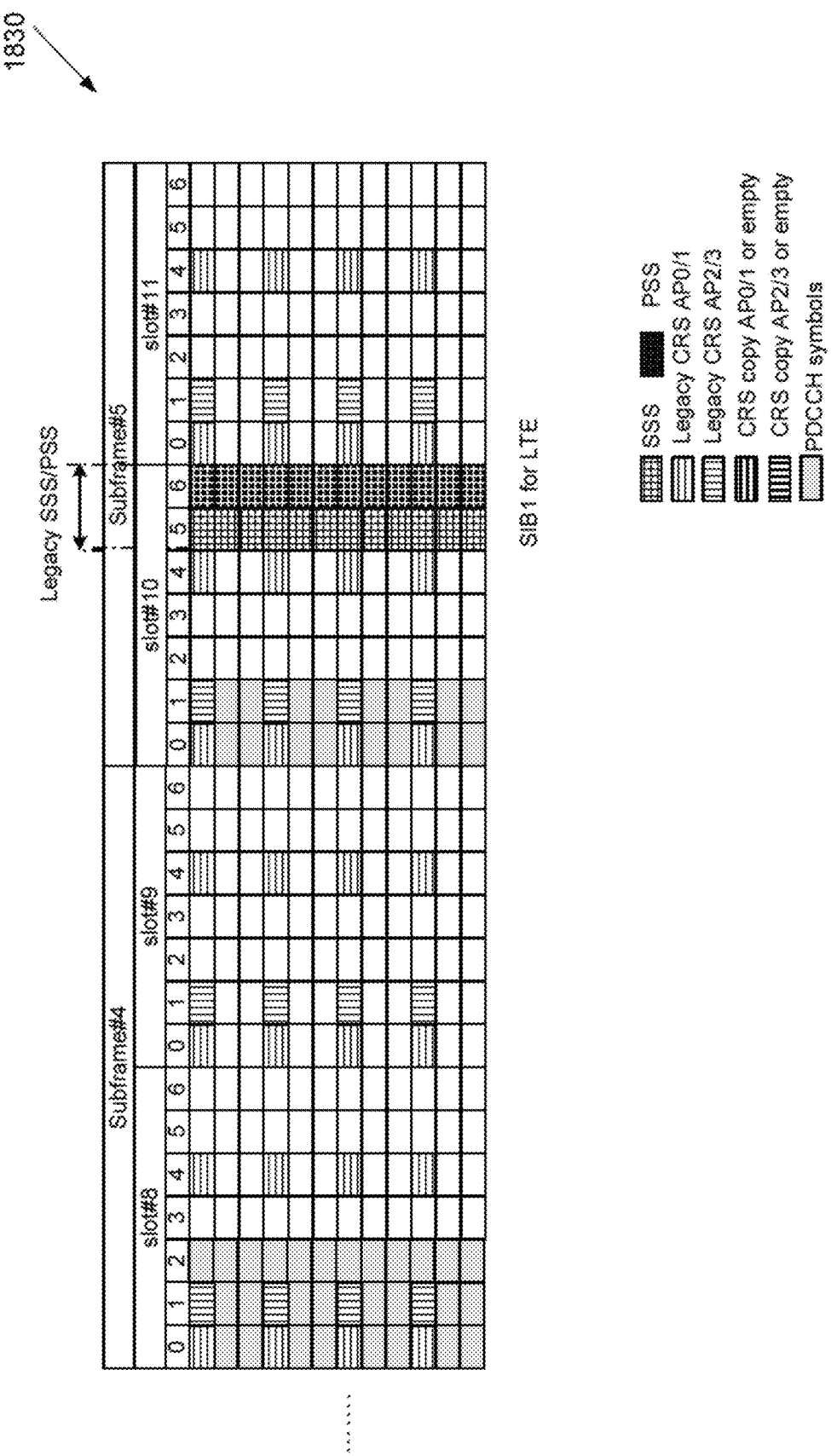
FIG. 18B illustrates another example transmission of an LC-MIB according to embodiments of the present disclosure.

FIG. 18B illustrates another example transmission of an LC-MIB 1830 according to embodiments of the present disclosure. The embodiment of the transmission of an LC-MIB 1830 illustrated in FIG. 18B is for illustration only. FIG. 18B does not limit the scope of this disclosure.

FIGS. 18A and 18B illustrate a transmission of an LC-MIB with repetitions continuously in SF#0 and intermittently in SF#5 in a FDD system with a frame structure using normal CP. The MIB repetitions for LC-MIB with $1^{st}$, $2^{nd}$, $3^{rd}$ and $4^{th}$ PBCH repeated symbols are also shown in FIGS. 18A and 18B. The SF#9 (subframe#9) includes the $1^{st}$ and $2^{nd}$ PBCH repetition and part of $3^{rd}$ PBH repetition and the SF#0 includes the remaining of $3^{rd}$ PBCH and the $4^{th}$ PBCH repetition. Among the 4 symbols in each PBCH repetition, the $0^{th}$ PBCH symbol and $1^{st}$ PBCH symbol in each PBCH repetition including the CRS REs cannot be overlapped with additional signals, which may be used for legacy MTC UEs as well as other non-MTC UEs for cell-specific channel estimation and RRM measurement. The $2^{nd}$ PBCH symbol and $3^{rd}$ PBCH symbol in each PBCH repetition can be used to transmit additional sync signals, such as enhanced PSS and/or enhanced SSS (ePSS and/or eSSS). The $2^{nd}$ PBCH symbol and $3^{rd}$ PBCH symbol in each PBCH repetition with similar channel variation are defined as a symbol group.

There are 4 symbol groups illustrated in FIGS. 18A and 18B. Except the symbol group, the two symbols in other groups are adjacent symbols. Each symbol group may be used to send repeated ePSS/eSSS and the symbol groups are group-multiplexed with orthogonal cover codes (OCC) such $\{+1, -1\}$. The symbol group locations can neither overlap with CRS nor overlapped with PDCCH. The symbol group locations are not overlapped with the legacy PSS/SSS/PBCH to avoid any impact on the non-MTC UEs.

For example, $1^{st}$ symbol group with the frame offset, slot and symbol number triplets (i,n'$_s$,l') as (1, 18, 5) and (1, 18, 6); $2^{nd}$ symbol group with the frame offset, slot and symbol number triplets (i,n'$_s$,l') as (1, 19, 2) and (1, 19, 3); $3^{rd}$ symbol group with the frame offset, slot and symbol number triplets (i,n'$_s$,l') as (1, 19, 6) and (0, 0, 3); $4^{th}$ symbol group with the frame offset, slot and symbol number triplets (i,n'$_s$,l') as (0, 1, 5) and (0, 1, 6). In one sub-embodiment, ePSS in $1^{st}$, $2^{nd}$ $3^{rd}$ and $4^{th}$ symbol groups multiplexed with $\{+1, -1, +1, -1\}$ OCC is repeated, respectively.

The ePSS sequence length can be same as that of legacy PSS sequence. A special case is to use the Zadoff-Chu (ZC) sequence with length of 63 and root of 38, which is conjugate of ZC sequence PSS with root of 25. Another example is to use a longer sequence for ePSS with 2 times that of legacy PSS to achieve better correlation characteristics. The longer sequence is mapped into two symbols within a symbol group. To combine the $2^{nd}$ PBCH symbol and $3^{rd}$ PBCH symbol in the 4-time PBCH repetitions respectively (symbol-level combining) can cancel the interference of the overlapped additional ePSS symbol due to the OCC. For ePSS detection, the MTC UEs may first de-scramble the OCC for each symbol group and combine the ePSS signals. The PBCH signals are orthogonal to the ePSS signals.

In another sub-embodiment, eSSS in $1^{st}$, $2^{nd}$, $3^{rd}$ and $4^{th}$ symbol groups multiplexed with $\{+1, -1, +1, -1\}$ OCC is repeated, respectively. eSSS sequence can be same as legacy SSS sequence. In one example, a longer sequence for eSSS with 2 times that of legacy SSS to achieve better correlation characteristics is considered. The longer sequence is mapped into two symbols within a symbol group. To combine the $2^{nd}$ PBCH symbol and $3^{rd}$ PBCH symbol in the 4-time PBCH repetitions respectively (symbol-level combining) can cancel the interference of the overlapped additional eSSS symbol due to the OCC. For eSSS detection, the MTC UEs may first de-scramble the OCC for each symbol group and combine the eSSS signals. The PBCH signals are orthogonal to the eSSS signals.

In another sub-embodiment, ePSS in $1^{st}$, $2^{nd}$ symbol group multiplexed with $\{+1, -1\}$OCC, respectively is considered, and eSSS in $3^{rd}$ and $4^{th}$ symbol groups multiplexed with $\{+1, -1\}$ is repeated. The ePSS sequence length can be same as that of legacy PSS sequence or a longer sequence for ePSS with 2 times that of legacy PSS to achieve better correlation characteristics. A special case is to use the Zadoff-Chu (ZC) sequence with length of 63 and root of 38, which is conjugate of ZC sequence PSS with root of 25. Similarly the eSSS sequence can be same as legacy SSS sequence or a longer sequence for eSSS with 2 times that of legacy SSS to achieve better correlation characteristics.

To combine the $2^{nd}$ PBCH symbol and $3^{rd}$ PBCH symbol in the 4-time PBCH repetitions respectively (symbol-level combining) can cancel the interference of the overlapped additional ePSS in $1^{st}$ and $2^{nd}$ symbol group as well as the eSSS in $3^{rd}$ and $4^{th}$ symbol group due to the OCC. For ePSS detection, the MTC UEs may first de-scramble the OCC for $1^{st}$ and $2^{nd}$ symbol group and combine the ePSS signals. For eSSS detection, the MTC UEs may first de-scramble the OCC for $3^{rd}$ and $4^{th}$ symbol group and combine the eSSS signals. The PBCH signals are orthogonal to the ePSS/eSSS signals. Note that the ePSS repetition and eSSS repetition can be applied separately. For example, only the ePSS in $1^{st}$, $2^{nd}$ symbol group multiplexed with $\{+1, -1\}$ OCC but no additional eSSS repetition on in $3^{rd}$ and $4^{th}$ symbol groups. For another example, only the eSSS in $3^{rd}$ and $4^{th}$ symbol group multiplexed with $\{+1, -1\}$ OCC but no additional ePSS repetition on in $1^{st}$, $2^{nd}$ symbol groups.

In another sub-embodiment, eSSS in $1^{st}$, $2^{nd}$ symbol group multiplexed with $\{+1, -1\}$OCC is repeated, respectively, and ePSS in $3^{rd}$ and $4^{th}$ symbol groups multiplexed with $\{+1, -1\}$ is repeated. The eSSS sequence can be same as legacy SSS sequence or a longer sequence for eSSS with 2 times that of legacy SSS to achieve better correlation characteristics. Similarly the ePSS sequence length can be same as that of a legacy PSS sequence or a longer sequence for ePSS with 2 times that of legacy PSS to achieve better correlation characteristics.

A special case is to use the Zadoff-Chu (ZC) sequence with length of 63 and root of 38, which is conjugate of ZC sequence PSS with root of 25. To combine the $2^{nd}$ PBCH symbol and $3^{rd}$ PBCH symbol in the 4-time PBCH repetitions respectively (symbol-level combining) can cancel the interference of the overlapped additional eSSS in $1^{st}$ and $2^{nd}$ symbol group as well as the ePSS in $3^{rd}$ and $4^{th}$ symbol group due to the OCC. For eSSS detection, the MTC UEs may first de-scramble the OCC for $1^{st}$ and $2^{nd}$ symbol group and combine the eSSS signals. For ePSS detection, the MTC UEs may first de-scramble the OCC for $3^{rd}$ and $4^{th}$ symbol group and combine the ePSS signals. The PBCH signals are orthogonal to the ePSS/eSSS signals.

Note that the eSSS repetition and ePSS repetition can be applied separately. For example, only the eSSS in $1^{st}$, $2^{nd}$ symbol group multiplexed with $\{+1, -1\}$ OCC but no additional ePSS repetition on in $3^{rd}$ and $4^{th}$ symbol groups. For another example, only the ePSS in $3^{rd}$ and $4^{th}$ symbol group multiplexed with $\{+1, -1\}$ OCC but no additional eSSS repetition on in $1^{st}$, $2^{nd}$ symbol groups.

In another sub-embodiment, ePSS in the 1st symbol of $1^{st}$, $2^{nd}$, $3^{rd}$ and $4^{th}$ symbol groups multiplexed with $\{+1, -1, +1, -1\}$ OCC is repeated, respectively. ePSS sequence length can be same as that of legacy PSS sequence. A special case is to use the Zadoff-Chu (ZC) sequence with length of 63 and root of 38, which is conjugate of ZC sequence PSS with root of 25. And eSSS in the $2^{nd}$ symbol of $1^{st}$, $2^{nd}$, $3^{rd}$ and $4^{th}$ symbol groups multiplexed with {+1, −1, +1, −1} OCC is repeated, respectively.

To combine the $2^{nd}$ PBCH symbol in the 4-time PBCH repetitions (symbol-level combining) can cancel the interference of the overlapped additional ePSS symbol due to the OCC. For ePSS detection, the MTC UEs may first de-scramble the OCC for each symbol group and combine the ePSS signals. The PBCH signals are orthogonal to the ePSS signals. To combine the $3^{rd}$ PBCH symbol in the 4-time PBCH repetitions (symbol-level combining) can cancel the interference of the overlapped additional eSSS symbol due to the OCC. For eSSS detection, the MTC UEs may first de-scramble the OCC for each symbol group and combine the eSSS signals. The PBCH signals are orthogonal to the eSSS signals. The ePSS and eSSS symbol can be shifted within each symbol group but all the symbol groups has same order of ePSS and eSSS.

Note that the similar concept can be extended for FDD frame structure with extended CP (ECP).

Figure 18C:
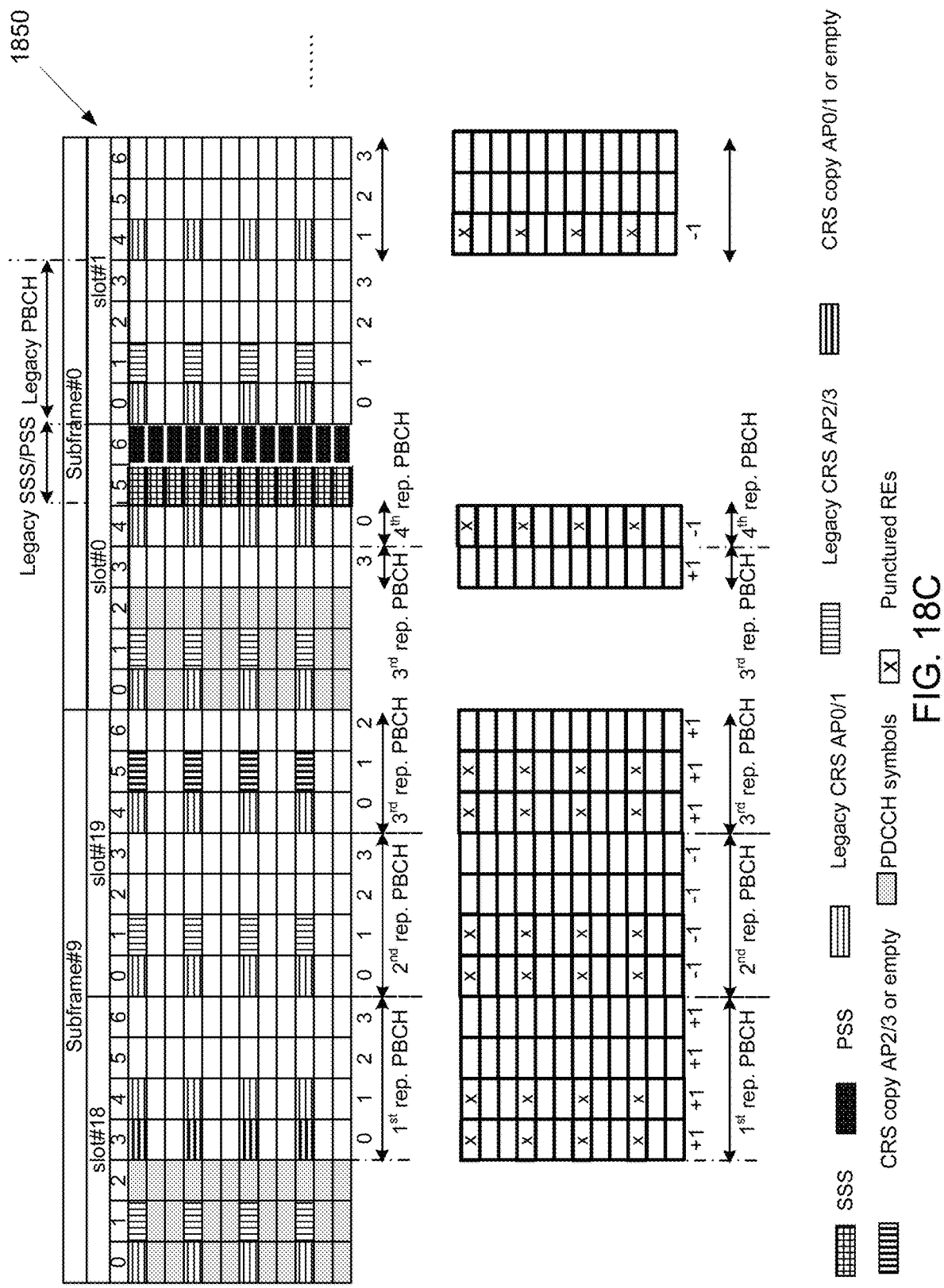
FIG. 18C illustrates yet another example transmission of an LC-MIB according to embodiments of the present disclosure.

FIG. 18C illustrates yet another example transmission of an LC-MIB 1850 according to embodiments of the present disclosure. The embodiment of the transmission of an LC-MIB 1850 illustrated in FIG. 18C is for illustration only. FIG. 18C does not limit the scope of this disclosure.

Figure 18D:
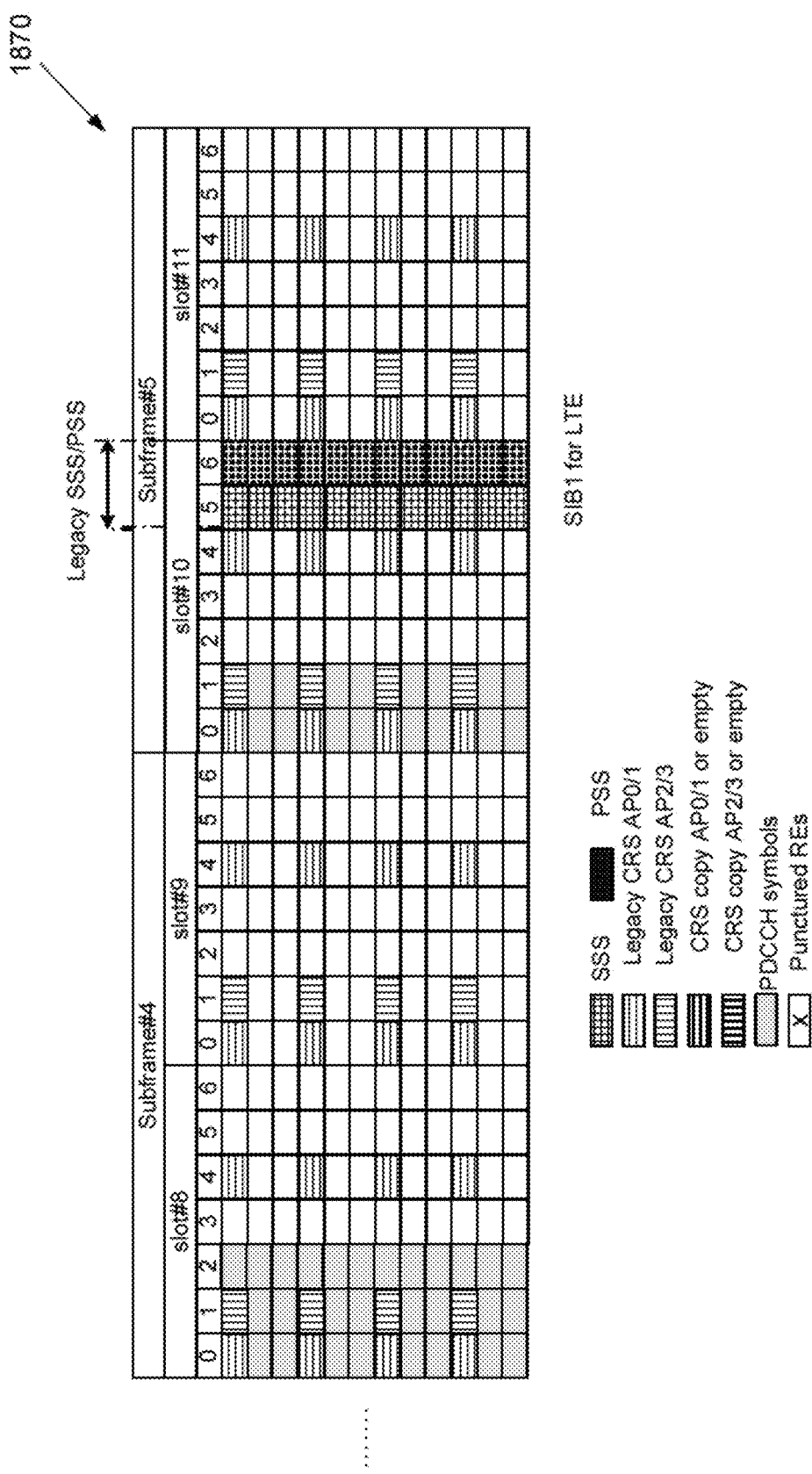
FIG. 18D illustrates yet another example transmission of an LC-MIB according to embodiments of the present disclosure.

FIG. 18D illustrates yet another example transmission of an LC-MIB 1870 according to embodiments of the present disclosure. The embodiment of the transmission of an LC-MIB 1870 illustrated in FIG. 18D is for illustration only. FIG. 18D does not limit the scope of this disclosure.

FIGS. 18C and 18D illustrate some other sub-embodiments of a transmission of an LC-MIB with repetitions continuously in SF#0 and intermittently in SF#5 in a FDD system with a frame structure using normal CP. The MIB repetitions for LC-MIB with $1^{st}$, $2^{nd}$, $3^{rd}$ and $4^{th}$ PBCH repeated symbols are also shown in FIGS. 18C and 18D. The SF#9 (subframe#9) includes the $1^{st}$ and $2^{nd}$ PBCH repetition and part of $3^{rd}$ PBH repetition and the SF#0 includes the remaining of $3^{rd}$ PBCH and the $4^{th}$ PBCH repetition. Among the 4 symbols in each PBCH repetition, the CRS REs or CRS copy REs in the $0^{th}$ PBCH symbol and $1^{st}$ PBCH symbol per PBCH repetition cannot be overlapped with additional signals, which may be used for legacy MTC UEs as well as other non-MTC UEs for cell-specific channel estimation and RRM measurement.

The corresponding REs in the $0^{th}$ and $1^{st}$ symbol per group overlapping with legacy CRS REs may be punctured to avoid the impact on CRS reception at the price of the correlation performance of additional signals, such as ePSS and/or eSSS. The symbols in each PBCH repetition with similar channel variation are defined as a symbol group. There are 4 symbols per group illustrated in FIGS. 18C and 18D. The $1^{st}$ and $2^{nd}$ symbol groups have consecutive symbols but the $3^{rd}$ and $4^{th}$ symbol groups have non-consecutive symbols. Each symbol group may be used to send repeated ePSS/eSSS and the symbol groups are group-multiplexed with orthogonal cover codes (OCC), such as {+1, −1, +1, −1}. Other orthogonal codes, e.g., P-matrix, Hadama codes, are also possible. The symbol group locations are neither overlapped with PDCCH, nor overlapped with the legacy PSS/SSS/PBCH to avoid any impact on the non-MTC UEs.

For example, 1st symbol group with the frame offset, slot and symbol number triplets (i,n'$_s$,l') as (1, 18, 3), (1, 18, 4), (1, 18, 5) and (1, 18, 6); $2^{nd}$ symbol group with the frame offset, slot and symbol number triplets (i,n'$_s$,l') as (1, 19, 0), (1, 19, 1), (1, 19, 2) and (1, 19, 3); $3^{rd}$ symbol group with the frame offset, slot and symbol number triplets (i,n'$_s$,l') as (1, 19, 4), (1, 19, 5), (1, 19, 6) and (0, 0, 3); and $4^{th}$ symbol group with the frame offset, slot and symbol number triplets (i,n'$_s$,l') as (0, 0, 4), (0, 1, 4), (0, 1, 5) and (0, 1, 6).

In one sub-embodiment, ePSS in the $2^{nd}$ and $3^{rd}$ symbols of $1^{st}$, $2^{nd}$, $3^{rd}$ and $4^{th}$ symbol groups multiplexed with cover codes, such as {+1, −1, +1, −1} OCC, is repeated, respectively. The ePSS location with the frame offset, slot and symbol number triplets (i,n'$_s$,l') are (1, 18, 5), (1, 18, 6), (1, 19, 2), (1, 19, 3), (1, 19, 6), (0, 0, 3), (0, 0, 4) and (0, 1, 4). To let UE differentiate ePSS and legacy PSS, a new sequence is designed for ePSS. The ePSS sequence length can be same as that of legacy PSS sequence. A special case is to use the Zadoff-Chu (ZC) sequence with length of 63 and root of 38, which is conjugate of ZC sequence PSS with root of 25.

Since ePSS on the symbols without CRS does not need puncturing in frequency domain, the time-domain sequence correlation with the ZC sequence conjugate with that of PSS is simple from implementation point of view. Or the ePSS is a longer sequence around 2 times that of legacy PSS. To combine the $2^{nd}$ and $3^{rd}$ PBCH symbols in the 4-time PBCH repetitions (symbol-level combining) can cancel the interference of the overlapped additional ePSS symbol due to the orthogonality of cover codes. For ePSS detection, the MTC UEs may firstly de-scramble the OCC for each symbol group and combine the ePSS signals.

The PBCH signals are orthogonal to the ePSS signals. In addition to ePSS repetition, the eSSS is repeated in the $0^{th}$ and $1^{st}$ symbols of $1^{st}$, $2^{nd}$, $3^{rd}$ and $4^{th}$ symbol groups multiplexed with {+1, −1, +1, −1} OCC, respectively. The eSSS location with the frame offset, slot and symbol number triplets (i,n'$_s$,l') are (1, 18, 3), (1, 18, 4), (1, 19, 0), (1, 19, 1), (1, 19, 4), (1, 19, 5), (0, 1, 5) and (0, 1, 6). The SSS sequence can be reused for eSSS. But eSSS on CRS REs needs puncturing in frequency domain. To combine the $0^{th}$ and $1^{st}$ PBCH symbol in the 4-time PBCH repetitions (symbol-level combining) can cancel the interference of the overlapped additional eSSS symbol due to the orthogonality of cover codes. For eSSS detection, the MTC UEs may first de-scramble the cover codes for each symbol group and combine the eSSS signals. The PBCH signals are orthogonal to the eSSS signals.

In another sub-embodiment, ePSS in the $0^{th}$ and $1^{st}$ symbols of $1^{st}$, $2^{nd}$, $3^{rd}$ and $4^{th}$ symbol groups multiplexed with cover codes, such as {+1, −1, +1, −1} OCC, is repeated, respectively. The ePSS location with the frame offset, slot and symbol number triplets (i,n'$_s$,l') are (1, 18, 3), (1, 18, 4), (1, 19, 0), (1, 19, 1), (1, 19, 4), (1, 19, 5), (0, 1, 5) and (0, 1, 6). The ePSS can be a short sequence with similar length of legacy PSS length. Or the ePSS is a longer sequence around 2 times that of legacy PSS. But ePSS on CRS REs needs puncturing in frequency domain. To combine the $0^{th}$ and $1^{st}$ PBCH symbols in the 4-time PBCH repetitions (symbol-level combining) can cancel the interference of the overlapped additional ePSS symbol due to the orthogonality of cover codes.

For ePSS detection, the MTC UEs may firstly de-scramble the OCC for each symbol group and combine the ePSS signals. The PBCH signals are orthogonal to the ePSS signals. In addition to ePSS repetition, the eSSS is repeated in the $2^{nd}$ and $3^{rd}$ symbols of $1^{st}$, $2^{nd}$, $3^{rd}$ and $4^{th}$ symbol groups multiplexed with {+1, −1, +1, −1} OCC, respectively. The eSSS location with the frame offset, slot and symbol number triplets (i,n'$_s$,l') are (1, 18, 5), (1, 18, 6), (1, 19, 2), (1, 19, 3), (1, 19, 6), (0, 0, 3), (0, 0, 4) and (0, 1, 4). The SSS sequence can be reused for eSSS.

To combine the $2^{nd}$ and $3^{rd}$ PBCH symbol in the 4-time PBCH repetitions (symbol-level combining) can cancel the interference of the overlapped additional eSSS symbol due to the orthogonality of cover codes. For eSSS detection, the MTC UEs may first de-scramble the cover codes for each symbol group and combine the eSSS signals. The PBCH signals are orthogonal to the eSSS signals.

In another sub-embodiment, ePSS in $1^{st}$, $2^{nd}$ symbol group multiplexed with cover code, such as {+1, −1} OCC, is repeated, respectively. And repeat eSSS in $3^{rd}$ and $4^{th}$ symbol groups multiplexed with {+1, −1}. The ePSS location with the frame offset, slot and symbol number triplets $(i, n'_s, l')$ are (1, 18, 3), (1, 18, 4), (1, 18, 5), (1, 18, 6), (1, 19, 0), (1, 19, 1), (1, 19, 2), and (1, 19, 3). The eSSS location with the frame offset, slot and symbol number triplets $(i, n'_s, l')$ are (1, 19, 4), (1, 19, 5), (1, 19, 6), (0, 0, 3), (0, 0, 4), (0, 1, 4), (0, 1, 5) and (0, 1, 6). The ePSS sequence can be symbol-level with similar length of legacy PSS sequence. Or the ePSS is a longer sequence with longer length around 2 or 4 times that of legacy PSS.). The SSS sequence can be reused for eSSS. But ePSS as well as eSSS on CRS REs needs puncturing in frequency domain.

For ePSS detection, the MTC UEs may first de-scramble the cover codes for $1^{st}$ and $2^{nd}$ symbol group and combine the ePSS signals. To combine the PBCH symbol with same symbol index in the 2-time PBCH repetitions respectively (symbol-level combining) can cancel the interference of the overlapped additional ePSS in $1^{st}$ and $2^{nd}$ symbol groups. Similar procedure as eSSS combining in the $3^{rd}$ and $4^{th}$ symbol group. Note that the ePSS repetition and eSSS repetition can also be applied separately. For example, only the ePSS in $1^{st}$, $2^{nd}$ symbol group multiplexed with {+1, −1} OCC but no additional eSSS repetition on in $3^{rd}$ and $4^{th}$ symbol groups. For another example, only the eSSS in $3^{rd}$ and $4^{th}$ symbol group multiplexed with {+1, −1} OCC but no additional ePSS repetition on in $1^{st}$, $2^{nd}$ symbol groups.

In another sub-embodiment, eSSS in $1^{st}$, $2^{nd}$ symbol group multiplexed with cover code, such as {+1, −1} OCC, is repeated, respectively. And repeat ePSS in $3^{rd}$ and $4^{th}$ symbol groups multiplexed with {+1, −1}. The eSSS location with the frame offset, slot and symbol number triplets $(i, n'_s, l')$ are (1, 18, 3), (1, 18, 4), (1, 18, 5), (1, 18, 6), (1, 19, 0), (1, 19, 1), (1, 19, 2), and (1, 19, 3). The ePSS location with the frame offset, slot and symbol number triplets $(i, n'_s, l')$ are (1, 19, 4), (1, 19, 5), (1, 19, 6), (0, 0, 3), (0, 0, 4), (0, 1, 4), (0, 1, 5) and (0, 1, 6).

The ePSS sequence can be symbol-level with similar length of legacy PSS sequence. Or the ePSS is a longer sequence with longer length around 2 or 4 times that of legacy PSS. The SSS sequence can be reused for eSSS. But ePSS as well as eSSS on CRS REs needs puncturing in frequency domain. For ePSS detection, the MTC UEs may first de-scramble the cover codes for $3^{rd}$ and $4^{th}$ symbol group and combine the ePSS signals.

To combine the PBCH symbol with same symbol index in the 2-time PBCH repetitions respectively (symbol-level combining) can cancel the interference of the overlapped additional ePSS in $3^{rd}$ and $4^{th}$ symbol groups. Similar procedure as eSSS combining in the $1^{st}$ and $2^{nd}$ symbol group. Note that the ePSS repetition and eSSS repetition can also be applied separately. For example, only the eSSS in $1^{st}$, $2^{nd}$ symbol group multiplexed with {+1, −1} OCC but no additional ePSS repetition on in in $3^{rd}$ and $4^{th}$ symbol groups. For another example, only the ePSS in $3^{rd}$ and $4^{th}$ symbol group multiplexed with {+1, −1} OCC but no additional eSSS repetition on in $1^{st}$, $2^{nd}$ symbol groups.

In another sub-embodiment, ePSS in $1^{st}$, $2^{nd}$, $3^{rd}$ and $4^{th}$ symbol groups multiplexed with cover code, such as {+1, −1, +1, −1} OCC, is repeated, respectively. ePSS sequence length can be symbol-level with similar length as that of legacy PSS. A special case is to use the Zadoff-Chu (ZC) sequence with length of 63 and root of 38, which is conjugate of ZC sequence PSS with root of 25. Or the ePSS is a longer sequence with longer length around 2-4 times that of legacy PSS. But ePSS on CRS REs needs puncturing in frequency domain.

To combine the PBCH symbol with same symbol index in the 4-time PBCH repetitions respectively (symbol-level combining) can cancel the interference of the overlapped additional ePSS symbol due to the orthogonality of cover codes. For ePSS detection, the MTC UEs may first de-scramble the cover codes for each symbol group and combine the ePSS signals. The PBCH signals are orthogonal to the ePSS signals.

In another sub-embodiment, repeat eSSS in $1^{st}$, $2^{nd}$, $3^{rd}$ and $4^{th}$ symbol groups multiplexed with cover code, such as {+1, −1, +1, −1} OCC, is repeated, respectively. SSS can be simply reused for eSSS. But eSSS on CRS REs needs puncturing in frequency domain. To combine the PBCH symbol with same symbol index in the 4-time PBCH repetitions respectively (symbol-level combining) can cancel the interference of the overlapped additional eSSS symbol due to the orthogonality of cover codes. For eSSS detection, the MTC UEs may first de-scramble the cover codes for each symbol group and combine the eSSS signals. The PBCH signals are orthogonal to the eSSS signals.

Note that the similar concept can be extended for FDD frame structure with extended CP (ECP). Also note that the other orthogonal cover codes are not precoded, such as the binary cover codes in the Hadamard matrix, or the complex cover codes in the P-matrix.

In some embodiments of component VI, a transmission and reception of synchronization signals for TDD is considered.

Figure 19A:
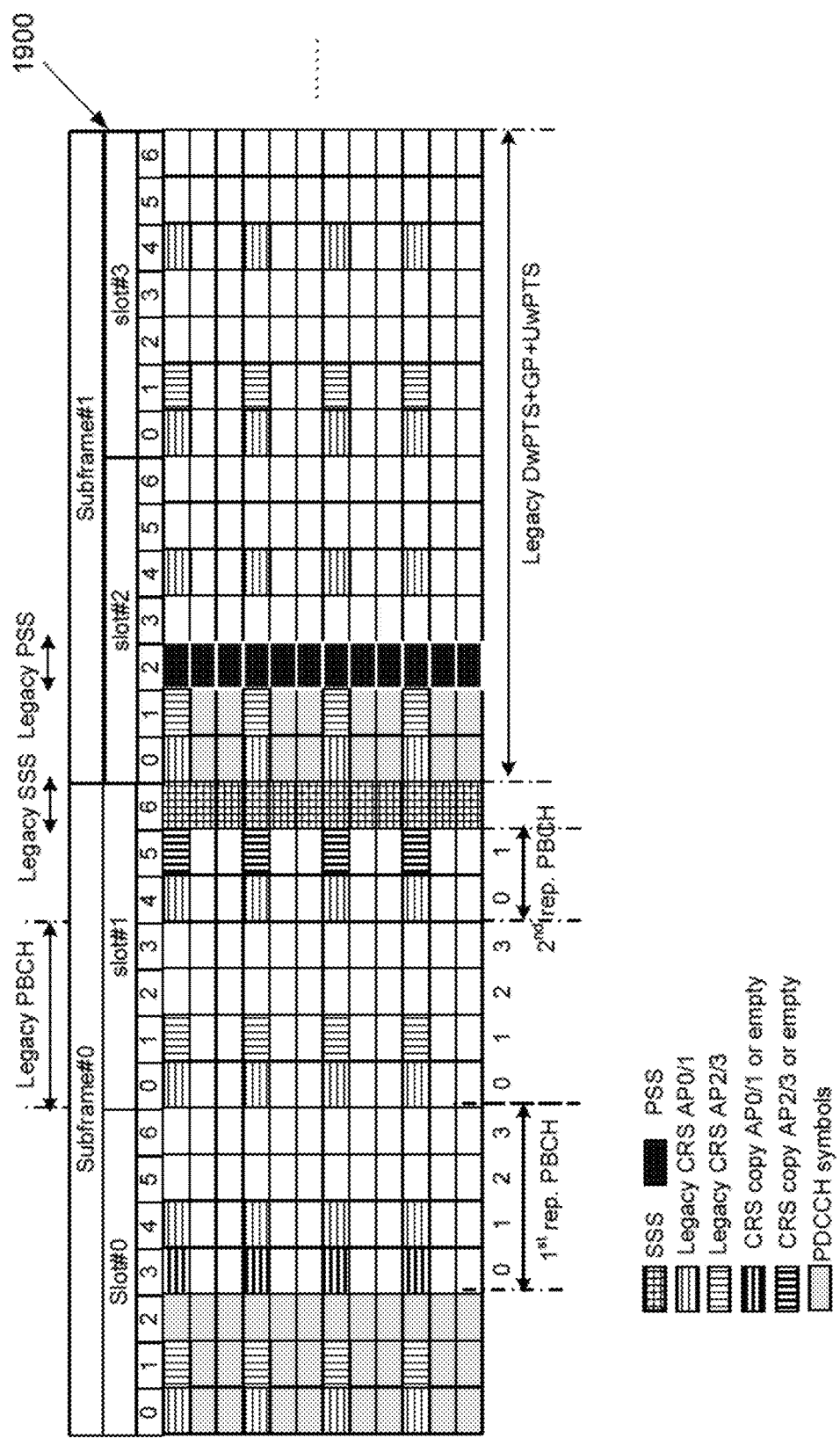
FIG. 19A illustrates yet another example transmission of an LC-MIB according to embodiments of the present disclosure.

FIG. 19A illustrates yet another example transmission of an LC-MIB 1900 according to embodiments of the present disclosure. The embodiment of the transmission of an LC-MIB 1900 illustrated in FIG. 19A is for illustration only. FIG. 19A does not limit the scope of this disclosure.

Figure 19B:
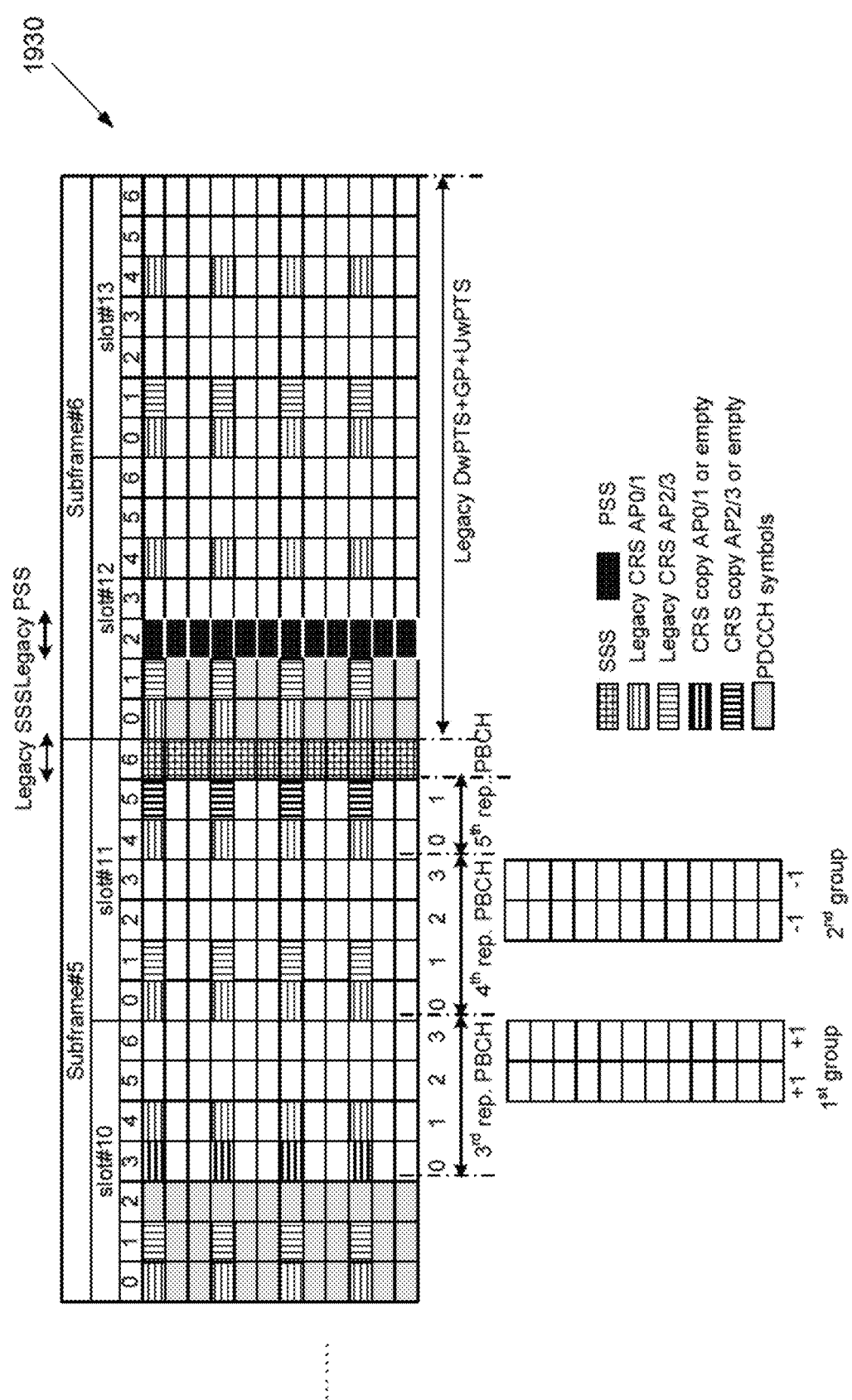
FIG. 19B illustrates yet another example transmission of an LC-MIB according to embodiments of the present disclosure.

FIG. 19B illustrates yet another example transmission of an LC-MIB 1930 according to embodiments of the present disclosure. The embodiment of the transmission of an LC-MIB 1930 illustrated in FIG. 19B is for illustration only. FIG. 19B does not limit the scope of this disclosure.

FIGS. 19A and 19B illustrate a transmission of an LC-MIB with repetitions continuously in SF#0 and intermittently in SF#5 in a TDD system with a frame structure using normal CP. The MIB repetitions for LC-MIB with $1^{st}$, $2^{nd}$, $3^{rd}$, $4^{th}$ and $5^{th}$ PBCH repeated symbols are also shown in FIGS. 19A and 19B. But only the $1^{st}$, $3^{rd}$ and $4^{th}$ PBCH repetitions include the $2^{nd}$ and $3^{rd}$ PBCH symbols. The SF#0 (subframe#0) includes the $1^{st}$ PBCH repetition and the SF#5 includes the $3^{rd}$ PBCH repetition the $4^{th}$ PBCH repetition. Among the 4 symbols in each PBCH repetition, the $0^{th}$ PBCH symbol and $1^{st}$ PBCH symbol in each PBCH repetition including the CRS REs cannot be overlapped with additional signals, which may be used for legacy MTC UEs as well as other non-MTC UEs for cell-specific channel estimation and RRM measurement. The remaining $2^{nd}$ PBCH symbol and $3^{rd}$ PBCH symbol in a PBCH repetition can be used to transmit additional sync signals, such as enhanced PSS and/or enhanced SSS (ePSS and/or eSSS).

The $2^{nd}$ PBCH symbol and $3^{rd}$ PBCH symbol in each PBCH repetition with similar channel variation are defined as a symbol group. There are 2 symbol groups illustrated in FIGS. 19A and 19B. The two symbols in other groups are adjacent symbols. Each symbol group may be used to send repeated ePSS/eSSS and the symbol groups are group-multiplexed with orthogonal cover codes (OCC), such as $\{+1, -1\}$. The symbol group locations can neither overlap with CRS nor overlapped with PDCCH. The symbol group locations are not overlapped with the legacy PSS/SSS/PBCH to avoid any impact on the non-MTC UEs.

For example, $1^{st}$ symbol group with the slot and symbol number triplets (i,n'$_s$,l') with i=0 as (10, 5) and (10, 6); $2^{nd}$ symbol group with the slot and symbol number triplets (i,n'$_s$,l') with i=0 as (11, 2) and (11, 3); One embodiment is to repeat ePSS in $1^{st}$ and $2^{nd}$ symbol groups multiplexed with $\{+1, -1\}$ OCC, respectively. ePSS sequence can be same as legacy PSS sequence. In one example, a longer sequence for ePSS with 2 times that of legacy PSS to achieve better correlation characteristics is considered. The longer sequence is mapped into two symbols within a symbol group. To combine the $2^{nd}$ PBCH symbol and $3^{rd}$ PBCH symbol in the 2-time PBCH repetitions respectively (symbol-level combining) can cancel the interference of the overlapped additional ePSS symbol due to the OCC. For ePSS detection, the MTC UEs may first de-scramble the OCC for each symbol group and combine the ePSS signals. The PBCH signals are orthogonal to the eSSS signals.

In another embodiment, eSSS in $1^{st}$ and $2^{nd}$ symbol groups multiplexed with $\{+1, -1\}$OCC, is repeated, respectively. eSSS sequence can be same as legacy SSS sequence. Another example is to a longer sequence for eSSS with 2 times that of legacy SSS to achieve better correlation characteristics. The longer sequence is mapped into two symbols within a symbol group. To combine the $2^{nd}$ PBCH symbol and $3^{rd}$ PBCH symbol in the 2-time PBCH repetitions respectively (symbol-level combining) can cancel the interference of the overlapped additional eSSS symbol due to the OCC. For eSSS detection, the MTC UEs may first de-scramble the OCC for each symbol group and combine the eSSS signals. The PBCH signals are orthogonal to the eSSS signals.

In another embodiment, ePSS in the $1^{st}$ symbol of $1^{st}$ and $2^{nd}$ symbol groups multiplexed with $\{+1, -1\}$ OCC, is repeated, respectively. ePSS sequence can be same as legacy PSS sequence. And repeat eSSS in the $2^{nd}$ symbol of $1^{st}$ and $2^{nd}$ symbol groups multiplexed with $\{+1, -1\}$ OCC, respectively. ePSS sequence can be same as legacy PSS sequence. To combine the $2^{nd}$ PBCH symbol in the 2-time PBCH repetitions (symbol-level combining) can cancel the interference of the overlapped additional ePSS symbol due to the OCC. For ePSS detection, the MTC UEs may first de-scramble the OCC for each symbol group and combine the ePSS signals. The PBCH signals are orthogonal to the ePSS signals.

To combine the $3^{rd}$ PBCH symbol in the 2-time PBCH repetitions (symbol-level combining) can cancel the interference of the overlapped additional eSSS symbol due to the OCC. For eSSS detection, the MTC UEs may first de-scramble the OCC for each symbol group and combine the eSSS signals. The PBCH signals are orthogonal to the eSSS signals. The ePSS and eSSS symbol can be shifted within each symbol group but all the symbol groups has same order of ePSS and eSSS. Note that the similar concept can be extended for TDD frame structure with extended CP (ECP).

Figure 19C:
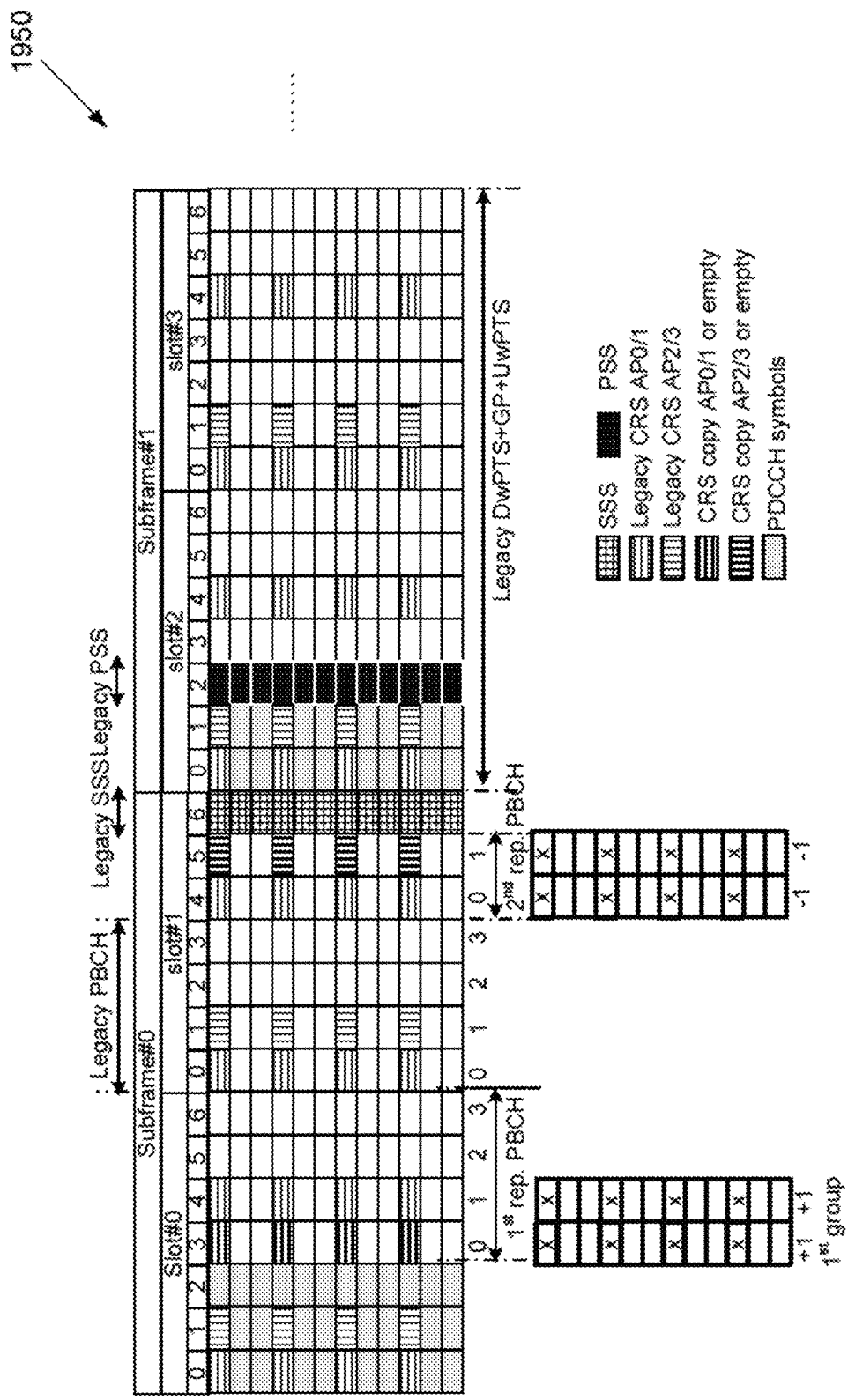
FIG. 19C illustrates yet another example transmission of an LC-MIB according to embodiments of the present disclosure.

FIG. 19C illustrates yet another example transmission of an LC-MIB 1950 according to embodiments of the present disclosure. The embodiment of the transmission of an LC-MIB 1950 illustrated in FIG. 19C is for illustration only. FIG. 19C does not limit the scope of this disclosure.

Figure 19D:
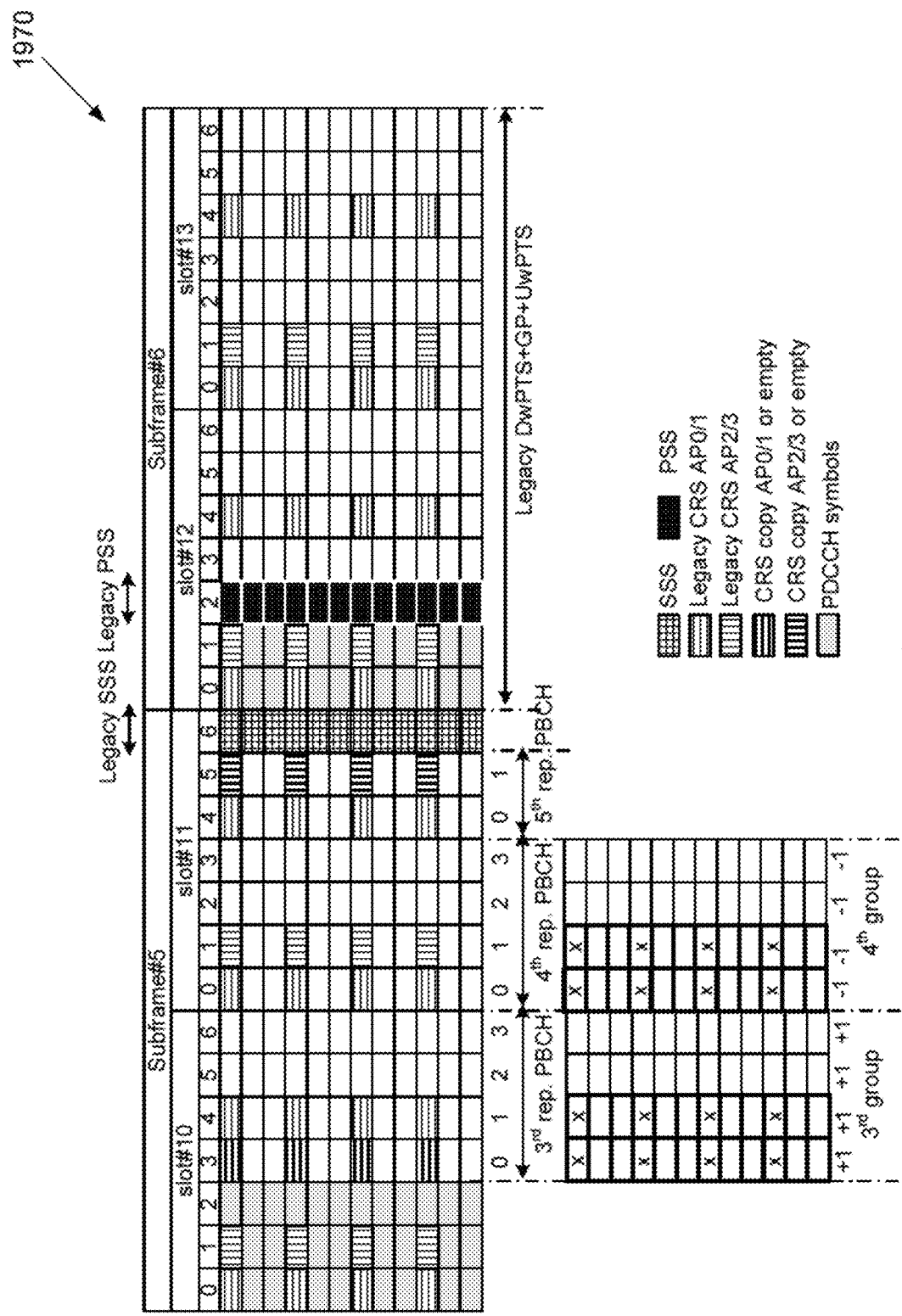
FIG. 19D illustrates yet another example transmission of an LC-MIB according to embodiments of the present disclosure.

FIG. 19D illustrates yet another example transmission of an LC-MIB 1970 according to embodiments of the present disclosure. The embodiment of the transmission of an LC-MIB 1970 illustrated in FIG. 19D is for illustration only. FIG. 19D does not limit the scope of this disclosure.

FIGS. 19C and 19D illustrate a transmission of an LC-MIB with repetitions continuously in SF#0 and intermittently in SF#5 in a TDD system with a frame structure using normal CP. The MIB repetitions for LC-MIB with $1^{st}$, $2^{nd}$, $3^{rd}$, $4^{th}$ and $5^{th}$ PBCH repeated symbols are also shown in FIGS. 19C and 19D. The $1^{st}$, $2^{nd}$, $3^{rd}$, and $4^{th}$ PBCH repetitions are used to carry ePSS/eSSS transmission. The SF#0 (subframe#0) includes the $1^{st}$ and $2^{nd}$ PBCH repetitions and the SF#5 includes the $3^{rd}$, $4^{th}$ and $5^{th}$ PBCH repetitions. Among the 4 symbols in each PBCH repetition, the CRS or CRS copy IREs in the $0^{th}$ PBCH symbol and $1^{st}$ PBCH symbol per PBCH repetition cannot be overlapped with additional signals, which may be used for legacy MTC UEs as well as other non-MTC UEs for cell-specific channel estimation and RRM measurement.

The corresponding REs in the $0^{th}$ and $1^{st}$ symbol per group overlapping with legacy CRS REs may be punctured to avoid the impact on CRS reception at the price of the correlation performance of additional signals, such as ePSS and/or eSSS. The symbols in each PBCH repetition with similar channel variation are defined as a symbol group. There are 4 symbol groups illustrated in FIGS. 19C and 19D. Each symbol group may be used to send repeated ePSS/eSSS and the symbol groups are group-multiplexed with orthogonal cover codes (OCC), such as $\{+1, -1, +1, -1\}$. The symbol group locations can neither be overlapped with PDCCH, nor overlapped with the legacy PSS/SSS/PBCH to avoid any impact on the non-MTC UEs.

For example, $1^{st}$ symbol group with the slot and symbol number triplets (i,n'$_s$,l') with i=0 as (0, 3), (0, 4); $2^{nd}$ symbol group with the slot and symbol number triplets (i,n'$_s$,l') with i=0 as (1, 4) and (1, 5); and $3^{rd}$ symbol group with the slot and symbol number triplets (i,n'$_s$,l') with i=0 as (10, 3) and (10, 4), (10, 5) and (10, 6); and $4^{th}$ symbol group with the slot and symbol number triplets (i,n'$_s$,l') with i=0 as (11,0) and (11, 1), (11, 2) and (11, 3).

In one sub-embodiment, ePSS in the $2^{nd}$ and $3^{rd}$ symbols of $3^{rd}$ and $4^{th}$ symbol groups multiplexed with cover codes, such as $\{+1, -1\}$ OCC, is repeated, respectively. The ePSS location with the frame offset, slot and symbol number triplets (i,n'$_s$,l') are (10, 5), (10, 6), (11, 2) and (11, 3). To let UE differentiate ePSS and legacy PSS, a new sequence is designed for ePSS. The ePSS sequence length can be same as that of legacy PSS sequence.

A special case is to use the Zadoff-Chu (ZC) sequence with length of 63 and root of 38, which is conjugate of ZC sequence PSS with root of 25. Since ePSS on the symbols without CRS does not need puncturing in frequency domain, the time-domain sequence correlation with the ZC sequence conjugate with that of PSS is simple from implementation point of view. Or the ePSS is a longer sequence around 2 times that of legacy PSS. To combine the $2^{nd}$ and $3^{rd}$ PBCH symbols in the 2-time PBCH repetitions (symbol-level combining) can cancel the interference of the overlapped additional ePSS symbol due to the orthogonality of cover codes. For ePSS detection, the MTC UEs may firstly de-scramble the OCC for each symbol group and combine the ePSS signals.

The PBCH signals are orthogonal to the ePSS signals. In addition to ePSS repetition, the eSSS is repeated in the $0^{th}$ and $1^{st}$ symbols of $1^{st}$, $2^{nd}$, $3^{rd}$ and $4^{th}$ symbol groups multiplexed with {+1, −1, +1, −1} OCC, respectively. The eSSS location with the frame offset, slot and symbol number triplets (i,n'$_s$,l') are (0, 3), (0, 4), (1, 4), (1, 5), (10, 3), (10, 4), (11, 0) and (11, 1). The SSS sequence can be reused for eSSS. But eSSS on CRS REs needs puncturing in frequency domain. To combine the $0^{th}$ and $1^{st}$ PBCH symbol in the 4-time PBCH repetitions (symbol-level combining) can cancel the interference of the overlapped additional eSSS symbol due to the orthogonality of cover codes. For eSSS detection, the MTC UEs may first de-scramble the cover codes for each symbol group and combine the eSSS signals. The PBCH signals are orthogonal to the eSSS signals.

In another sub-embodiment, ePSS in the $0^{th}$ and $1^{st}$ symbols of $1^{st}$, $2^{nd}$, $3^{rd}$, and $4^{th}$ symbol groups multiplexed with cover codes, such as {+1, −1, +1, −1} OCC, is repeated, respectively. The ePSS location with the frame offset, slot and symbol number triplets (i,n'$_s$,l') are (0, 3), (0, 4), (1, 4), (1, 5), (10, 3), (10, 4), (11, 0), and (11, 1). The ePSS can be a short sequence with similar length of legacy PSS length. Or the ePSS is a longer sequence around 2 times that of legacy PSS. But ePSS on CRS REs needs puncturing in frequency domain. To combine the $0^{th}$ and $1^{st}$ PBCH symbols in the 4-time PBCH repetitions (symbol-level combining) can cancel the interference of the overlapped additional ePSS symbol due to the orthogonality of cover codes.

For ePSS detection, the MTC UEs may firstly de-scramble the OCC for each symbol group and combine the ePSS signals. The PBCH signals are orthogonal to the ePSS signals. In addition to ePSS repetition, the eSSS is repeated in the $2^{nd}$ and $3^{rd}$ symbols of $3^{rd}$ and $4^{th}$ symbol groups multiplexed with {+1, −1, +1, −1} OCC, respectively. The eSSS location with the frame offset, slot and symbol number triplets (i,n'$_s$,l') are (10, 5), (10, 6), (11, 2) and (11, 3). The SSS sequence can be reused for eSSS. To combine the $2^{nd}$ and $3^{rd}$ PBCH symbol in the 2-time PBCH repetitions (symbol-level combining) can cancel the interference of the overlapped additional eSSS symbol due to the orthogonality of cover codes. For eSSS detection, the MTC UEs may first de-scramble the cover codes for each symbol group and combine the eSSS signals. The PBCH signals are orthogonal to the eSSS signals.

In another sub-embodiment, ePSS in $1^{st}$, $2^{nd}$ symbol group multiplexed with cover code, such as {+1, −1} OCC, is repeated, respectively. And repeat eSSS in $3^{rd}$ and $4^{th}$ symbol groups multiplexed with {+1, −1}. The ePSS location with the frame offset, slot and symbol number triplets (i,n'$_s$,l') are (0, 3), (0, 4), (1, 4) and (1, 5). The eSSS location with the frame offset, slot and symbol number triplets (i,n'$_s$,l') are (10, 3) and (10, 4), (10, 5), (10, 6), (11, 0) and (11, 1), (11, 2) and (11, 3). The ePSS sequence can be symbol-level with similar length of legacy PSS sequence. Or the ePSS is a longer sequence with longer length around 2 times that of legacy PSS.

The SSS sequence can be reused for eSSS. But ePSS as well as eSSS on CRS REs needs puncturing in frequency domain. For ePSS detection, the MTC UEs may first de-scramble the cover codes for $1^{st}$ and $2^{nd}$ symbol group and combine the ePSS signals. To combine the PBCH symbol with same symbol index in the 2-time PBCH repetitions respectively (symbol-level combining) can cancel the interference of the overlapped additional ePSS in $1^{st}$ and $2^{nd}$ symbol groups. Similar procedure as eSSS combining in the $3^{rd}$ and $4^{th}$ symbol group.

Note that the ePSS repetition and eSSS repetition can also be applied separately. For example, only the ePSS in $1^{st}$, $2^{nd}$ symbol group multiplexed with {+1, −1} OCC but no additional eSSS repetition on in $3^{rd}$ and $4^{th}$ symbol groups. For another example, only the eSSS in $3^{rd}$ and $4^{th}$ symbol group multiplexed with {+1, −1} OCC but no additional ePSS repetition on in $1^{st}$, $2^{nd}$ symbol groups.

In another sub-embodiment, eSSS in $1^{st}$, $2^{nd}$ symbol group multiplexed with cover code, such as {+1, −1} OCC, is repeated, respectively. And repeat ePSS in $3^{rd}$ and $4^{th}$ symbol groups multiplexed with {+1, −1}. The eSSS location with the frame offset, slot and symbol number triplets (i,n'$_s$,l') are (0, 3), (0, 4), (1, 4) and (1, 5). The ePSS location with the frame offset, slot and symbol number triplets (i,n'$_s$,l') are (10, 3) and (10, 4), (10, 5), (10, 6), (11, 0) and (11, 1), (11, 2) and (11, 3). The ePSS sequence can be symbol-level with similar length of legacy PSS sequence. Or the ePSS is a longer sequence with longer length around 2 or 4 times that of legacy PSS.

The SSS sequence can be reused for eSSS. But ePSS as well as eSSS on CRS REs needs puncturing in frequency domain. For ePSS detection, the MTC UEs may first de-scramble the cover codes for $3^{rd}$ and $4^{th}$ symbol group and combine the ePSS signals. To combine the PBCH symbol with same symbol index in the 2-time PBCH repetitions respectively (symbol-level combining) can cancel the interference of the overlapped additional ePSS in $3^{rd}$ and $4^{th}$ symbol groups. Similar procedure as eSSS combining in the $1^{st}$ and $2^{nd}$ symbol group. Note that the ePSS repetition and eSSS repetition can also be applied separately.

For example, only the eSSS in $1^{st}$, $2^{nd}$ symbol group multiplexed with {+1, −1} OCC but no additional ePSS repetition on in in $3^{rd}$ and $4^{th}$ symbol groups. For another example, only the ePSS in $3^{rd}$ and $4^{th}$ symbol group multiplexed with {+1, −1} OCC but no additional eSSS repetition on in $1^{st}$, $2^{nd}$ symbol groups.

In another sub-embodiment, ePSS in $1^{st}$, $2^{nd}$, $3^{rd}$ and $4^{th}$ symbol groups multiplexed with cover code, such as {+1, −1, +1, −1} OCC, is repeated, respectively. ePSS sequence length can be symbol-level with similar length as that of legacy PSS. A special case is to use the Zadoff-Chu (ZC) sequence with length of 63 and root of 38, which is conjugate of ZC sequence PSS with root of 25. Or the ePSS is a longer sequence with longer length around 2 times that of legacy PSS. But ePSS on CRS REs needs puncturing in frequency domain.

To combine the PBCH symbol with same symbol index in the 4-time PBCH repetitions respectively (symbol-level combining) can cancel the interference of the overlapped additional ePSS symbol due to the orthogonality of cover codes. For ePSS detection, the MTC UEs may first de-scramble the cover codes for each symbol group and combine the ePSS signals. The PBCH signals are orthogonal to the ePSS signals.

In another sub-embodiment, eSSS in $1^{st}$, $2^{nd}$, $3^{rd}$ and $4^{th}$ symbol groups multiplexed with cover code, such as {+1, −1, +1, −1} OCC, is repeated, respectively. SSS can be simply reused for eSSS. But eSSS on CRS REs needs puncturing in frequency domain. To combine the PBCH symbol with same symbol index in the 4-time PBCH repetitions respectively (symbol-level combining) can cancel the interference of the overlapped additional eSSS symbol due to the orthogonality of cover codes. For eSSS detection, the MTC UEs may first de-scramble the cover codes for each symbol group and combine the eSSS signals. The PBCH signals are orthogonal to the eSSS signals.

Note that the similar concept can be extended for FDD frame structure with extended CP (ECP). Also note that the other orthogonal cover codes are not precoded, such as the binary cover codes in the Hadamard matrix, or the complex cover codes in the P-matrix.

Figure 20A:
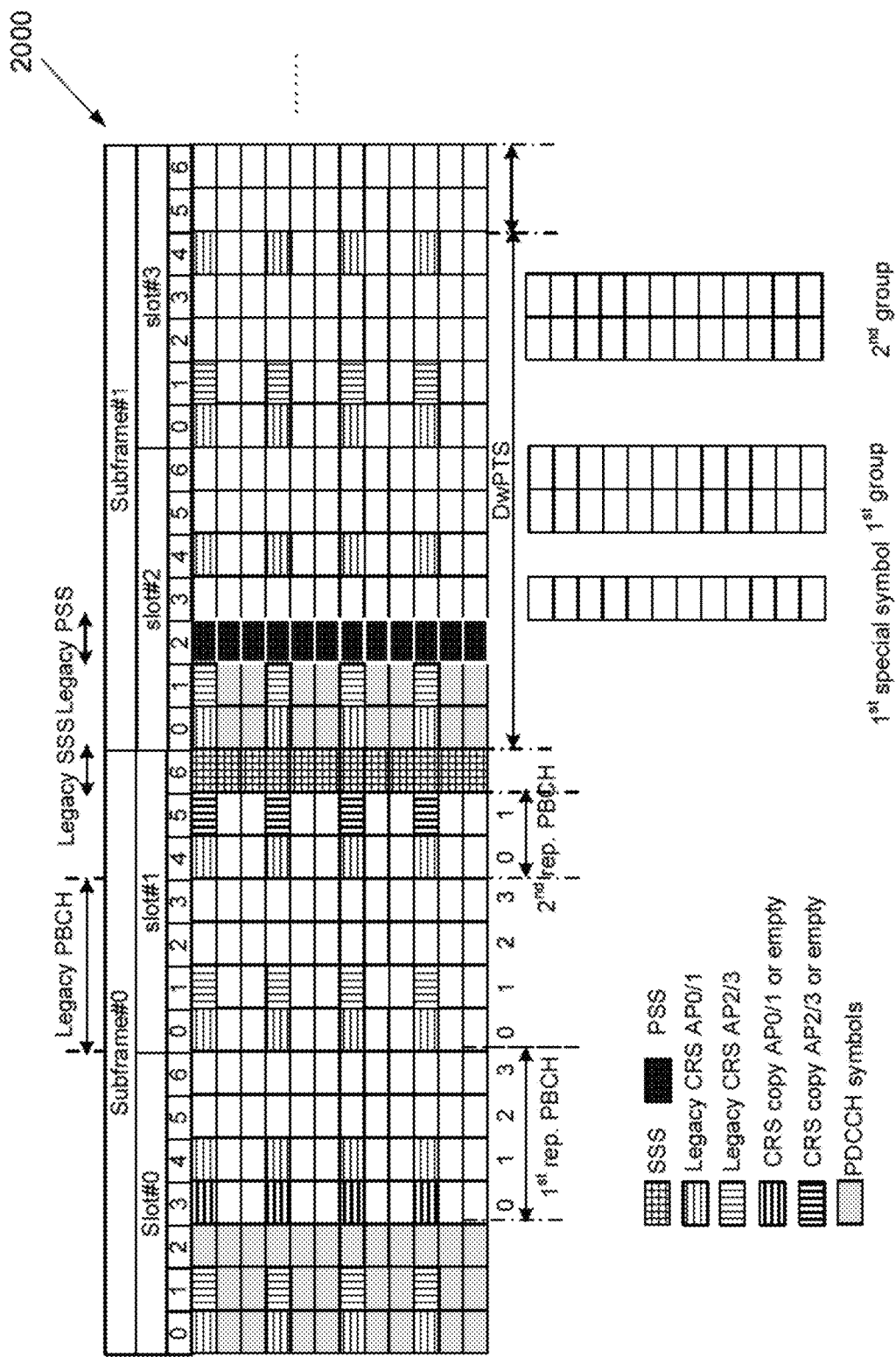
FIG. 20A illustrates an example a transmission of enhanced synchronization signals according to embodiments of the present disclosure.

FIG. 20A illustrates an example a transmission of enhanced synchronization signals 2000 according to embodiments of the present disclosure. The embodiment of the transmission of enhanced synchronization signals 2000 illustrated in FIG. 20A is for illustration only. FIG. 20A does not limit the scope of this disclosure.

Figure 20B:
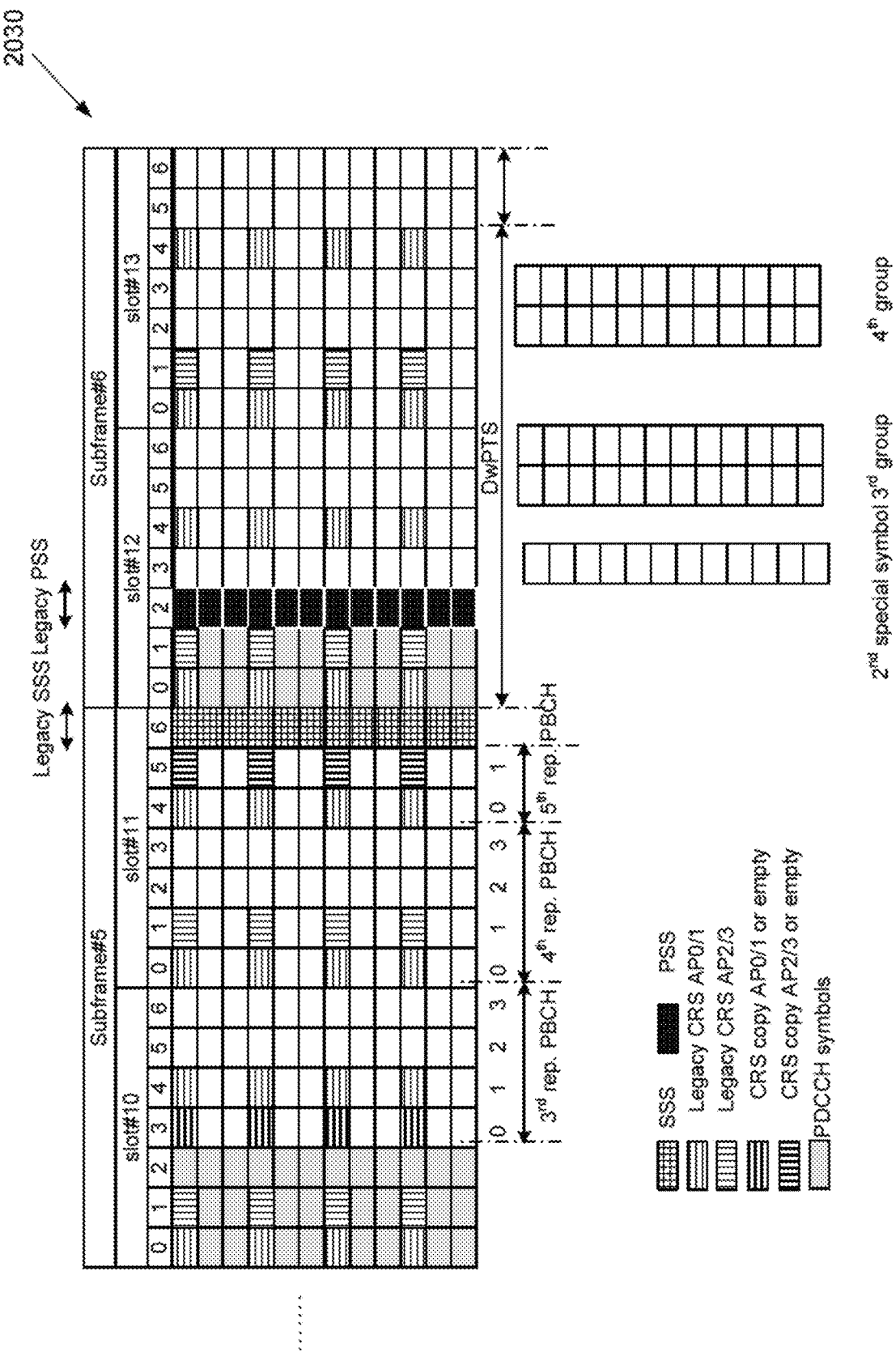
FIG. 20B illustrates another example a transmission of enhanced synchronization signals according to embodiments of the present disclosure.

FIG. 20B illustrates another example a transmission of enhanced synchronization signals 2030 according to embodiments of the present disclosure. The embodiment of the transmission of enhanced synchronization signals 2030 illustrated in FIG. 20B is for illustration only. FIG. 20B does not limit the scope of this disclosure.

FIGS. 20A and 20B illustrate a transmission of enhanced synchronization signals in the special subframes with DL/UL configuration in SF#1 and intermittently in SF#6 in a TDD system with a frame structure using normal CP. In SF#1 and #6, the 12 DL symbols are used to enable the ePSS/eSSS transmission. In slot#3, the 1-symbol GP in slot and symbol number triplets $(i,n'_s,l')$ with i=0 of (3, 5) and 1-symbol UL symbol in slot and symbol number triplets $(i,n'_s,l')$ with i=0 of (3, 6) are configured respectively. In slot#13, the 1-symbol GP in slot and symbol number triplets $(i,n'_s,l')$ with i=0 of (13, 5) and 1-symbol UL symbol in slot and symbol number triplets $(i,n'_s,l')$ with i=0 of (13, 6) are configured respectively.

These symbols in SF#1 and SF#6 are not overlapped with the MIB repetitions for LC-MIB with $1^{st}$, $2^{nd}$, $3^{rd}$, $4^{th}$ and $5^{th}$ PBCH repeated symbols in SF#0 and SF#5 are also shown in FIGS. 20A and 20B. Among the 12 DL symbols in SF#1 and Sf#6, the symbols including the legacy PSS and the CRS REs cannot be overlapped with additional signals, which may be used for legacy MTC UEs as well as other non-MTC UEs for initial synchronization, cell searching, cell-specific channel estimation and RRM measurement, The remaining symbols for PDSCH can be used to transmit additional sync signals, such as enhanced PSS and/or enhanced SSS (ePSS and/or eSSS).

The adjacent symbols in each PBCH repetition with similar channel variation are defined as a symbol group. There are 4 symbol groups illustrated in FIGS. 20A and 20B. Each symbol group may be used to send repeated ePSS/eSSS. The symbol group locations can neither overlap with CRS nor overlapped with PDCCH. The symbol group locations are not overlapped with the legacy PSS/SSS/PBCH to avoid any impact on the non-MTC UEs.

Note that if the symbol groups are group-multiplexed with orthogonal cover codes (OCC), such as {+1, −1}, it is possible to consider the PDSCH transmission in the over-lapped symbol groups for ePSS/SSS repetition to further increase the spectral efficiency in SF#1 and SF#6.

For example, st symbol group with the slot and symbol number triplets $(i,n'_s,l')$ with i=0 as (2,5) and (2,6); $2^{nd}$ symbol group with the slot and symbol number triplets $(i,n'_s,l')$ with i=0 as (3,2) and (3,3); $3^{rd}$ symbol group with the slot and symbol number triplets $(i,n'_s,l')$ with i=0 as (12,5) and (12,6); and $4^{th}$ symbol group with the slot and symbol number triplets $(i,n'_s,l')$ with i=0 as (13,2) and (13,3).

In one sub-embodiment, ePSS in $1^{st}$, $2^{nd}$, $3^{rd}$ and $4^{th}$ symbol groups, is repeated respectively. ePSS sequence can be same as legacy PSS sequence. Another example is to a longer sequence for ePSS with 2 times that of legacy PSS to achieve better correlation characteristics. The longer sequence is mapped into two symbols within a symbol group. For ePSS detection, the MTC UEs can combine the ePSS correlation signals within the same slot and/or in different slots.

In another sub-embodiment, repeat eSSS in $1^{st}$, $2^{nd}$, $3^{rd}$ and $4^{th}$ symbol groups, is repeated, respectively. eSSS sequence can be same as legacy PSS sequence. Another example is to a longer sequence for eSSS with 2 times that of legacy PSS to achieve better correlation characteristics. The longer sequence is mapped into two symbols within a symbol group. For eSSS detection, the MTC UEs can combine the eSSS correlation signals within the same slot and/or in different slots.

In another sub-embodiment, ePSS in $1^{st}$, $2^{nd}$ symbol group is repeated and eSSS in $3^{rd}$ and $4^{th}$ symbol groups is repeated. The ePSS sequence can be same as legacy PSS sequence or a longer sequence for ePSS with 2 times that of legacy PSS to achieve better correlation characteristics. Similarly the eSSS sequence can be same as legacy SSS sequence or a longer sequence for eSSS with 2 times that of legacy SSS to achieve better correlation characteristics. For ePSS detection, the MTC UEs can combine the ePSS correlation signals.

For eSSS detection, the MTC UEs combine the eSSS correlation signals. Note that the ePSS repetition and eSSS repetition can be applied separately. For example, only the ePSS in $1^{st}$, $2^{nd}$ symbol group but no additional eSSS repetition on in $3^{rd}$ and $4^{th}$ symbol groups. For another example, only the eSSS in $3^{rd}$ and $4^{th}$ symbol group but no additional ePSS repetition on in $1^{st}$, $2^{nd}$ symbol groups.

In another sub-embodiment, eSSS in $1^{st}$, $2^{nd}$ symbol group is repeated and ePSS in $3^{rd}$ and $4^{th}$ symbol groups is repeated. The eSSS sequence can be same as legacy SSS sequence or a longer sequence for eSSS with 2 times that of legacy SSS to achieve better correlation characteristics. Similarly the ePSS sequence can be same as legacy PSS sequence or a longer sequence for ePSS with 2 times that of legacy PSS to achieve better correlation characteristics. For eSSS detection, the MTC UEs can combine the eSSS correlation signals.

For ePSS detection, the MTC UEs combine the ePSS correlation signals. Note that the eSSS repetition and ePSS repetition can be applied separately. For example, only the eSSS in $1^{st}$, $2^{nd}$ symbol group but no additional ePSS repetition on in $3^{rd}$ and $4^{th}$ symbol groups. For another example, only the ePSS in $3^{rd}$ and $4^{th}$ symbol group but no additional eSSS repetition on in $1^{st}$, $2^{nd}$ symbol groups.

In another embodiment, ePSS in the $1^{st}$ symbol of $1^{st}$, $2^{nd}$, $3^{rd}$ and $4^{th}$ symbol groups, is repeated, respectively. ePSS sequence can be same as legacy PSS sequence. And repeat eSSS in the $2^{nd}$ symbol of $1^{st}$, $2^{nd}$, $3^{rd}$ and $4^{th}$ symbol groups, respectively. ePSS sequence can be same as legacy PSS sequence. For ePSS detection, the MTC combine the ePSS correlation signals in the ePSS symbols. For eSSS detection, the MTC combine the eSSS correlation signals in the eSSS symbols. The ePSS and eSSS symbol can be shifted within each symbol group but all the symbol groups has same order of ePSS and eSSS.

In another embodiment, ePSS next to the legacy PSS in SF#1 and SF#6, is repeated, respectively. The special symbol is illustrated as in FIGS. 20A and 20B.

For example, $1^{st}$ special symbol with the slot and symbol number triplets $(i,n'_s,l')$ with i=0 as (2,3); and $2^{nd}$ special symbol with the slot and symbol number triplets $(i,n'_s,l')$ with i=0 as (12,3).

In one embodiment, ePSS in $1^{st}$, $2^{nd}$ special symbols, is sent, respectively. ePSS sequence can be same as legacy PSS sequence. For ePSS detection, the MTC UEs can combine the ePSS correlation signals within the same slot and/or in different slots.

In another embodiment, eSSS in $1^{st}$, $2^{nd}$ special symbols, is sent, respectively. eSSS sequence can be same as legacy SSS sequence. For eSSS detection, the MTC UEs can combine the eSSS correlation signals within the same slot and/or in different slots.

Note that the special symbols for ePSS/eSSS can be applied together with the other symbol groups in FIGS. 20A and 20B or independently used.

Note that the similar concept can be extended for TDD frame structure with extended CP (ECP).

Figure 20C:
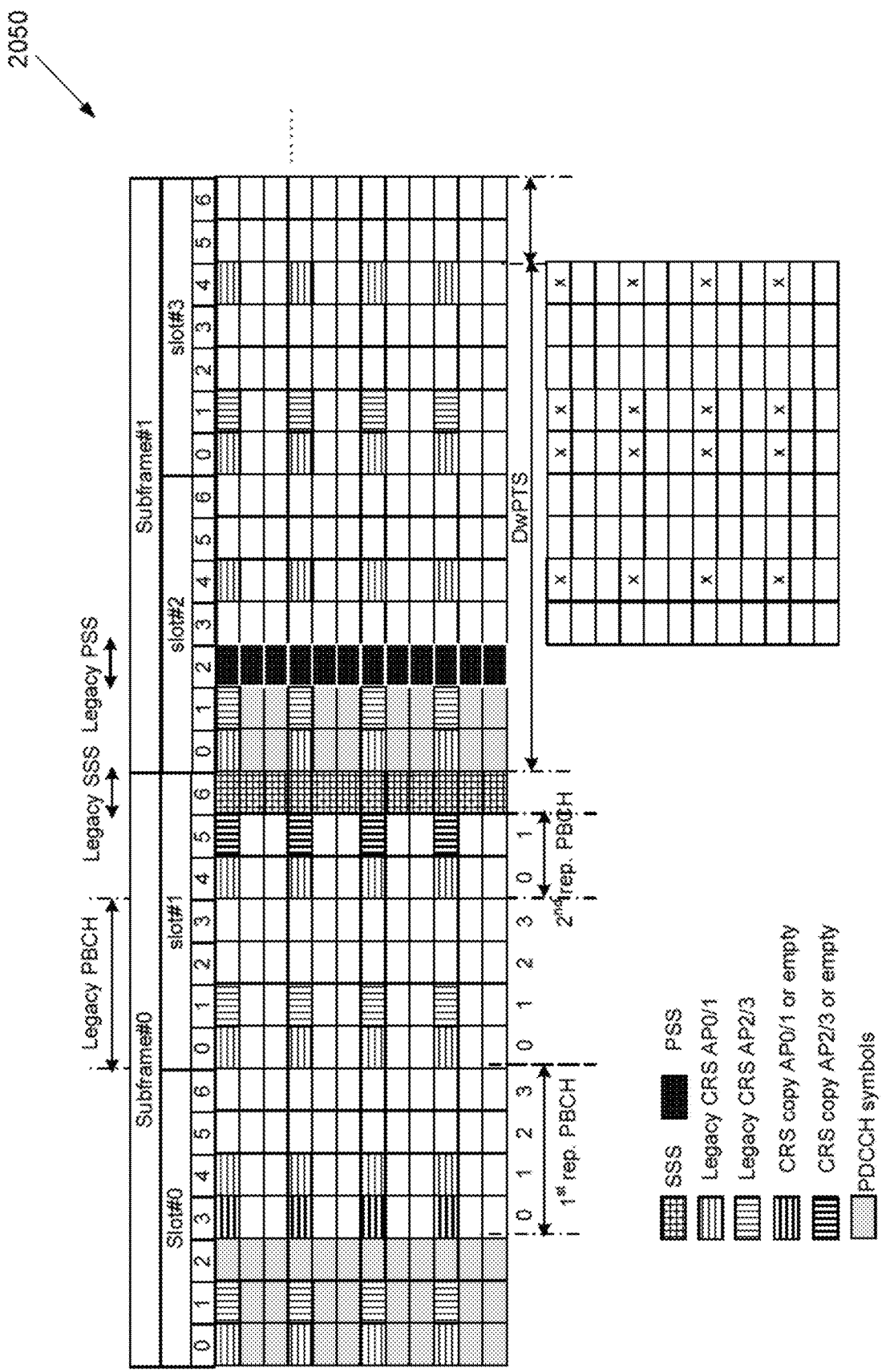
FIG. 20C illustrates yet another example a transmission of enhanced synchronization signals according to embodiments of the present disclosure.

FIG. 20C illustrates yet another example a transmission of enhanced synchronization signals 2050 according to embodiments of the present disclosure. The embodiment of the transmission of enhanced synchronization signals 2050 illustrated in FIG. 20C is for illustration only. FIG. 20C does not limit the scope of this disclosure.

Figure 20D:
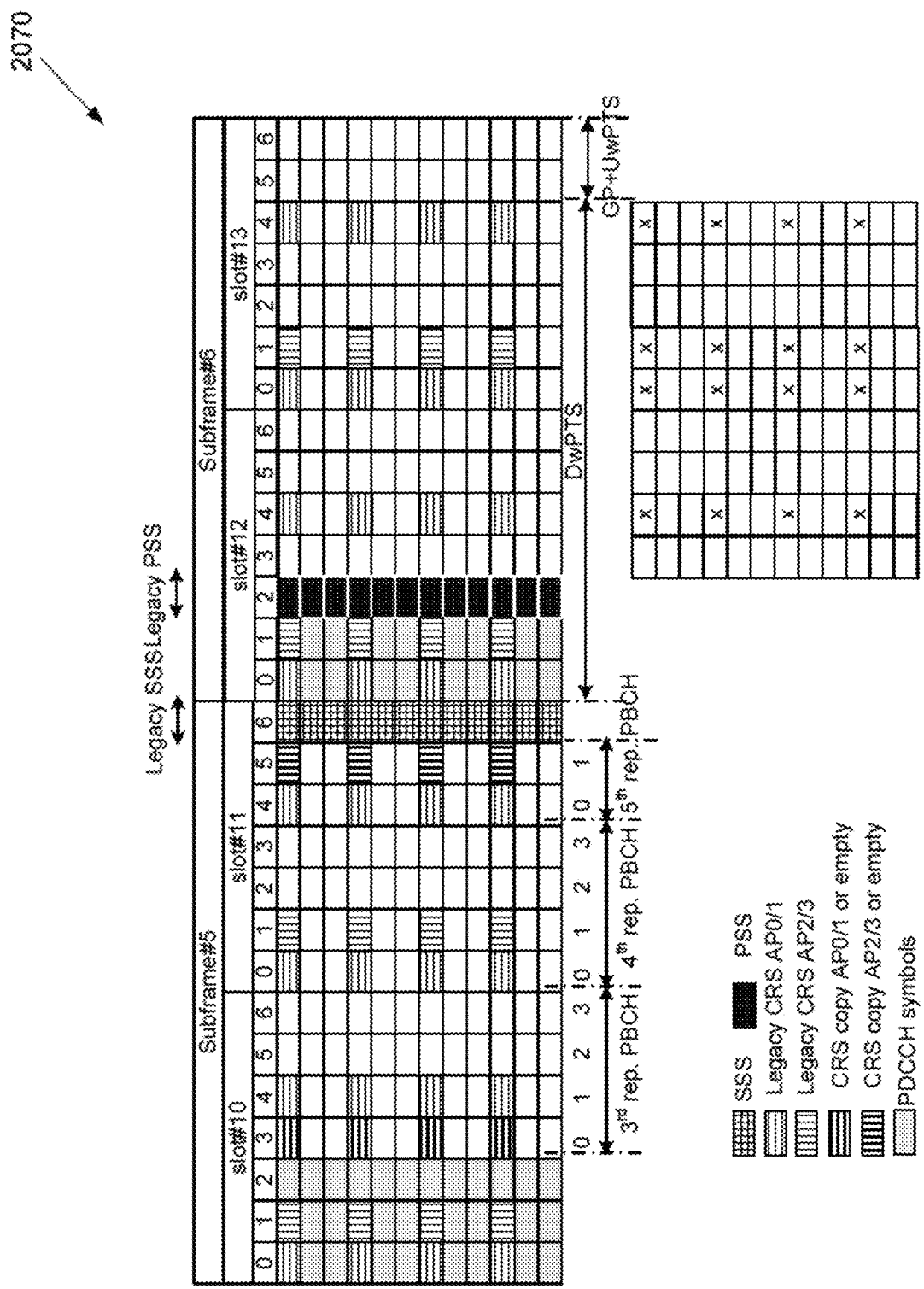
FIG. 20D illustrates yet another example a transmission of enhanced synchronization signals according to embodiments of the present disclosure.

FIG. 20D illustrates yet another example a transmission of enhanced synchronization signals 2070 according to embodiments of the present disclosure. The embodiment of the transmission of enhanced synchronization signals 2070 illustrated in FIG. 20D is for illustration only. FIG. 20D does not limit the scope of this disclosure.

FIGS. 20C and 20D illustrate a transmission of enhanced synchronization signals in the special subframes with DL/UL configuration in SF#1 and intermittently in SF#6 in a TDD system with a frame structure using normal CP. In SF#1 and #6, the 18 DL symbols are used to enable the ePSS/eSSS transmission. In slot#3, the 1-symbol GP in slot and symbol number triplets (i,n'$_s$,l') with i=0 of (3, 5) and 1-symbol UL symbol in slot and symbol number triplets (i, n'$_s$,l') with i=0 of (3,6) are configured respectively. In slot#13, the 1-symbol GP in slot and symbol number triplets (i,n'$_s$,l') with i=0 of (13, 5) and 1-symbol UL symbol in slot and symbol number triplets (i,n'$_s$,l') with i=0 of (13, 6) are configured respectively.

These symbols in SF#1 and SF#6 are not overlapped with the MIB repetitions for LC-MIB with $1^{st}$, $2^{nd}$, $3^{rd}$, $4^{th}$ and $5^{th}$ PBCH repeated symbols in SF#0 and SF#5 are also shown in FIGS. 20C and 20D. Among the 18 DL symbols in SF#1 and Sf#6, the PSS symbols and the CRS REs cannot be overlapped with additional signals, which may be used for legacy MTC UEs as well as other non-MTC UEs for initial synchronization, cell searching, cell-specific channel estimation and RRM measurement. The remaining REs for PDSCH can be used to transmit additional sync signals, such as enhanced PSS and/or enhanced SSS (ePSS and/or eSSS). The symbols with CRS and the symbols without CRS can be divided into different symbol groups. Each symbol group may be used to send repeated ePSS/eSSS. The symbol group locations cannot be overlapped with PDCCH, neither overlapped with the legacy PSS/SSS/PBCH to avoid any impact on the non-MTC UEs.

For example, $1^{st}$ symbol group with the slot and symbol number triplets (i,n'$_s$,l') with i=0 as (2, 3), (2, 5), (2, 6), (3, 2), (3, 3); $2^{nd}$ symbol group with the slot and symbol number triplets (i,n'$_s$,l') with i=0 as (12, 3), (12, 5), (12, 6), (13, 2), (13, 3); $3^{rd}$ symbol group with the slot and symbol number triplets (i,n'$_s$,l') with i=0 as (2, 4), (3, 0), (3, 1) and (3, 4); and $4^{th}$ symbol group with the slot and symbol number triplets (i,n'$_s$,l') with i=0 as (12, 4), (13, 0), (13, 1) and (13, 4).

In one sub-embodiment, ePSS in $1^{st}$, $2^{nd}$ symbol group and repeat eSSS in $3^{rd}$ and $4^{th}$ symbol groups is repeated. The ePSS sequence can be same as legacy PSS sequence or a longer sequence for ePSS with 5 times that of legacy PSS to achieve better correlation characteristics. A special case is to use the Zadoff-Chu (ZC) sequence with length of 63 and root of 38, which is conjugate of ZC sequence PSS with root of 25. Since ePSS on the symbols without CRS does not need puncturing in frequency domain, the time-domain sequence correlation with the ZC sequence conjugate with that of PSS is simple from implementation point of view.

The eSSS sequence can be same as legacy SSS sequence or a longer sequence for eSSS with 4 times that of legacy SSS to achieve better correlation characteristics. But eSSS on CRS REs needs puncturing in frequency domain. For ePSS detection, the MTC UEs can combine the ePSS correlation signals. For eSSS detection, the MTC UEs combine the eSSS correlation signals. Note that the ePSS repetition and eSSS repetition can be applied separately. For example, only the ePSS in $1^{st}$, $2^{nd}$ symbol group but no additional eSSS repetition on in $3^{rd}$ and $4^{th}$ symbol groups. For another example, only the eSSS in $3^{rd}$ and $4^{th}$ symbol group but no additional ePSS repetition on in $1^{st}$, $2^{nd}$ symbol groups.

In another sub-embodiment, eSSS in $1^{st}$, $2^{nd}$ symbol group and repeat ePSS in $3^{rd}$ and $4^{th}$ symbol groups is repeated. The ePSS sequence can be same as legacy PSS sequence or a longer sequence for ePSS with 4 times that of legacy PSS to achieve better correlation characteristics. The eSSS sequence can be same as legacy SSS sequence or a longer sequence for eSSS with 5 times that of legacy SSS to achieve better correlation characteristics. A special case is to use the Zadoff-Chu (ZC) sequence with length of 63 and root of 38, which is conjugate of ZC sequence PSS with root of 25. But ePSS on CRS REs needs puncturing in frequency domain.

For ePSS detection, the MTC UEs can combine the ePSS correlation signals. For eSSS detection, the MTC UEs combine the eSSS correlation signals. Note that the ePSS repetition and eSSS repetition can be applied separately. For example, only the eSSS in $1^{st}$, $2^{nd}$ symbol group but no additional ePSS repetition on in $3^{rd}$ and $4^{th}$ symbol groups. For another example, only the ePSS in $3^{rd}$ and $4^{th}$ symbol group but no additional eSSS repetition on in $1^{st}$, $2^{nd}$ symbol groups.

In another sub-embodiment, ePSS in $1^{st}$, $2^{nd}$, $3^{rd}$ and $4^{th}$ symbol groups is repeated. The ePSS sequence can be same as legacy PSS sequence or a longer sequence for ePSS with 5 times that of legacy PSS to achieve better correlation characteristics.

In another sub-embodiment, eSSS in $1^{st}$, $2^{nd}$, $3^{rd}$ and $4^{th}$ symbol groups is repeated. The eSSS sequence can be same as legacy SSS sequence or a longer sequence for eSSS with 5 times that of legacy SSS to achieve better correlation characteristics.

Note that the partial symbols per symbol group can be used for ePSS and/or eSSS transmission.

Note that the similar concept can be extended for TDD frame structure with extended CP (ECP).

An MIB for LC-UEs is referred to as LC-MIB as it can utilize spare bits of an existing MIB to provide scheduling information for an LC-SIB-1 transmission. As an LC-UE is not aware of the UL/DL configuration in case of a TDD system or, in general, of ABS or MBSFN SFs when the LC-UE needs to detect the LC-MIB, an LC-MIB transmission needs to occur only in SFs that are guaranteed to be DL SFs regardless of the UL/DL configuration or of the presence of ABS or MBSFN SFs. For LC-MIB transmission, an LC-UE can assume that a conventional DL control region spans 3 SF symbols. This represents a maximum number of SF symbols for the conventional DL control region for all DL system BWs except for small DL system BWs (see also REF 1). However, for small DL system BWs, as only limited DL scheduling (if any) can exist in SFs with LC-MIB transmission, 3 SF symbols are adequate for the conventional DL control region without imposing adverse scheduling restrictions.

FIGS. 18A and 18B illustrate a transmission of an LC-MIB with repetitions continuously in SF#0 and intermittently in SF#5 in a FDD system with a frame structure using normal CP. The MIB repetitions for LC-MIB with $1^{st}$, $2^{nd}$, $3^{rd}$ and $4^{th}$ PBCH repeated symbols are also shown in FIGS. 18A and 18B. The SF#9 (subframe#9) includes the $1^{st}$ and $2^{nd}$ PBCH repetition and part of $3^{rd}$ PBH repetition and the SF#0 includes the remaining of $3^{rd}$ PBCH and the $4^{th}$ PBCH repetition. Among the 4 symbols in each PBCH repetition, the $0^{th}$ PBCH symbol and $1^{st}$ PBCH symbol in each PBCH repetition include the CRS REs, which may be used for legacy MTC UEs as well as other non-MTC UEs for cell-specific channel estimation and RRM measurement, which cannot be overlapped with additional signals.

FIGS. 19A and 19B illustrate a transmission of an LC-MIB with repetitions continuously in SF#0 and intermittently in SF#5 in a TDD system with a frame structure using normal CP. The MIB repetitions for LC-MIB with $1^{st}$, $2^{nd}$, $3^{rd}$, $4^{th}$ and $5^{th}$ PBCH repeated symbols are also shown in FIGS. 19A and 19B. But only the $1^{st}$, $3^{rd}$ and $4^{th}$ PBCH repetitions include the $2^{nd}$ and $3^{rd}$ PBCH symbols. The SF#0 (subframe#0) includes the $1^{st}$ PBCH repetition and the SF#5 includes the $3^{rd}$ PBCH repetition the $4^{th}$ PBCH repetition. Among the 4 symbols in each PBCH repetition, the $0^{th}$ PBCH symbol and $1^{st}$ PBCH symbol in each PBCH repetition include the CRS REs, which may be used for legacy MTC UEs as well as other non-MTC UEs for cell-specific channel estimation and RRM measurement, which cannot be overlapped with additional signals.

LC-UEs target 20 dB improved coverage using very low rate traffic with related latency requirement. The coverage for legacy LTE PSS/SSS needs to be improved 11.4 dB for FDD and 17.4 dB for TDD in order to achieve an overall coverage enhancement target of 20 dB. For normal LTE, the SCH operating point for an FDD system is at −7.8 dB. Additional 11.4 dB is needed for coverage enhancement, resulting in the required operating point of −19.2 dB.

Therefore, there is a need to enable additional transmission of PSS and/or SSS to improve the synchronization latency for LC-UEs.

There is another need to design sequences and mappings for PSS and/or SSS such that the detection complexity of LC-UEs is low.

There is another need to design sequences and mappings for PSS and/or SSS such that the synchronization performance of traditional UEs are not impacted.

The present disclosure provides the design of sequences and mappings of enhanced PSS and enhanced SSS for MTC, termed the ePSS and eSSS, which can be utilized for initial cell search enhancement or resynchronization purpose.

In some embodiments of component VII for sequence Design of ePSS, the functionality of PSS is to provide coarse time domain and frequency domain synchronization, as well as part of the physical cell ID detection. The PSS is constructed from a frequency-domain Zadoff-Chu (ZC) sequence of length 63, with the middle element truncated to avoid using the d.c. subcarrier. 3 roots are selected for PSS to represent the 3 physical layer identities within each group of cells (e.g. $N_{ID}^{(2)}$). The PSS is transmitted in the central 6 Resource Blocks (RBs), invariant to the system bandwidth to enable the UE to synchronize without a priori information of the system bandwidth. More precisely, the sequence to generate PSS is given by $$d_{PSS}(n) = \begin{cases} e^{-j\frac{\pi un(n+1)}{63}}, & n = 0, 1, \ldots, 30 \\ e^{-j\frac{\pi u(n+1)(n+2)}{63}}, & n = 31, \ldots, 61 \end{cases}$$

where the ZC-sequence root index u is given by TABLE 4.

TABLE 4

| ZC-sequence root index | |
| --- | --- |
| $N_{ID}^{(2)}$ | u |
| 0 | 25 |
| 1 | 29 |
| 2 | 34 |

In some embodiments, ePSS is only responsible for detection of timing and frequency offset, and does not carry cell ID information. In this embodiment, ePSS is purely utilized for additional time and frequency domain synchronization, and single sequence is utilized for generating ePSS. The single sequence to generate ePSS can be selected from one of the following options.

In one example of option 1, the sequence to generate ePSS is the same as one of the sequences to generate PSS. More precisely, the sequence to generate ePSS is given by $$d_{ePSS}(n) = \begin{cases} e^{-j\frac{\pi vn(n+1)}{63}}, & n = 0, 1, \ldots, 30 \\ e^{-j\frac{\pi v(n+1)(n+2)}{63}}, & n = 31, \ldots, 61 \end{cases}$$

where v=25 or 29 or 34, and $d_{ePSS}(n)$ is mapped in the frequency-domain to the center 62 REs within the synchronization transmission bandwidth or within 6 PRBs.

In one example of option 2, the sequence to generate ePSS is the conjugate sequence of the ZC-sequence to generate PSS with root index u=25. More precisely, the sequence to generate ePSS is given by $$d_{ePSS}(n) = \begin{cases} e^{-j\frac{\pi vn(n+1)}{63}}, & n = 0, 1, \ldots, 30 \\ e^{-j\frac{\pi v(n+1)(n+2)}{63}}, & n = 31, \ldots, 61 \end{cases}$$

where v=38 (root index 38 is the conjugate of root index 25), and $d_{ePSS}(n)$ is mapped in the frequency-domain to the center 62 REs within the synchronization transmission bandwidth or within 6 PRBs.

In one example of option 3, the sequence to generate ePSS is a ZC-sequence having small correlation with existing sequences to generate PSS, and has good sequence performance like PAPR, RCM, and capability against CFO. More precisely, the sequence to generate ePSS is given by $$d_{ePSS}(n) = \begin{cases} e^{-j\frac{\pi vn(n+1)}{63}}, & n = 0, 1, \ldots, 30 \\ e^{-j\frac{\pi v(n+1)(n+2)}{63}}, & n = 31, \ldots, 61 \end{cases}$$

where v=9 or 12 or 21 or 30 or 33 or 42 or 51 or 54, and $d_{ePSS}(n)$ is mapped in the frequency-domain to the center 62 REs within the synchronization transmission bandwidth or within 6 PRBs.

In some embodiments, ePSS is responsible for detection of timing and frequency offset, as well as for detection of part of cell ID (e.g. $N_{ID}^{(2)}$). In this embodiment, the number of sequences to generate ePSS is the same as the number of sequences to generate PSS (i.e., 3 sequences corresponding to 3 cell ID hypotheses carried by PSS). The sequence for generating ePSS can be selected from one of the following options.

In one example of option 1, the three sequences to generate ePSS are the same as the sequences to generate PSS. More precisely, the sequences to generate ePSS are given by $$d_{ePSS}(n) = \begin{cases} e^{-j\frac{\pi v n(n+1)}{63}}, & n = 0, 1, \ldots, 30 \\ e^{-j\frac{\pi v(n+1)(n+2)}{63}}, & n = 31, \ldots, 61 \end{cases}$$

where v is given by TABLE 5, and $d_{ePSS}(n)$ is mapped in the frequency-domain to the center 62 REs within the synchronization transmission bandwidth or within 6 PRBs.

TABLE 5

| ePSS generation parameter | |
|---|---|
| $N_{ID}^{(2)}$ | v |
| 0 | 25 |
| 1 | 29 |
| 2 | 34 |

In one example of option 2, the three sequences to generate ePSS are the ZC-sequences having small correlation with existing sequences to generate PSS, and have good sequence performance like PAPR, RCM, and capability against CFO. More precisely, the sequences to generate ePSS are given by $$d_{ePSS}(n) = \begin{cases} e^{-j\frac{\pi v n(n+1)}{63}}, & n = 0, 1, \ldots, 30 \\ e^{-j\frac{\pi v(n+1)(n+2)}{63}}, & n = 31, \ldots, 61 \end{cases}$$

where v is given by TABLE 6 (x can be 9 or 12 or 21 or 30 or 33 or 42 or 51 or 54 since they have equally good cross-correlation with other ePSS and PSS), and $d_{ePSS}(n)$ is mapped in the frequency-domain to the center 62 REs within the synchronization transmission bandwidth or within 6 PRBs.

TABLE 6

| ePSS generation parameter | |
|---|---|
| $N_{ID}^{(2)}$ | v |
| 0 | 38 |
| 1 | x |
| 2 | 63 − x |

In one embodiment, ePSS is responsible for detection of timing and frequency offset, and also carries cell ID information. In such embodiment, the number of sequences to generate ePSS is the same as the number of sequences to generate PSS (i.e., 3 sequences corresponding to 3 cell ID hypotheses carried by PSS). The sequence for generating ePSS is same as PSS but with time-domain cyclic shift, v, which is equivalent to frequency domain phase rotation. More precisely, the sequence to generate ePSS is given by $$d_{ePSS}(n) = \begin{cases} e^{-j\frac{\pi u n(n+1)}{63}} e^{-j\frac{2\pi v n}{63}}, & n = 0, 1, \ldots, 30 \\ e^{-j\frac{\pi u(n+1)(n+2)}{63}} e^{-j\frac{2\pi v(n+1)}{63}}, & n = 31, \ldots, 61 \end{cases}$$

where the ZC-sequence root index u is given by

TABLE 7

| ZC-sequence root index u | |
|---|---|
| $N_{ID}^{(2)}$ | u |
| 0 | 25 |
| 1 | 29 |
| 2 | 34 |

The time-domain cyclic shift, v, can be used to create orthogonality to legacy PSS and also variants across repetitions (effectively as a cover code to legacy PSS sequences, and this type of cover code could also be applied in all embodiments of ePSS) according to examples following.

In one example, $$v = \frac{I_t}{N_t},$$

is determined by time index, $I_t$, ($0 \leq I_t < N_t$), where $N_t$ is total number of timing indices/repetitions, and can be 2 or 4 or 6 or 8. E.g. $I_t = I_t^{sym} \mod N_t$, where $I_t^{sym}$ is the relative symbol index containing ePSS.

In another example, $$v = \frac{N_{ID}^{(2)}}{3},$$

is determined by the cell Id.

In yet another example, $$v = \frac{1}{N_t} \mod((I_t + 1) * (N_{ID}^{(2)} + 1), N_t),$$

is determined by time index, $I_t$, ($0 \leq I_t < N_t$), where $N_t$ is total number of timing indices/repetitions, and also the cell Id.

In one embodiment, ePSS is responsible for detection of timing and frequency offset, and also carries cell ID information. In such embodiment, the ePSS is generated from a long ZC sequence in length of L (L is approximately 62*K+1, K>=1), where K is the number of symbols/repetitions of ePSS, and ePSS is mapped to multiple symbols (either consecutive or non-consecutive) in a frequency-first and time-second order. The ePSS is constructed according to $$d_{ePSS,i}(n) = \begin{cases} e^{-j\frac{\pi v n'(n'+1)}{L-1}}, & n = 0, 1, \ldots, 30 \\ e^{-j\frac{\pi v(n'+1)(n'+2)}{L-1}}, & n = 31, \ldots, 61 \end{cases},$$

$n'=62\times i+n$, $i=0, \ldots, K-1$ where the root v is determined by part of the cell Id, $N_{ID}^{(2)}$, and can be selected from one of the following options.

In one example of option 1, v is directly extended from legacy PSS, as shown in TABLE 8.

TABLE 8

$N_{ID}^{(2)}$ and v

| $N_{ID}^{(2)}$ | v |
|---|---|
| 0 | 25 * K |
| 1 | 29 * K |
| 2 | 34 * K |

In one embodiment of Option 2, two roots are relatively prime, while the third one is conjugated to either one of them. As shown in TABLE 9, gcd(x, y)=1. For example, K=4, L=249, x=5, y=67, and the third root can be either 244 or 182.

TABLE 9

$N_{ID}^{(2)}$ and v

| $N_{ID}^{(2)}$ | v |
|---|---|
| 0 | x |
| 1 | y |
| 2 | L − x or L − y |

In one embodiment, ePSS is responsible for detection of timing and frequency offset, and also carriers cell ID information. In such embodiment, the ePSS is generated from a long ZC sequence in length of L, which is determined by the available REs, L=N_RB^RSS*N_subframe^RSS*N_symb^PRB*N_subcarrier^symb, where N_RB^RSS and N_subframe^RSS are number of RBs and subframes per RSS transmission, respectively. N_symb^RB are number of RBs and number of symbols per PRB, while N_subcarrier^symb is number of subcarrier per symbol. For example, N_RB^RSS could be 1 or 2 or 4 or 6 outside the central 6 RPB. The ePSS is mapped to multiple symbols (either consecutive or non-consecutive) in a frequency-first and time-second order.

The root of ZC, v, is determined by part of the cell ID, $N_{ID}^{(2)}$. More precisely, two roots are relatively prime, while the third one is conjugated to either one of them. As shown in TABLE 9, gcd(x, y)=1. For example, N_RB^RSS=2, N_subframe^RSS=1, N_symb^PRB=4, N_subcarrier^symb=12, L=96, x=3, y=5, and the third root can be either 93 or 91.

In one embodiment, an LTE PN sequence with length $2^{31}-1$ is adopted as the base sequence. The PN sequence is constructed by XOR of two M-sequences, wherein one M-sequnence $s_A$ is given by generator polynomial as $g_A(x)=x^{31}+x^3+1$ with initial condition $c_A$ fixed (e.g. $c_A=1$), and the other M-sequence $s_B(n)$ is given by generator polynomial as $g_B(x)=x^{31}+x^3+x^2+x+1$ with initial condition $c_B$, wherein $c_B$ carries part of cell ID, $N_{ID}^{(2)}$, and can be selected from the following options: Options 1, $c_B=a*N_{ID}^{(2)}$, where a is constant integer, e.g., a=1' and Options 2, $c_B=a1*(sf\_start+1)+a2*N^{(2)}$ or $c_B=a1*(sf\_start+1)*(N_{ID}^{(2)}+1)$, where sf_start indicates start subframe of ePSS, and a1 and a2 are constant integers, e.g., a1=1, a2=1.

The length of PN sequence, L, is determined by the available REs, L=N_RB^RSS*N_subframe^RSS*N_symb^PRB*N_subcarrier^symb, where N_RB^RSS and N_subframe^RSS are number of RBs and subframes per RSS transmission, respectively. N_symb^RB are number of RBs and number of symbols per PRB, while N_subcarrier^symb is number of subcarrier per symbol. For example, N_RB^RSS could be 1 or 2 or 4 or 6 outside the central 6 RPB. The ePSS is mapped to multiple symbols (either consecutive or non-consecutive) in a frequency-first and time-second order.

In one example, ePSS is constructed by BPSK modulated PN sequence, according to $d_{ePSS}(n)=1-2*((s_A(n+Nc)+s_B(n+Nc))\mod 2)$, where Nc is a fixed shift offset (e.g. Nc=1600), and $0\leq n\leq L-1$.

In another example, ePSS signal is constructed by QPSK modulated PN sequence, according to $d_{ePSS}(n)=(1-2*((s_A(2n+Nc)+s_B(2n+Nc))\mod 2))/\sqrt{2}+j*(1-2*((s_A(2n+Nc+1)+s_B(2n+Nc+1))\mod 2))/\sqrt{2}$ where Nc is a fixed shift offset (e.g. Nc=1600), and $0\leq n\leq L-1$.

In some embodiments of component VIII for sequence Design of eSSS in LTE, the functionality of SSS sequence is to detect the other part of cell ID based on the coarse time-domain and frequency-domain synchronization detection from PSS. CP size and duplexing mode information are also detected by SSS sequence and its relative location with PSS. The construction of SSS sequences are based on the maximum length sequences (also known as M-sequences).

Each SSS sequence is constructed by interleaving two length-31 BPSK modulated subsequences in frequency domain, where the two subsequences are constructed from the same M-sequence using different cyclic shifts. The cyclic shift indices for both parts are functions of the physical cell ID group. More precisely, the sequence to generate SSS is given by the combination of two length-31 sequences differing between subframes according to $$d_{SSS}(2n) = \begin{cases} s_0^{(m_0)}(n)c_0(n) & \text{in subframes } 0,1,2,3,4 \\ s_1^{(m_1)}(n)c_0(n) & \text{in subframes } 5,6,7,8,9 \end{cases},$$

$$d_{SSS}(2n+1) = \begin{cases} s_1^{(m_1)}(n)c_1(n)z_1^{(m_0)}(n) & \text{in subframes } 0,1,2,3,4 \\ s_0^{(m_0)}(n)c_1(n)z_1^{(m_1)}(n) & \text{in subframes } 5,6,7,8,9 \end{cases}$$

where $0\leq n\leq 30$. The indices $m_0$ and $m_1$ are derived from the physical-layer cell-identity group $N_{ID}^{(1)}$ according to $$m_0 = m' \bmod 31, \quad m_1 = \left(m_0 + \left\lfloor\frac{m'}{31}\right\rfloor + 1\right) \bmod 31,$$

$$m' = N_{ID}^{(1)} + q(q+1)/2, \quad q = \lfloor(N_{ID}^{(1)} + q'(q'+1)/2)/30\rfloor, \quad q' = \lfloor N_{ID}^{(1)}/30\rfloor.$$

The two sequences $s_0^{(m_0)}(n)$ and $s_1^{(m_1)}(n)$ are defined as two different cyclic shifts of the M-sequence $\tilde{s}(n)$ according to $s_0^{(m_0)}(n)=\tilde{s}((n+m_0)\mod 31)$, $s_1^{(m_1)}(n)=\tilde{s}((n+m_1)\mod 31)$ where $\tilde{s}(i)=1-2x(i)$, $0\leq i\leq 30$, is defined by $x(\bar{i}+5)=(x(\bar{i}+2)+x(\bar{i}))\mod 2$, $0\leq \bar{i}\leq 25$ with initial conditions $x(0)=x(1)=x(2)=x(3)=0$, and $x(4)=1$.

The two scrambling sequences $c_0(n)$ and $c_1(n)$ depend on $N_{ID}^{(2)}$ in PSS and are defined by two different cyclic shifts of the M-sequence $\tilde{c}(n)$ according to $c_0(n)=\tilde{c}((n+N_{ID}^{(2)})\mod$ 31), $c_1(n)=\tilde{c}((n+N_{ID}^{(2)}+3) \mod 31)$ where $N_{ID}^{(2)} \in \{0, 1, 2\}$ is the physical-layer identity within the physical-layer cell identity group $N_{ID}^{(1)}$ and $\tilde{c}(i)=1-2x(i)$, $0 \le i \le 30$, is defined by $x(\bar{i}+5)=(x(\bar{i}+3)+x(\bar{i})) \mod 2$, $0 \le \bar{i} \le 25$ with initial conditions $x(0)=x(1)=x(2)=x(3)=0$, and $x(4)=1$. The two scrambling sequences $z_1^{(m_0)}(n)$ and $z_1^{(m_1)}(n)$ defined by a cyclic shift of M-sequence $\tilde{z}(n)$ according to $z_1^{(m_0)}(n)=\tilde{z}((n+(m_0 \mod 8)) \mod 31)$, $z_1^{(m_1)}(n)=\tilde{z}((n+(m_1 \mod 8)) \mod 31)$ where $\tilde{z}(i)=1-2x(i)$ $0 \le i \le 30$, is defined by $x(\bar{i}+5)=(x(\bar{i}+4)+x(\bar{i}+2)+x(\bar{i}+1)+x(\bar{i})) \mod 2$, $0 \le \bar{i} \le 25$ with initial conditions $x(0)=x(1)=x(2)=x(3)=0$, and $x(4)=1$.

In some embodiment, the sequence to generate eSSS is similar to the sequence to generate SSS (the associated subframe numbers differ from SSS because the time-domain mapping of eSSS can be different, and note that if eSSS is mapped to the same subframes as SSS, the sequence to generate eSSS is the same as the one to generate SSS), where the sequence is also given by the combination of two length-31 sequences, and scrambled by $N_{ID}^{(1)}$. For example, the construction of sequence to generate eSSS can be according to $$d_{eSSS}(2n) = \begin{cases} s_0^{(m_0)}(n)c_0(n) \text{ in subframes } 8, 9, 0, 1, 2 \\ s_1^{(m_1)}(n)c_0(n) \text{ in subframes } 3, 4, 5, 6, 7 \end{cases},$$

$$d_{eSSS}(2n+1) = \begin{cases} s_1^{(m_1)}(n)c_1(n)z_1^{(m_0)}(n) \text{ in subframes } 8, 9, 0, 1, 2 \\ s_0^{(m_0)}(n)c_1(n)z_1^{(m_1)}(n) \text{ in subframes } 3, 4, 5, 6, 7 \end{cases}$$

where $0 \le n \le 30$, and $m_0$, $m_1$, $s_0^{(m_0)}(n)$, $s_1^{(m_1)}(n)$, $c_0(n)$, $c_1(n)$, $z_1^{(m_0)}(n)$, and $z_1^{(m_1)}(n)$ are same as the ones in generating SSS. $d_{eSSS}(n)$ is mapped in the frequency-domain to the center 62 REs within the synchronization transmission bandwidth or within 6 PRBs.

In some embodiments, the sequence to generate eSSS is given by the combination of two length-31 sequences, but not scrambled by $N_{ID}^{(2)}$. For example, the construction of sequence to generate eSSS can be according to $$d_{eSSS}(2n) = \begin{cases} s_0^{(m_0)}(n) \text{ in subframes } 8, 9, 0, 1, 2 \\ s_1^{(m_1)}(n) \text{ in subframes } 3, 4, 5, 6, 7 \end{cases},$$

$$d_{eSSS}(2n+1) = \begin{cases} s_1^{(m_1)}(n)z_1^{(m_0)}(n) \text{ in subframes } 8, 9, 0, 1, 2 \\ s_0^{(m_0)}(n)z_1^{(m_1)}(n) \text{ in subframes } 3, 4, 5, 6, 7 \end{cases}$$

where $0 \le n \le 30$, and $m_0$, $m_1$, $s_0^{(m_0)}(n)$, $s_1^{(m_1)}(n)$, $z_1^{(m_0)}(n)$, and $z_1^{(m_1)}(n)$ are same as the ones in generating SSS. $d_{eSSS}(n)$ is mapped in the frequency-domain to the center 62 REs within the synchronization transmission bandwidth or within 6 PRBs.

In some embodiments, the sequence to generate eSSS is similar to the sequence to generate SSS (given by the combination of two length-31 sequences), but using different M-sequences such that the cross-correlation among SSS and eSSS is small. For example, the construction of sequence to generate eSSS can be according to $$d_{eSSS}(2n) = \begin{cases} s_0^{(m_0)}(n)c_0(n) \text{ in subframes } 8, 9, 0, 1, 2 \\ s_1^{(m_1)}(n)c_0(n) \text{ in subframes } 3, 4, 5, 6, 7 \end{cases} m,$$

$$d_{eSSS}(2n+1) = \begin{cases} s_1^{(m_1)}(n)c_1(n)z_1^{(m_0)}(n) \text{ in subframes } 8, 9, 0, 1, 2 \\ s_0^{(m_0)}(n)c_1(n)z_1^{(m_1)}(n) \text{ in subframes } 3, 4, 5, 6, 7 \end{cases}$$

where $0 \le n \le 30$, and $m_0$, $m_1$, $s_0^{(m_0)}(n)$, $s_1^{(m_1)}(n)$, $z_1^{(m_0)}(n)$, and $z_1^{(m_1)}(n)$ are same as the ones in generating SSS, but $\tilde{s}(n)$, $\tilde{c}(n)$, $\tilde{z}(n)$ are different M-sequence with length-31. $d_{eSSS}(n)$ is mapped in the frequency-domain to the center 62 REs within the synchronization transmission bandwidth or within 6 PRBs.

In one embodiment, the sequence to generate eSSS is a length-63 M-sequence with cover code (e.g., another M-sequence), which carries 504 cell IDs (e.g., essentially 504 eSSS sequences), and mapped in the frequency-domain to the center 62 REs within 6 PRBs by truncating the central element.

In one embodiment, the sequence to generate eSSS is a length-63 Gold-sequence, which carries 504 cell IDs (e.g., essentially 504 eSSS sequences), and mapped in the frequency-domain to the center 62 REs within 6 PRBs by truncating the central element.

In one embodiment, the eSSS sequence can be mapped to multiple symbols, e.g., K symbols. The base sequence, $s(n)$, can be constructed from BPSK modulated length-63 M-sequence, wherein $s(n)=(1-2x_{M0}(n))$, $0 \le n \le 62$. The M-sequence $x_M$ with length 63 can be from the construction methods in TABLE 10, with some proper initial condition e.g. $x_M(0)=x_M(1)=x_M(2)=x_M(3)=x_M(4)=0, x(5)=0, x(6)=1$, or $x_M(1)=x_M(2)=x_M(3)=x_M(4)=x_M(5)=0$, $x_M(0)=1$.

TABLE 10

| No. | Recursive construction method | Corresponding polynomial |
|---|---|---|
| 1 | $x_M(i + 6) = [x_M(i + 5) + x_M(i)] \mod 2$, $0 \le i \le 56$ | $x^6 + x^5 + 1$ |
| 2 | $x_M(i + 6) = [x_M(i + 1) + x_M(i)] \mod 2$, $0 \le i \le 56$ | $x^6 + x + 1$ |
| 3 | $x_M(i + 6) = [x_M(i + 5) + x_M(i + 4) + x_M(i + 1) + x_M(i)] \mod 2$, $0 \le i \le 56$ | $x^6 + x^5 + x^4 + x + 1$ |
| 4 | $x_M(i + 6) = [x_M(i + 5) + x_M(i + 2) + x_M(i + 1) + x_M(i)] \mod 2$, $0 \le i \le 56$ | $x^6 + x^5 + x^2 + x + 1$ |
| 5 | $x_M(i + 6) = [x_M(i + 5) + x_M(i + 3) + x_M(i + 2) + x_M(i)] \mod 2$, $0 \le i \le 56$ | $x^6 + x^5 + x^3 + x^2 + 1$ |
| 6 | $x_M(i + 6) = [x_M(i + 4) + x_M(i + 3) + x_M(i + 1) + x_M(i)] \mod 2$, $0 \le i \le 56$ | $x^6 + x^4 + x^3 + x + 1$ |

In such embodiment, the ith symbol within the K symbols mapped for eSSS is constructed directly from the M sequence with cyclic shift $m_i$ according to $d_{eSSS,i}(n)=1-2x_{M0}((n+m_i) \mod 63)$, $n=0, \ldots, 62$, $i=0, \ldots, K-1$ and truncated by the center element $d_{eSSS,i}(31)$ and mapped into the center 62 REs within the 6 PRB of assigned narrowband. In one example, $x_{M0}$ is generated from the primitive polynomial $x^6+x+1$. The cyclic shifts are determined by part of cell ID $N_{ID}^{(1)}$, according to $$m_i \begin{cases} \mod(N_{ID}^{(1)}, 63), & \text{if } \mod(i, 2) = 0 \\ \left\lfloor \dfrac{N_{ID}^{(1)}}{63} \right\rfloor, & \text{if } \mod(i, 2) = 1 \end{cases}.$$

In some embodiments of component VIII for time-domain mapping of ePSS, the mapping of OFDM-symbol(s) containing ePSS in time-domain and frequency-domain is illustrated. Note that the mapping can be either combined with design options of ePSS sequence, or independent from the design options of ePSS sequence (i.e., using other type of sequences not described in aforementioned embodiments/component VII). The following design aspects are considered for time-domain and frequency-domain mapping of ePSS symbol(s), and their combinations are also supported in this disclosure.

In one embodiment of design aspect 1 for periodicity of ePSS or a set of ePSSs, analog to PSS, ePSS or a set of ePSSs can be transmitted periodically. In one example, the periodicity of ePSS or a set of ePSSs can be the same as PSS (i.e., 5 ms). In another example, the periodicity of ePSS or a set of ePSSs can be twice of PSS (i.e., 10 ms), where ePSS or a set of ePSSs can be transmitted only in the first 5 ms of the periodicity, or only in the second 5 ms of the periodicity, or in both 5 ms periods within the periodicity but using different location and/or cover codes (e.g., OCC). In yet another embodiment, the periodicity of ePSS or a set of ePSSs can be configured by the NW if the UE is in IDLE mode.

In one embodiment of design aspect 2 for number of symbols containing ePSS within the periodicity, the number of ePSSs may depend on the requirement of latency enhancement of initial cell search or resynchronization for MTC. In one embodiment, there is no symbol containing ePSS within the periodicity (e.g. 0 ePSS in 5 ms or 10 ms). In one embodiment, there is only one symbol containing ePSS within the periodicity (e.g. 1 ePSS in 5 ms or 10 ms or configured periodicity). In another embodiment, there are two symbols containing ePSS within the periodicity (e.g. 2 ePSSs in 5 ms or 10 ms or configured periodicity). In yet another embodiment, there are three symbols containing ePSS within the periodicity (e.g. 3 ePSSs in 5 ms or 10 ms or configured periodicity). In yet another embodiment, there are four symbols containing ePSS within the periodicity (e.g. 4 ePSSs in 5 ms or 10 ms). In yet another embodiment, there are eight symbols containing ePSS within the periodicity (e.g. 8 ePSSs in 10 ms or configured periodicity). When multiple symbols are transmitted for ePSSs within the periodicity, cover codes (e.g. OCC) can be applied to the multiple symbols, or be applied separately to groups of symbols within the multiple symbols.

In one embodiment of design aspect 3, it is considered that whether ePSS or a set of ePSSs have the same relative location(s) in time-domain comparing to PSS for TDD and FDD modes. Note that traditional UE uses the relative location of PSS and SSS to blindly decode TDD or FDD. Hence, in one example, ePSS or a set of ePSSs have the same relative location(s) in time-domain comparing to PSS for TDD and FDD modes, then LC-UE cannot utilize the location(s) of ePSS or a set of ePSSs to blindly decode TDD or FDD, and still use relative location of PSS and SSS to blindly decode TDD or FDD. In such example, the detection complexity of ePSS is lower (no TDD or FDD hypothesis). In another example, ePSS or a set of ePSSs have the different relative location(s) in time-domain comparing to PSS for TDD and FDD modes, then LC-UE can utilize the different location(s) of ePSS or a set of ePSSs to blindly decode TDD or FDD, in addition to utilize the relative location of PSS and SSS. In such example, the detection complexity of ePSS is higher (one more hypothesis of TDD or FDD).

In one embodiment of design aspect 4 for a time-domain location of ePSS or a set of ePSSs, ePSS can be mapped to symbols which are utilized for downlink data transmission and do not contain CRS or DMRS. In another, PSS can be mapped to symbols which are utilized for downlink data transmission which may contain CRS or DMRS, but those REs mapped for CRS or DMRS are reserved not for mapping of ePSS. In another embodiment, ePSS can be mapped to symbols which are utilized for LC-MIB transmission. In this embodiment, a set of ePSSs are multiplexed with repeated symbols for LC-MIB transmission using OCC (note that ePSSs are multiplexed with the same repeated symbols for LC-MIB). In yet another embodiment, a set of ePSSs can be transmitted using patterns in the above embodiments. For example, part of the ePSSs are transmitted in symbols for downlink data transmission, the remaining are transmitted in LC-MIB symbols using OCC.

In one embodiment of design aspect 5 for frequency-domain location of ePSS or a set of ePSSs, the frequency-location of ePSS or a set of ePSSs is fixed as the central X PRBs. For example, X=6 (same as the BW of PSS). In another embodiment, the frequency-location of ePSS or a set of ePSSs is configurable if the UE is in IDLE mode (e.g., for resynchronization purpose). For example, ePSS or a set of ePSSs can be mapped to 6 PRBs which are the same as the configured BW for paging. For another example, ePSS or a set of ePSSs can be mapped to a subset of the BW which is configured for paging, and a particular example can be 1 PRB.

In some embodiments of component IX for mapping of eSSS, the mapping of OFDM-symbol(s) containing eSSS in time-domain and frequency-domain is illustrated. Note that the mapping can be combined with design options of eSSS sequence, or independent from the design options of eSSS sequence (i.e., using other type of sequences not described in the aforementioned embodiment/Component VIII). The following design aspects are considered for time-domain mapping of eSSS symbol, and their combinations are also supported in this disclosure.

In one embodiment of design aspect 1 for periodicity of eSSS or a set of eSSSs, analog to SSS, eSSS or a set of eSSSs can be transmitted periodically (although the sequence of SSS can be different for the first and second 5 ms within a frame). In one embodiment, the periodicity of eSSS or a set of eSSSs can be the same as SSS (i.e., 5 ms). In another embodiment, the periodicity of eSSS or a set of eSSSs can be twice of SSS (i.e., 10 ms), where eSSS or a set of eSSS can be transmitted only in the first 5 ms of the periodicity, or only in the second 5 ms of the periodicity, or in both 5 ms periods within the periodicity but using different location and/or cover codes (e.f., OCC.) In yet another embodiment, the periodicity of eSSS or a set of eSSSs can be configured by the NW if the UE is in IDLE mode. Note that the periodicity of eSSS or a set of eSSSs can be the same as ePSS or a set of ePSSs, or can be different from ePSS or a set of ePSSs.

In one embodiment of design aspect 2 for a number of symbols containing eSSS within the periodicity, the number of eSSSs may depend on the requirement of latency enhancement (especially for cell ID) for MTC. In one embodiment, there is no symbol containing ePSS within the periodicity (e.g., 0 ePSS in 5 ms or 10 ms or configured periodicity). In one embodiment, there is only one symbol containing eSSS within the periodicity (e.g. 1 eSSS in 5 ms or 10 ms or configured periodicity). In another embodiment, there are two symbols containing eSSS within the periodicity (e.g. 2 eSSS in 5 ms or 10 ms or configured periodicity). In yet another embodiment, there are three symbols containing eSSS within the periodicity (e.g. 3 eSSS in 5 ms or 10 ms or configured periodicity). In yet another embodiment, there are four symbols containing eSSS within the periodicity (e.g. 4 eSSS in 5 ms or 10 ms or configured periodicity). In yet another embodiment, there are eight symbols containing eSSS within the periodicity (e.g. 8 eSSS in or 10 ms or configured periodicity). When multiple symbols are transmitted for eSSSs within the periodicity, cover codes (e.g. OCC) can be applied to the multiple symbols, or be applied separately to groups of symbols within the multiple symbols. Note that the number of symbols for eSSS can be the same as the one for ePSS (one-to-one mapping of eSSS and sPSS), or can be different from the one for ePSS (e.g. less than the number of ePSS).

In one embodiment of design aspect 3, it is considered that whether eSSS or a set of eSSSs have the same relative location(s) in time-domain comparing to SSS for TDD and FDD modes. Note that traditional UE uses the relative location of PSS and SSS to blindly decode TDD or FDD. Hence, in one embodiment, eSSS or a set of eSSSs have the same relative location(s) in time-domain comparing to SSS for TDD and FDD modes, then LC-UE cannot utilize the location(s) of eSSS or a set of eSSSs to detect TDD or FDD, and still use relative location of PSS and SSS to blindly decode TDD or FDD.

In another embodiment, eSSS or a set of eSSSs have the different relative location(s) in time-domain comparing to SSS for TDD and FDD modes, then LC-UE can utilize the different location(s) of eSSS or a set of eSSSs to help detecting TDD or FDD, in addition to utilize the relative location of PSS and SSS. Note that whether the relative location of eSSS(s) and SSS is the same can be independent of whether the relative location of ePSS(s) and PSS is the same for TDD and FDD. For example, the relative location of ePSS(s) and PSS is the same for TDD and FDD, but the relative location of eSSS(s) and SSS is the different for TDD and FDD.

In one embodiment of design aspect 4 for a time-domain location of eSSS or a set of eSSSs, eSSS can be mapped to symbols which are utilized for downlink data transmission and do not contain CRS or DMRS. In another embodiment, eSSS can be mapped to symbols which are utilized for downlink data transmission which may contain CRS or DMRS, but those REs mapped for CRS or DMRS are reserved not for mapping of eSSS. In another embodiment, eSSS can be mapped to symbols which are utilized for LC-MIB transmission. In this embodiment, a set of eSSSs are multiplexed with repeated symbols for LC-MIB transmission using OCC (note that eSSSs are multiplexed with the same repeated symbols for LC-MIB). In yet another embodiment, a set of eSSSs can be transmitted using patterns in the above embodiments.

For example, part of the eSSSs are transmitted in symbols for downlink data transmission, the remaining are transmitted in LC-MIB symbols using OCC. Note that the determination of eSSS location can be independent of ePSS. For example, ePSS and eSSS have one-to-one mapping relationship, where ePSS is mapped to symbol for data transmission, but eSSS is OCC with LC-MIB symbol; or ePSS is OCC with LC-MIB symbol, but eSSS is mapped to symbol for data transmission.

In one embodiment of design aspect 5 for a frequency-domain location of eSSS or a set of eSSSs, the frequency-location of eSSS or a set of eSSSs is fixed as the central X PRBs. For example, X=6 (same as the BW of SSS). In another embodiment, the frequency-location of eSSS or a set of eSSSs is configurable if the UE is in IDLE mode (e.g., for resynchronization purpose).

In one example, eSSS or a set of eSSSs can be mapped to 6 PRBs which are the same as the configured BW for paging.

In another example, eSSS or a set of eSSSs can be mapped to a subset of the BW which is configured for paging, and a particular example can be 1 PRB.

In one embodiment, eSSS and ePSS can be mapped to the same RBs in frequency domain (e.g., TDMed). In another embodiment, eSSS and ePSS can be mapped to non-overlapping RBs in the frequency domain (e.g., FDMed). In yet another embodiment, eSSS and ePSS can be mapped in a hybrid pattern of TDM and FDM.

In some embodiments of component X for ePSS and eSSS for Resynchronization and Wake-up, another scenario considered is the system acquisition with some apriori information. Different from initial cell search, UE may already have some system information known before getting unsynchronized. In this scenario, the UE may rely on the so-called re-synchronization signals (RSS) to get synchronized again, where the apriori information available at the UE can help with the re-synchronization procedure.

In LTE, PSS and SSS are transmitted every 5 ms within the central 6 PRBs, and their performance in the coverage-limited scenario may require significant number of combinations for reliable synchronization. For re-synchronization purpose, even though the apriori information, e.g. rough timing information and cell ID, can help with getting synchronized to the system, fully relying PSS and SSS with very sparse transmission in time-domain may not be sufficient. Hence, new always-on signals for the re-synchronization purpose may be introduced.

Note that the introduction of the re-synchronization signals should not impact the performance of legacy UEs in initial access. In one embodiment, re-synchronization signals can avoid using the central 6 PRBs for transmission. In another embodiment, re-synchronization signals can be transmitted at any location in the frequency domain per NW configuration, and the re-synchronization signals are with zero or little correlation with existing PSS sequences in the system to avoid the timing ambiguity issue for legacy UEs. In yet another embodiment, re-synchronization signals are restricted to be transmitted in the central 6 PRBs in the frequency domain, and the re-synchronization signals are with zero or little correlation with existing PSS sequences in the system to avoid the timing ambiguity issue for legacy UEs. Note that in this way, the re-synchronization signals can also be utilized for initial access enhancement if UEs know the time-domain configuration of the re-synchronization signals.

In one embodiment, the re-synchronization signals can be transmitted on one or multiple (consecutive) subframes, wherein the re-synchronization signals within each subframe is considered as a design unit, and the unit can be repeated periodically or repeated periodically with a cover code in time-domain, where the periodicity can be either fixed in the spec or configured by the NW.

In one sub-embodiment, re-synchronization signals are only responsible for timing and frequency synchronization, and no cell ID information is carried. For example, in each design unit of RSS (e.g. a subframe), one or multiple OFDM symbols within the 6 PRBs are mapped for ePSS sequences. One further variant of this example is, a cover code (e.g., OCC) can be applied to the symbols mapped for ePSS sequences, where the cover code (e.g., OCC) may contain few bits of information indicated to the UE, e.g. some simple system information update or an indication of the system information update, or the cover code is predefined in a specification not carrying any further information.

In another sub-embodiment, re-synchronization signals are responsible for timing and frequency synchronization, as well as confirmation of cell ID information. For example, in each design unit of RSS (e.g. a subframe), one or multiple OFDM symbols within the 6 PRBs are mapped for ePSS sequences, and one or multiple OFDM symbols within the 6 PRBs are mapped for eSSS sequences, where the eSSS sequences can carry the whole or part of the cell ID information. One further variant of this example is, a cover code (e.g., OCC) can be applied to the symbols mapped for ePSS sequences and/or eSSS sequences, where the cover code may contain few bits of information indicated to the UE, e.g. some simple system information update or an indication of the system information update, or the cover code is predefined in specification not carrying any further information. In another embodiment, the re-synchronization signals can be transmitted on one or multiple (consecutive) subframes, wherein the re-synchronization signals within each symbol of the subframes is considered as a design unit, and the unit can be repeated periodically or repeated periodically with a cover code in time-domain, where the periodicity can be either fixed in the spec or configured by the NW.

In one sub-embodiment, re-synchronization signals are only responsible for timing and frequency synchronization, and no cell ID information is carried. For example, in each design unit of RSS (e.g., a symbol), one OFDM symbol within the 6 PRBs are mapped for ePSS/eSSS, and a cover code (e.g., OCC) can be applied to the multiple symbols mapped for ePSS sequence, where the cover code (e.g., OCC) may contain few bits of information indicated to the UE, e.g., some simple system information update or an indication of the system information update, or the cover code is predefined in spec not carrying any further information.

In another sub-embodiment, re-synchronization signals are responsible for timing and frequency synchronization, as well as confirmation of cell ID information. For example, in each design unit of RSS (e.g., a symbol), one OFDM symbol can be mapped for either ePSS or eSSS sequence, and cover codes (e.g., OCC) can be applied to the symbols mapped for ePSS sequences and eSSS sequences, respectively, where the cover code may contain few bits of information indicated to the UE, e.g., some simple system information update or an indication of the system information update, or the cover code is predefined in spec not carrying any further information.

The re-synchronization signals can be transmitted on one or multiple (consecutive) subframes in time domain. In one embodiment, the design unit of RSSs is repeated across all the transmitted subframes. In another embodiment, a cover code (e.g., OCC) is applied to the design units of RSSs across all or part of the transmitted subframes, where the cover code (e.g., OCC) may contain few bits of information indicated to the UE, e.g. some simple system information update or an indication of the system information update, or the cover code is predefined in specification.

The transmission of the re-synchronization signals follows predefined patterns in time domain. In one embodiment, the time-domain pattern is fixed, in term of the subframe/symbol indices for RSSs and periodicity of RSSs.

In one example, the fixed configuration is associated with the configuration of paging. In one instance, for one particular sub-example, the periodicity of RSS, N_period^RSS, can be in the unit of number of radio frames/hyper frames, and given by N_period_RSS=a1*N_DRX+a2, where a1, a2 are constant integers, and N_DRX is the DRX/eDRX cycle configured in SIB2. In one consideration, the fixed periodicity of RSS equals to the DRX cycles configured for paging, e.g., if N_DRX=128as configured for paging, then N_period^RSS=128 (a1=1 and a2=0). In another consideration, the fixed periodicity of RSS equals to double of the DRX/eDRX cycles configured for paging, e.g., if N_DRX=128 as configured for paging, then N_period^RSS=256 (a1=2 and a2=0).

In another instance, the transmission duration of RSS, N^RSS, can be in the unit of symbols or subframes, and given by N^RSS=b1*N_subframe^MPDCCH+b2, where b1 and b2 are constant integers, and N_subframe^MPDCCH is the number of repetition for MPDCCH during paging, also configured in SIB2. In one consideration, the transmission duration of RSS equals to the configured number of repetitions for MPDCCH, e.g., if N_subframe^MPDCCH=4 as configured for paging, then N^RSS=4 (b1=1 and b2=0). In another consideration, the transmission duration of RSS is larger than the configured number of repetitions for MPDCCH, and the ratio is determined by one-shot detection performance of RSS within the periodicity.

In yet another instance, the starting subframe index of subframes mapped for RSS, N_subframe^start, can be determined by whether the frame containing the starting subframe index of subframes mapped for RSS is a paging frame or not. For example, N_subframe^start=10−N_subframe^RSS if it's not a paging frame, otherwise, N_subframe^start=min(N_subframe^paging−N_subframe^RSS, 0), where N_subframe^paging is the subframe index of first paging occasion, and N_subframe^RSS is the number of subframes for RSS.

In another embodiment, the time-domain pattern is configurable, where each configuration contains the information of subframe indices for RSSs and periodicity of RSSs. The configuration is performed at the NW end in order to adjust the overhead of re-synchronization signals and to guarantee the one-shot detection performance of re-synchronization signals.

In one example, the RSS configuration is associated with the configuration of paging.

In one instance, the periodicity of RSS, N_period^RSS, can be in the unit of number of radio frames/hyper frames, and given by N_period_RSS=a1*N_DRX+a2, where a1, a2 are constant integers, and N_DRX is the DRX/eDRX cycle configured in SIB2. Note that in order to limit the candidate size of the configurable periodicity of RSS, N_DRX can take values from a subset of the configurable DRX/eDRX cycle values.

In another instance, the transmission duration of RSS, N^RSS, can be in the unit of subframes or symbols, and given by N^RSS=b1*N_subframe^MPDCCH+b2, where b1 and b2 are constant integers, and N_subframe^MPDCCH is the number of repetition for MPDCCH during paging, also configured in SIB2. Note that in order to limit the candidate size of the configurable transmission duration of RSS, N^RSS can take values from a subset of the configurable number of repetitions for MPDCCH.

In yet another instance, the starting subframe index of subframes mapped for RSS, N_subframe^start, can be determined by whether the frame containing the starting subframe index of subframes mapped for RSS is a paging frame or not. For example, N_subframe^start=10−N_subframe^RSS if it's not a paging frame, otherwise, N_subframe^start=min(N_subframe^paging-N_subframe^RSS, 0), where N_subframe^paging is the subframe index of first paging occasion, and N_subframe^RSS is the number of subframes for RSS.

In one sub-embodiment, the configuration of the periodicity of RSS and the configuration of the transmission duration of RSS can be jointly determined such that the time-domain overhead for each combined configuration is fixed. E.g., N^RSS/N_period^RSS is a constant.

In one sub-embodiment, one of the configurations is by default in the specification and known at the UE end such that UE can utilize this configuration pattern for initial access enhancement.

In some embodiment of Component XI for frequency hopping of ePSS/eSSS, the diversity schemes of frequency hopping on ePSS/eSSS is illustrated. Note that the frequency hopping scheme can be either combined with design options of ePSS/eSSS sequence, or independent from the sequence design options.

To achieve frequency diversity gain, the narrowband index, n_NB, for each sequence unit varies per repetition. The ePSS/eSSS unit could either be a subframe or a symbol, depended of sequence design.

Let m be the size of effective narrowbands for ePSS/eSSS per period, and it is different w.r.t DL system bandwidth, N_RB^DL, according to $$m = \begin{cases} 1, N_{RB}^{DL} < 12 \\ 2, 12 \leq N_{RB}^{DL} \leq 50 \; m <= \text{N\_RB}^s, \\ 4, 50 < \text{N\_RB}^{\wedge} DL \end{cases}$$

where N_RB^s is the size of {s_j}, and {s_j} is the set of DL narrowbands available for ePSS/eSSS transmission.

When exclude narrowband overlapping with the 72 center subcarriers for

N_DL^RB > 15, {s_j} are $\{s_j\} = \{0, 3\}, N_{DL}^{RB} = 25$ $\{s_j\} = \{0, 1, 2, 5, 6, 7\}, N_{DL}^{RB} = 50$ $\{s_j\} = \{0, 1, 2, 3, 4, 7, 8, 9, 10, 11\}, N_{DL}^{RB} = 75$ $\{s_j\} = \{0, 1, 2, 3, 4, 5, 6, 9, 10, 11, 12, 13, 14, 15\}, N_{DL}^{RB} = 100.$ For every ith repetition within one periodicity, the set index j of the narrowband in the unit of either one subframe or one symbol is configured from one of the following options: Option 1, (j, i)=(SFN_MSB mod N_RB^s+mod(i, m)*floor(N_RB^s/m))mod N_RB^s, where SFN_MSB is the MSB of SFN, e.g. SFN_MSB could be 8 MSB; and Option 2, (j, i)=(cell_ID mod N_RB^s+mod(i, m)*floor(N_RB^s/m))mod N_RB^s, if cell id doesn't change, and ePSS/eSSS does not carry cell id information.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
 a transceiver configured to receive, from a base station (BS), a re-synchronization signal (RSS) over a downlink channel; and
 a processor operably connected to the transceiver, the processor configured to:
  identify time-domain and frequency-domain resources used for the RSS; and
  identify a sequence used for constructing the RSS from the time-domain and frequency-domain resources used for the RSS,
 wherein the sequence used for constructing the RSS is a quadrature phase shift keying (QPSK) modulated pseudo-noise (PN) sequence scrambled by a cover code and with an initial condition including at least part of a physical cell identification (ID).

2. The UE of claim 1, wherein the time-domain resources are a set of consecutive subframes periodically received from the BS.

3. The UE of claim 2, wherein:
 a periodicity of the set of consecutive subframes is configured by the BS; and
 indices the set of consecutive subframes are configured by the BS.

4. The UE of claim 2, wherein the cover code is determined for each subframe in the set of consecutive subframes.

5. The UE of claim 1, wherein the frequency-domain resources are configured by the BS.

6. The UE of claim 4, wherein the sequence used for constructing the RSS is mapped to the identified time-domain and frequency-domain resources in a frequency-first and time-second order.

7. The UE of claim 4, wherein the sequence used for constructing the RSS includes an indication of a system information update.

8. A base station (BS) in a wireless communication system, the BS comprising:
 a processor configured to:
  configure time-domain and frequency-domain resources used for a re-synchronization signal (RSS);
  generate a sequence to construct the RSS; and
  map the generated sequence to the time-domain and frequency-domain resources to be used for the RSS; and
 a transceiver operably connected to the processor, the transceiver configured to transmit, to a user equipment (UE), the RSS over a downlink channel,
 wherein the sequence used for constructing the RSS is a quadrature phase shift keying (QPSK) modulated pseudo-noise (PN) sequence scrambled by a cover code and with an initial condition including at least part of a physical cell identification (ID).

9. The BS of claim 8, wherein the time-domain resources are a set of consecutive subframes periodically received from the BS.

10. The BS of claim 9, wherein:
 a periodicity of the set of consecutive subframes is configured by the BS; and
 indices the set of consecutive subframes are configured by the BS.

11. The BS of claim 9, wherein the cover code is determined for each subframe in the set of consecutive subframes.

12. The BS of claim 8, wherein the frequency-domain resources are configured by the BS.

13. The BS of claim 8, wherein the sequence used for constructing the RSS is mapped to the time-domain and frequency-domain resources in a frequency-first and time-second order.

14. The BS of claim 8, wherein the sequence used for constructing the RSS includes an indication of a system information update.

15. A method for a user equipment (UE) in a wireless communication system, the method comprising:
- receiving, from a base station (BS), a re-synchronization signal (RSS) over a downlink channel;
- identifying time-domain and frequency-domain resources used for the RSS; and
- identifying a sequence used for constructing the RSS from the time-domain and frequency-domain resources used for the RSS,
- wherein the sequence used for constructing the RSS is a quadrature phase shift keying (QPSK) modulated pseudo-noise (PN) sequence scrambled by a cover code and with an initial condition including at least part of a physical cell identification (ID).

16. The method of claim 15, wherein the time-domain resources are a set of consecutive subframes periodically received from the BS.

17. The method of claim 16, wherein:
- a periodicity of the set of consecutive subframes is configured by the BS; and
- indices the set of consecutive subframes are configured by the BS.

18. The method of claim 16, wherein the cover code is determined for each subframe in the set of consecutive subframes.

19. The method of claim 15, wherein the frequency-domain resources are configured by the BS.

20. The method of claim 15, wherein the sequence used for constructing the RSS is mapped to the identified time-domain and frequency-domain resources in a frequency-first and time-second order.

* * * * *